US012500414B1

(12) United States Patent
Alam et al.

(10) Patent No.: US 12,500,414 B1
(45) Date of Patent: Dec. 16, 2025

(54) SYSTEM AND METHOD FOR VOLTAGE COMPENSATION AND STATE OF CHARGE-ASSISTED POWER SHARING IN DC MICROGRIDS

(71) Applicant: King Fahd University of Petroleum and Minerals, Dhahran (SA)

(72) Inventors: Md Shafiul Alam, Dhahran (SA); Fahad Saleh Al-Ismail, Dhahran (SA); Md Shafiullah, Dhahran (SA); Mohammad Ali Yousif Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/242,533

(22) Filed: Jun. 18, 2025

Related U.S. Application Data

(60) Provisional application No. 63/728,724, filed on Dec. 6, 2024.

(51) Int. Cl.
  *H02J 1/10* (2006.01)
  *G05B 6/02* (2006.01)

(52) U.S. Cl.
  CPC ... *H02J 1/10* (2013.01); *G05B 6/02* (2013.01)

(58) Field of Classification Search
  CPC ........................................ H02J 1/10; G05B 6/02
  See application file for complete search history.

(56) References Cited

U.S. PATENT DOCUMENTS

| | | | | |
|---|---|---|---|---|
| 2010/0045248 | A1* | 2/2010 | Hawley | G03B 15/03 323/282 |
| 2011/0084553 | A1* | 4/2011 | Adest | H02J 3/381 307/63 |

(Continued)

FOREIGN PATENT DOCUMENTS

| | | |
|---|---|---|
| CN | 104218658 B | 8/2016 |
| CN | 113691158 B | 9/2022 |

(Continued)

OTHER PUBLICATIONS

Jinweng Chen, Voltage compensation control system and method for isolated island direct current micro-grid (espacenet machine translation for application CN117293783A), Dec. 26, 2023, espacenet machine translation (Year: 2023).*

(Continued)

*Primary Examiner* — Christopher W Carter
(74) *Attorney, Agent, or Firm* — Oblon, McClelland, Maier & Neustadt, L.L.P.

(57) ABSTRACT

A control system for a direct current (DC) microgrid is described. The control system includes a DC bus with a positive bus line and a negative bus line, DC battery circuits with a positive coupler connected to the positive bus line and a negative coupler connected to the negative bus line, switches including a control input terminal located in each DC battery circuit, a distributed generator circuit connected to the DC bus, a constant load power circuit connected to the DC bus, a computing device connected to each control input terminal, the DC bus, the distributed generator circuit and the constant load power circuit. The computing device includes an electric circuitry, a memory, and at least one processor to determine a DC bus voltage, determine the SoC of the DC battery circuits, generate PWM signals that (Continued)

control the DC bus voltage, and balance the SoC of the DC battery circuits.

19 Claims, 22 Drawing Sheets

(56) References Cited

U.S. PATENT DOCUMENTS

| | | | | |
|---|---|---|---|---|
| 2011/0139213 | A1* | 6/2011 | Lee | G05F 1/67 |
| | | | | 136/244 |
| 2012/0267952 | A1* | 10/2012 | Ballatine | H02J 7/34 |
| | | | | 307/26 |
| 2017/0338761 | A1* | 11/2017 | Malek | H02P 23/16 |

FOREIGN PATENT DOCUMENTS

| | | |
|---|---|---|
| CN | 116316783 A | 6/2023 |
| CN | 117293783 A | 12/2023 |
| CN | 117638848 A | 3/2024 |

OTHER PUBLICATIONS

Wagner Coelho Leal, "A Control System for Battery Current Sharing in DC Microgrids with DC Bus Voltage Restoration", Nov. 2017, Brazilian Power Electronics Conference (COBEP) (Year: 2017).*

Marcelo Oliveira Godinho, et al., "SoC-adaptive Power Sharing Strategy Applied to DC M\microgrids Supplied by Multiple Energy Storage Systems", IEEE Journal of Emerging and Selected Topics in Industrial Electronics, vol. 4, Issue 4, May 30, 2023, pp. 1224-1234, Abstract only, 1 page.

* cited by examiner

SYSTEM AND METHOD FOR VOLTAGE COMPENSATION AND STATE OF CHARGE-ASSISTED POWER SHARING IN DC MICROGRIDS

CROSS REFERENCE TO RELATED APPLICATIONS

The present application claims the benefit of priority to U.S. Prov. App. No. 63/728,724 entitled "A Novel Voltage Compensation And State Of Charge-Assisted Power Sharing Strategy For DC Microgrids", filed on Dec. 6, 2024, and incorporated herein by reference in its entirety.

STATEMENT OF ACKNOWLEDGEMENT

Support provided by the King Fahd University of Petroleum and Minerals (KFUPM), Dharan, Saudi Arabia through Project No. INRE2209 is gratefully acknowledged.

BACKGROUND

Technical Field

The present disclosure is directed to power management systems in direct current (DC) microgrids and, more particularly, to systems and methods for voltage compensation and state of charge (SoC)-assisted power sharing among a plurality of battery circuits in a DC microgrid environment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Direct current (DC) microgrid technology plays a crucial role in the integration and operation of renewable energy sources (RESs) and distributed generators (DGs). DC microgrids are increasingly deployed in various applications, including residential power systems, industrial automation, electric vehicle (EV) charging infrastructure, and remote power stations. One of the primary objectives of the DC microgrids is to enable efficient power sharing among multiple sources, energy storage devices (ESDs), and loads while maintaining a stable DC bus voltage.

Compared to alternating current (AC) systems, the DC microgrids offer higher efficiency, simplified control, and more straightforward interfacing with the RESs, such as solar photovoltaic (PV) systems. In the DC microgrids, decentralized droop control methods are widely employed to achieve current sharing among parallel-connected converters and ensure local voltage regulation. Conventional droop-based control methods reduce an output voltage of each converter as an output current increases, facilitating autonomous current sharing among the parallel-connected converters without requiring communication links.

However, in scenarios involving fluctuating loads, droop parameter mismatches, and dynamic state-of-charge (SoC) conditions of the ESDs, the conventional droop-based control methods may result in unbalanced current distribution, voltage deviation, and SoC drift among distributed battery units. To address these concerns, centralized or hierarchical control architectures employing high-bandwidth communication links have been implemented. While such architectures enable improved power sharing and SoC management, they may introduce reliability concerns due to single points of failure and increased dependency on communication infrastructure.

In one conventional approach, a control method has been described to enable effective power balancing within the DC microgrids using blockchain-based applications for decentralized consensus and transaction verification (See: Hwang, H., Lee, S. H., Choi, D., Choi, S., & Sung, B. (2023), "*Voltage stability assessment of a campus DC microgrid implemented in Korea as a blockchain-based power transaction testbed*," Energies, 16(21), 7297). However, this method fails to address the balancing of SoC among hybrid energy storage systems, which is essential for long-term system efficiency and battery health.

In another conventional approach, an improved current-sharing method utilizing dynamic droop control with adjusted droop resistance has been developed to enhance performance in the DC microgrids (See: Taye, B. A., & Choudhury, N. B. D. (2023), "*A dynamic droop control for a DC microgrid to enhance voltage profile and proportional current sharing*," Electric Power Systems Research, 221, 109438). However, the reliability of this approach remains untested in grid-connected scenarios, limiting its applicability in hybrid microgrid environments, where both standalone and grid-connected modes are essential.

CN117293783A describes a voltage compensation control system including a DC microgrid, a battery group, and two proportional-integral (PI) controllers designed to regulate the DC bus voltage and balance the SoC through a dual-loop control structure consisting of current and voltage control loops. However, the capacity of the system to achieve more precise voltage regulation and flexible power conversion under varying load and SoC conditions is limited.

Each of the aforementioned references suffers from several limitations that prevent their broad adoption in resilient and autonomous DC microgrid control systems. In some examples, SoC balancing was not addressed, while other references focus solely on voltage restoration or fail to mitigate power-sharing discrepancies caused by droop parameter variations. Furthermore, few existing approaches explicitly consider the economic optimization of hybrid energy storage systems or the provision of robust stability under large-signal disturbances.

Accordingly, it is one object of the present disclosure to provide a controller for the DC microgrids that enhances voltage regulation, minimizes bus voltage errors, improves battery management, enables SoC-aware charging and discharging to extend battery life, and achieves faster voltage restoration, improving system resilience and dynamic response.

SUMMARY

In an exemplary embodiment, a control system for a direct current (DC) microgrid is described. The control system includes a DC bus configured with a positive bus line and a negative bus line. The control system further includes a plurality of DC battery circuits each configured with a positive coupler and a negative coupler. Each positive coupler is connected to the positive bus line and each negative coupler is connected to the negative bus line. The control system further includes a plurality of switches located in each DC battery circuit. Each switch includes a control input terminal. The control system further includes a distributed generator circuit connected to the DC bus. The control system further includes a constant load power circuit connected to the DC bus. The control system further includes a computing device connected to each control input terminal, the DC bus, the distributed generator circuit and the constant load power circuit. The computing device includes an electric circuitry, a memory configured to store program instructions, and at least one processor configured to execute the program instructions to determine a DC bus voltage of the DC bus. The at least one processor is further configured to determine a state of charge (SoC) of each of the plurality of DC battery circuits, generate phase width modulation (PWM) signals which control the DC bus voltage, and balance the SoC of the DC battery circuits.

In another exemplary embodiment, a method of controlling a DC bus voltage and a state of charge (SoC) balance in a DC microgrid having a plurality of DC battery circuits is described. Each DC battery circuit includes a DC battery connected to a bidirectional buck-boost converter. The method includes calculating, by a fractional order proportional integral (FOPI) voltage controller connected to a computing device, a fractional order proportional integral (FOPI) transfer function of the plurality of DC batteries. The method further includes calculating, by the FOPI voltage controller, a compensation voltage $v_{com}$ of each DC battery of the plurality of DC battery circuits based on the FOPI transfer function. The method further includes measuring, by the computing device, an SoC of each of the DC batteries. The method further includes calculating, by the computing device, an average SoC of the DC batteries of the plurality of DC battery circuits. The method further includes formulating, by the computing device, an SoC transfer function based on the average SoC of the DC batteries of the plurality of DC battery circuits. The method further includes combining, by the computing device, the compensation voltage $v_{com}$ and the SoC transfer function in a double control loop of the plurality of DC battery circuits to obtain a control model. The method further includes modifying, by the computing device, the control model to develop a small signal model based on bidirectional buck-boost converter small signal equations of the plurality of DC battery circuits. The method further includes generating, by the FOPI voltage controller, a FOPI control transfer function for each DC battery circuit based on the small signal model. The method further includes tuning, by the computing device, a plurality of parameters of the FOPI control transfer function based on a modified particle swarm optimization. The method further includes controlling the DC bus voltage based on the FOPI control transfer function.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
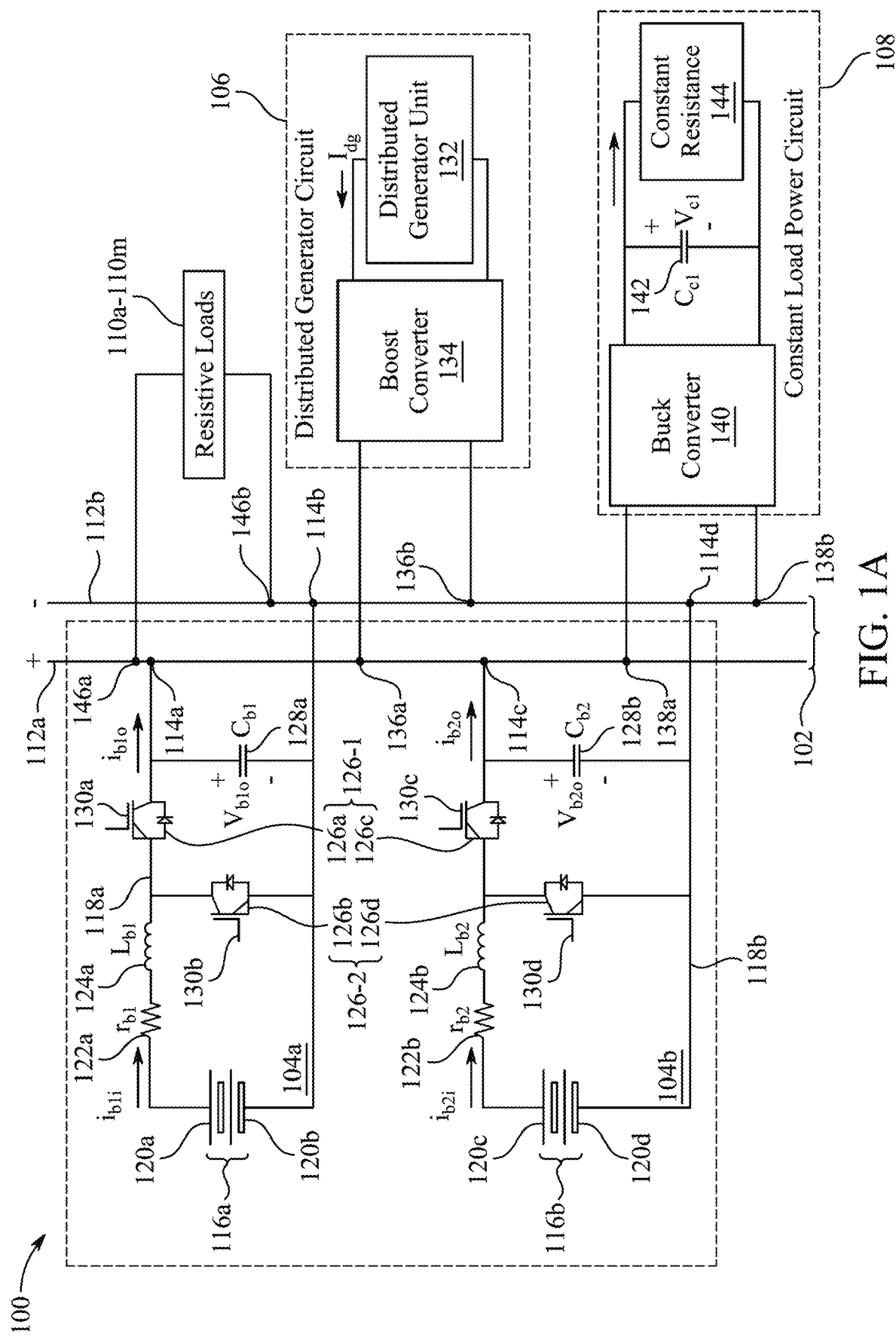
FIG. 1A illustrates an exemplary schematic representation of a direct current (DC) microgrid, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a system and method for controlling power-sharing and bus voltage regulation in a direct current (DC) microgrid by incorporating a state-of-charge (SoC)-based double-loop control approach and a fractional-order proportional-integral (FOPI) voltage compensation mechanism. Conventional DC microgrid control systems often struggle with maintaining balanced SoC among multiple energy storage devices (ESDs), minimizing bus voltage deviations, and adapting to varying load dynamics, especially when both resistive and constant power loads are present.

The present disclosure describes a control architecture in which an inner control loop utilizes the SOC of each DC battery to autonomously regulate charging and discharging rates, allowing low-SoC batteries to charge faster and high-SoC batteries to discharge more slowly. Concurrently, an outer FOPI compensation loop is implemented to enhance the dynamic response and stability of the DC bus voltage regulation. A small-signal model of the DC microgrid is developed, and controller parameters are optimized to minimize an integral square error (ISE) of a step response.

FIG. 1A illustrates an exemplary schematic representation of a direct current (DC) microgrid 100. As used herein, the term "DC microgrid 100" refers to a localized and self-contained power system that distributes and manages electrical energy in the form of DC rather than alternating current (AC). In an aspect, the DC microgrid 100 may be implemented in various environments, such as but not limited to, residential homes, commercial buildings, electric vehicle charging stations, industrial facilities, aerospace systems, remote or off-grid locations, and the like. The DC microgrid 100 includes a DC bus 102, a plurality of DC battery circuits 104a-104b (hereinafter collectively referred to as the DC battery circuits 104 and individually referred to as the DC battery circuit 104), a distributed generator circuit 106, a constant load power circuit 108 and a plurality of resistive loads 110a-110m (hereinafter collectively referred to as the resistive loads 110 and individually referred to as the resistive load 110).

The DC bus 102 serves as a main power distribution backbone that interconnects various power sources and loads within the DC microgrid 100. As used herein, the term "power sources" refers to any device or system that supplies the electrical energy to the DC bus 102. In an aspect, the power sources may be renewable sources or non-renewable sources and deliver power through converters to match a voltage level of the DC bus 102. The converters may be, but are not limited to, DC-DC converters, AC-DC converters, power conditioning units, and the like, depending on the nature of the power source. The power sources may be, but are not limited to, solar photovoltaic (PV) panels, wind turbines (with rectifiers), fuel cells, batteries, distributed generators, and the like. In some aspects, one or more of the power sources may be coupled with maximum power point tracking (MPPT) controllers configured to optimize power delivery by dynamically tracking an optimal operating point. Also, as used herein, the term "load" refers to any device or system that consumes the electrical energy from the DC bus 102. The load may be, but is not limited to, the resistive loads 110 (e.g., heaters, incandescent lamps, and the like), constant power loads (e.g., tightly regulated electronics, servers), light emitting diode (LED) lighting systems, DC appliances (e.g., consumer electronics, telecom equipment, computers), and the like. In one aspect, the load may be connected directly to the DC bus 102 or through the converters (e.g., DC-DC converters), depending on load type and control requirements. For example, the resistive load 110 may be directly connected to the DC bus 102, whereas other loads, such as the constant power loads, may interface with the DC bus 102 through the DC-DC converters. The DC bus 102 provides a common voltage level for a seamless exchange of the power between components, such as a distributed generator unit 132 (e.g., solar photovoltaic panels, wind turbines, fuel cells), battery storage devices (e.g., DC batteries 116a-116b), and different types of loads. The DC bus 102 is configured with a positive bus line 112a and a negative bus line 112b that enables bidirectional current flow between the battery storage devices and the DC bus 102, thereby supporting both charging and discharging operations of the battery storage devices.

The DC battery circuits 104 are configured to connect the battery storage devices to the positive bus line 112a and the negative bus line 112b of the DC bus 102. Each DC battery circuit 104 is configured with a respective positive coupler 114a or 114c and a negative coupler 114b or 114d, which facilitates a connection between the battery storage devices and the DC bus 102. For example, the DC battery circuit 104a is associated with the positive coupler 114a and the negative coupler 114b, and the DC battery circuit 104b is associated with the positive coupler 114c and the negative coupler 114d. In the present disclosure, the positive couplers 114a and 114c and the negative couplers 114b and 114d are hereinafter collectively referred to as 114p and 114n, respectively, corresponding to the DC battery circuits 104.

The positive coupler 114p of each DC battery circuit 104 is connected to the positive bus line 112a, and the negative coupler 114n of each DC battery circuit 104 is connected to the negative bus line 112b. This configuration ensures that the DC battery circuit 104 effectively manages the charging and discharging operations, enabling energy flow in both directions as needed for optimal performance and energy storage.

Each DC battery circuit 104 includes a DC battery 116a or 116b and a bidirectional buck-boost converter 118a or 118b. As illustrated in FIG. 1A, the DC battery circuit 104a includes the DC battery 116a and the bidirectional buck-boost converter 118a, while the DC battery circuit 104b includes the DC battery 116b and the bidirectional buck-boost converter 118b. In the present disclosure, the DC batteries 116a and 116b are hereinafter collectively referred to as the DC battery 116, and the bidirectional buck-boost converters 118a and 118b are hereinafter collectively referred to as the bidirectional buck-boost converter 118. Each DC battery 116 (i.e., DC batteries 116a and 116b) serves as the energy storage device, including a positive battery terminal 120a or 120c and a negative battery terminal 120b or 120d. For example, the DC battery 116a includes the positive battery terminal 120a and the negative battery terminal 120b, while the DC battery 116b includes the positive battery terminal 120c and the negative battery terminal 120d. In the present disclosure, the positive battery terminals 120a and 120c and the negative battery terminals 120b and 120d are hereinafter collectively referred to as 120p and 120n, respectively, corresponding to the DC batteries 116.

In an aspect, the positive battery terminal 120p of the DC battery 116 may be connected to the positive coupler 114p of the corresponding DC battery circuit 104, and the negative battery terminal 120n of the DC battery 116 may be connected to the negative coupler 114n of the corresponding DC battery circuit 104. The positive battery terminal 120p and the negative battery terminal 120n of the DC battery 116 provide pathways for current to flow in and out of the DC battery 116, depending on whether the DC battery 116 is charging or discharging. The DC battery 116 may be, but not limited to, lithium-ion batteries, lead-acid batteries, nickel-metal hydride batteries, sodium-sulfur batteries, and the like. Aspects of the present disclosure are intended to include or otherwise cover any type of the DC battery 116, including known related art and/or later developed technologies.

The bidirectional buck-boost converter 118 is connected to the DC battery 116, such that the bidirectional buck-boost converter 118 interfaces with the positive battery terminal 120p and the negative battery terminal 120n of the DC battery 116. For example, the bidirectional buck-boost converter 118a is connected to the DC battery 116a, and the bidirectional buck-boost converter 118b is connected to the DC battery 116b, as illustrated in FIG. 1A. The bidirectional buck-boost converter 118 is a power electronic circuit designed to regulate voltage and current flow between the DC battery 116 and the DC bus 102. For example, the bidirectional buck-boost converter 118 may be configured to perform step-up and step-down of the voltage, allowing for the electrical energy to flow either from the DC battery 116 to the DC bus 102 (discharge) or from the DC bus 102 to the DC battery 116 (charge).

Each bidirectional buck-boost converter 118 (i.e., bidirectional buck-boost converters 118a and 118b) includes a corresponding set of components, such as a resistor 122a or 122b, an inductor 124a or 124b, a first buck-boost converter switch 126a or 126c, a second buck-boost converter switch 126b or 126d, and a capacitor 128a or 128b. By way of example, as illustrated in FIG. 1A, the bidirectional buck-boost converter 118a includes the resistor 122a, denoted as rei, the inductor 124a, denoted as $L_{b1}$, the first buck-boost converter switch 126a, the second buck-boost converter switch 126b, and the capacitor 128a, denoted as $C_{b1}$, where $b_1$ corresponds to the DC battery 116a. Similarly, the bidirectional buck-boost converter 118b includes the resistor 122b, denoted as $r_{b2}$, the inductor 124b, denoted as $L_{b2}$, the first buck-boost converter switch 126c, the second buck-boost converter switch 126d and the capacitor 128b, denoted as $C_{b2}$, where $b_2$ corresponds to the DC battery 116b. In the present disclosure, the resistor 122a and 122b, the inductor 124a and 124b, the first buck-boost converter switch 126a and 126c, the second buck-boost converter switch 126b and 126d, and the capacitor 128a and 128b, are hereinafter referred to as the resistor 122, the inductor 124, the first buck-boost converter switch 126-1, the second buck-boost converter switch 126-2, and the capacitor 128, respectively, corresponding to the bidirectional buck-boost converters 118.

The resistor 122 is connected to the positive battery terminal 120p of the DC battery 116. The resistor 122 limits an input current of the corresponding DC battery 116 during both charging and discharging operations. For example, the resistor 122a limits the input current $i_{b1i}$ of the DC battery 116a during the charging and discharging operations. In the charging operation, the resistor 122a ensures that the input current $i_{b1i}$ flowing into the DC battery 116a remains within safe limits (e.g., maximum 20 amperes (A)), preventing overcharging. During the discharging operation, the resistor 122a manages an output current $i_{b1o}$ from the DC battery 116a to the DC bus 102, ensuring that the output current $i_{b1o}$ supplied to the load or the DC bus 102 is within a desired range (e.g., 10-15 A) for efficient energy distribution. Similarly, the resistor 122b limits the input current $i_{b2i}$ of the DC battery 116b during the charging and discharging operations. In the charging operation, the resistor 122b ensures that the input current $i_{b2i}$ flowing into the DC battery 116b remains within the safe limits. During the discharging operation, the resistor 122b manages an output current $i_{b2o}$ from the DC battery 116b to the DC bus 102. In an aspect, the resistor 122 may be, but not limited to, a current sense resistor, a series resistor, a bleeder resistor, and the like. Aspects of the present disclosure are intended to include or otherwise cover any type of the resistor 122, including known related art and/or later developed technologies.

The inductor 124 is connected in series with the resistor 122 and configured to limit a rate of current change (di/dt), smooth out current ripple, and store magnetic energy during switching operations of the bidirectional buck-boost converter 118. This ensures efficient energy transfer during both charging and discharging phases and helps protect the DC battery circuit components (i.e., DC batteries 116) from abrupt current fluctuations. For example, during a sudden transition from low load to high load demand, a sharp surge in the current may try to flow from the DC battery 116 to the DC bus 102. Without the inductor 124, this abrupt change in the current (high di/dt) may stress or damage the DC battery 116 or cause excessive heat in switching devices (e.g., buck-boost converter switches 126-1 and 126-2). However, the inductor 124 resists the sudden surge by temporarily storing the energy in its magnetic field and releasing the energy gradually, thereby limiting the di/dt and delivering a controlled current rise to the load.

The first buck-boost converter switch 126-1 is connected between the inductor 124 and the positive bus line 112a. The first buck-boost converter switch 126-1 is configured to control the flow of current between the inductor 124 and the positive bus line 112a, thereby enabling the corresponding DC battery circuit 104 to dynamically regulate a voltage level and current direction during both charging and discharging operations of the DC battery 116. In an aspect, during the discharging process, when the DC battery 116 supplies the power to the DC bus 102, the first buck-boost converter switch 126-1 operates in coordination with the inductor 124 and other converter components to either step-up (boost) or step-down (buck) a battery voltage to match a required DC bus voltage. For instance, if the DC battery 116 is at 48 volts (V) and the DC bus 102 requires 60V, the first buck-boost converter switch 126-1 operates in a boost mode. In the boost mode, the inductor 124 stores the energy when the first buck-boost converter switch 126-1 is ON and releases the stored energy at a higher voltage to the DC bus 102 when the first buck-boost converter switch 126-1 is OFF. Conversely, during the charging process, when the energy from the DC bus 102 is used to charge the DC battery 116, the first buck-boost converter switch 126-1 allows controlled current flow from the DC bus 102 through the inductor 124. In this case, the first buck-boost converter switch 126-1 operates in the buck or boost mode as required, stepping down or stepping up a DC bus voltage to an appropriate level for safe and efficient battery charging. As used herein, the term "DC bus voltage" refers to an electrical potential difference between the positive bus line 112a and the negative bus line 112b. The DC bus voltage serves as a main voltage level that interconnects various components in the DC microgrid 100, such as batteries, loads, and converters, and acts as a common reference for power exchange among the components of the DC microgrid 100.

The second buck-boost converter switch 126-2 is connected between the inductor 124 and the negative battery terminal 120n, which in turn is connected to the negative bus line 112b. The second buck-boost converter switch 126-2 is configured to complete a current path back to the DC battery 116, especially during the charging process. The second buck-boost converter switch 126-2 works in synchronization with the first buck-boost converter switch 126-1, operating in a coordinated switching pattern that enables bidirectional power transfer between the DC battery 116 and the DC bus 102. The switching pattern depends on the operating mode, i.e., buck mode (voltage reduction) or boost mode (voltage increment). For example, in the charging mode, the DC bus 102 may be at 60V, and the DC battery 116 at 48 V. In this case, the bidirectional buck-boost converter 118 operates in the buck mode to reduce the voltage, and the second buck-boost converter switch 126-2 controls the energy discharge from the inductor 124 into the DC battery 116. Conversely, during the discharge mode, if the battery voltage is higher than the DC bus voltage, the bidirectional buck-boost converter 118 operates in the boost mode. The second buck-boost converter switch 126-2 then regulates the energy release from the DC battery 116 to the DC bus 102 by controlling charging and discharging cycles of the inductor 124.

In an aspect, the first buck-boost converter switch 126-1 and the second buck-boost converter switch 126-2 may correspond to a plurality of switches located within each DC battery circuit 104. In the present disclosure, the first buck-boost converter switch 126-1 and the second buck-boost converter switch 126-2 are hereinafter collectively referred to as switches 126 of the corresponding DC battery circuit 104.

Each of the switches 126 of the corresponding DC battery circuit 104 is configured with a control input terminal (respectively 130a or 130b or 130c or 130d), which is operable to receive control signals that dictate switching behavior in accordance with the desired operating conditions of the DC microgrid 100. For example, switches 126a and 126b in the DC battery circuit 104a are configured with control input terminals 130a and 130b, respectively, and switches 126c and 126d in the DC battery circuit 104b are configured with control input terminals 130c and 130d, respectively. In the present disclosure, the control input terminals 130a, 130b, 130c, and 130d of the respective switches 126a, 126b, 126c, and 126d are hereinafter collectively referred to as the control input terminals 130 of the corresponding switches 126 and individually referred to as the control input terminal 130 of the corresponding switch 126. The control input terminal 130 facilitates a selective actuation of the switch 126, allowing for precise timing and modulation to support bidirectional energy flow, voltage regulation, and current control within the DC microgrid 100.

The switches 126 may be implemented using various types of power switching devices, including but not limited to metal-oxide-semiconductor field-effect transistors (MOSFETs), insulated-gate bipolar transistors (IGBTs), silicon carbide (SiC) switches, gallium nitride (GaN) transistors, and the like. Aspects of the present disclosure are intended to include or otherwise cover any type of the power switching devices, including known related art and/or later-developed technologies. The switches 126 are driven by the control signals in the form of pulse-width modulation (PWM) signals applied at the corresponding control input terminals 130 to dynamically modulate a conduction state (i.e., ON or OFF) of the switch 126 in a high-frequency manner. As used herein, the term "PWM signals" refers to digital control signals used to regulate power delivery to electrical devices by switching components (like transistors or converters) on and off at high frequency.

The capacitor 128a is connected between the first buck-boost converter switch 126-1 and the negative bus line 112b, and is configured to stabilize the voltage at the output of the first buck-boost converter switch 126-1, represented as $v_{b1o}$ or $v_{b2o}$ (where $v_{b1o}$ corresponds to the DC battery circuit 104a and $v_{b2o}$ corresponds to the DC battery circuit 104b) by smoothing any voltage fluctuations and reducing ripple in the power supply. The capacitor 128a is configured to provide a temporary energy storage buffer, absorbing sudden changes in the voltage caused by the switching operations. During the discharging operation, when the current is flowing from the DC battery 116 to the DC bus 102, the capacitor 128a helps maintain a stable output voltage by providing a reservoir of charge that smooths out any voltage dips. During the charging operation, when the current flows from the DC bus 102 to the DC battery 116, the capacitor 128a smooths out voltage surges, ensuring efficient and controlled battery charging without over-voltage or under-voltage conditions.

Equivalently, the capacitor 128b, the bidirectional buck-boost converter 118b and the DC battery 116b perform the functions detailed above with respect to the capacitor 128a, the bidirectional buck-boost converter 118a and the DC battery 116a.

The distributed generator circuit 106 is electrically connected to the DC bus 102 through the positive bus line 112a and the negative bus line 112b. The distributed generator circuit 106 is configured to interface with the DC bus 102 to provide the power generated from the renewable energy sources (such as solar panels, wind turbines, or other renewable energy generators) to maintain the voltage level of the DC bus 102 during microgrid operation. The distributed generator circuit 106 includes a distributed generator unit 132 and a boost converter 134. The distributed generator unit 132 is connected to at least one generator of renewable energy and is configured to receive power from the at least one generator of renewable energy. In an aspect, the distributed generator unit 132 may be electrically connected to the at least one generator of renewable energy through one or more input power lines. As used herein, the term "input power lines" refers to one or more conductive pathways, such as electrical wires or cables, configured to carry the electrical energy from a power source to a load or energy conversion component. The input power lines serve as a medium for transferring the generated power into the DC microgrid 100. For example, the distributed generator unit 132 may be connected to the solar PV panel via a pair of input power lines. The input power lines deliver the generated DC voltage from the solar panel to the distributed generator unit 132, where the received DC voltage is regulated and subsequently supplied to the DC bus 102.

The distributed generator unit 132 is configured to convert the power received from the generator of renewable energy into usable electrical energy in the form of DC power. For example, in a solar power system, the distributed generator unit 132 may include a solar panel (or array) that converts sunlight into DC electricity. Similarly, in the wind turbine, the distributed generator unit 132 may convert mechanical energy from the wind into electrical energy, using a generator that produces DC or AC power, with the latter being rectified to DC power as needed. The distributed generator unit 132 is capable of supplying the power to the DC bus 102, depending on the availability of the renewable energy sources, such as during periods of adequate sunlight or sufficient wind conditions.

The boost converter 134 is a bidirectional converter connected in parallel with the distributed generator unit 132 to regulate and control the power flow. The boost converter 134 is configured to increase the voltage from the distributed generator unit 132 to match the voltage requirements of the DC bus 102. In an aspect, the boost converter 134 may perform a boosting operation, which means the boost converter 134 raises the voltage level of the power generated by the distributed generator unit 132 to a higher level that is required by the DC bus 102. The boost converter 134 is configured with a positive connector 136a and a negative connector 136b. The positive connector 136a is connected to the positive bus line 112a, and the negative connector 136b is connected to the negative bus line 112b, ensuring that the power generated by the distributed generator unit 132 flows into the DC bus 102 properly, maintaining voltage stability of the DC bus 102. In an aspect, during high generation of power (when the renewable energy source generates more power than the DC bus 102 requires), the boost converter 134 ensures that excess energy is converted and delivered to the DC bus 102 at an appropriate voltage.

The constant load power circuit 108 is electrically connected to the DC bus 102 and is configured to consume the power in a stable and predictable manner. The constant load power circuit 108 includes an input terminal 138a and an output terminal 138b for interfacing with the DC bus 102. In an aspect, the input terminal 138a of the constant load power circuit 108 is electrically connected to the positive bus line 112a of the DC bus 102, while the output terminal 138b of the constant load power circuit 108 is electrically connected to the negative bus line 112b of the DC bus 102.

The constant load power circuit 108 is configured to draw a steady and predictable amount of power from the DC bus 102 regardless of fluctuations in the voltage supplied by the DC bus 102. The constant load power circuit 108 includes a buck converter 140, a capacitor $C_{c1}$ 142 and a constant resistance 144. The buck converter 140 is a bidirectional converter configured to receive the power from the DC bus 102 and step down the voltage of the received power to a predetermined lower voltage level suitable for powering a constant electric load. As used herein, the term "predetermined lower voltage level" refers to a voltage value selected in advance based on the requirements of a connected load or safety and performance considerations. This voltage regulation ensures that sensitive or fixed-load components receive a stable and appropriate voltage, even if the voltage on the DC bus 102 fluctuates due to varying supply or demand conditions in the DC microgrid 100.

The capacitor $C_{c1}$ 142 is connected in parallel with the buck converter 140. In other words, the capacitor $C_{c1}$ 142 is electrically connected in parallel with an output voltage $V_{c1}$ of the buck converter 140. In an aspect, the capacitor $C_{c1}$ 142 may be configured to filter and smooth out voltage ripples that may arise from the high-frequency switching operations of the buck converter 140. In another aspect, the capacitor $C_{c1}$ 142 may be configured to suppress voltage transients or noise that may potentially affect the stability or performance of the connected load.

The constant resistance 144 is connected in parallel with the capacitor $C_{c1}$ 142. In an aspect, a parallel configuration of the constant resistance 144 may establish a fixed load condition that continuously draws the predictable amount of current based on its resistance value, as defined by Ohm's Law. Since the output voltage $V_{c1}$ of the buck converter 140 is regulated, and the resistance remains constant, a resulting current draw is steady and consistent. The fixed load condition is beneficial for stabilizing the operation of the DC microgrid 100, ensuring that a minimum baseline power demand is maintained, which in turn supports efficient regulation and performance of associated power electronics.

The resistive loads 110 are electrically connected to the DC bus 102 and are configured to receive the power directly from the DC bus 102. In an aspect, each resistive load 110 includes an input terminal 146a connected to the positive bus line 112a and an output terminal 146b connected to the negative bus line 112b, thereby establishing a complete electrical pathway for the current to flow. When the voltage is applied across terminals of the resistive load 110, the electrical current flows through a resistance element, resulting in a dissipation of electrical energy in the form of heat or other usable output, depending on the application. For example, the resistive load 110 may be embodied in the form of heating elements, incandescent lamps, industrial resistive heaters, and the like, where the electrical energy is directly converted into thermal energy. In another example, the resistive load 110 may include ballast resistors used to stabilize the current in electrical circuits. The resistive loads 110 operate in accordance with the Ohm's Law, such that the amount of current drawn from the DC bus 102 is proportional to the voltage applied and inversely proportional to a resistance value. The direct connection of resistive loads 110 to the DC bus 102 ensures straightforward energy consumption without the need for complex power conversion circuitry.

Figure 1B:
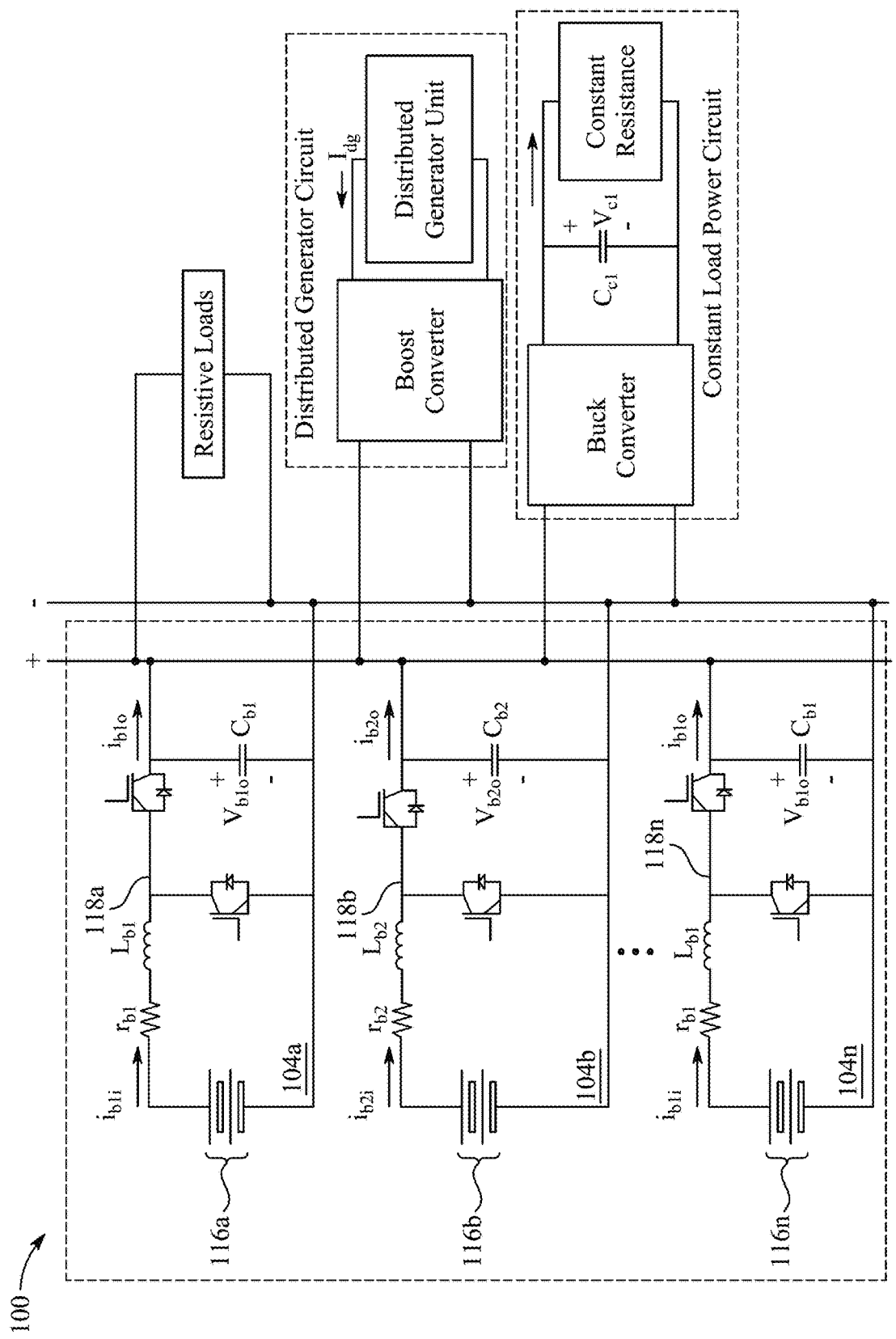
FIG. 1B illustrates another exemplary schematic representation of the DC microgrid, according to certain embodiments.

FIG. 1B illustrates another exemplary schematic representation of the DC microgrid 100. As illustrated in FIG. 1B, the DC microgrid 100 includes a plurality of DC battery circuits 104a-104n. Each of the DC battery circuits 104a-104n includes a DC battery 116a or 116b or 116n and is coupled to a corresponding bidirectional buck-boost converter 118a or 118b or 118n. For example, the DC battery circuit 104a includes the DC battery 116a and is coupled to the bidirectional buck-boost converter 118a, while the DC battery circuit 104b includes the DC battery 116b and is coupled to the bidirectional buck-boost converter 118b. This same structure continues for each subsequent DC battery circuit, with the DC battery circuit 104n including the DC battery 116n and the bidirectional buck-boost converter 118n. FIG. 1B illustrates a generalized and scalable configuration with n battery circuits 104a-104n. This representation indicates the modular nature of the DC microgrid 100, allowing for flexible expansion and adaptation based on energy storage requirements.

Figure 2:
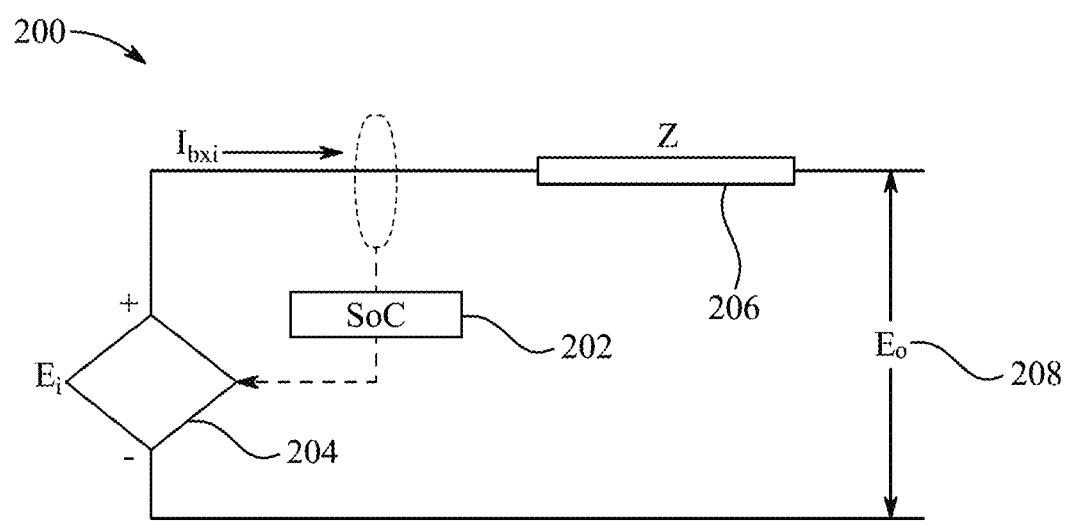
FIG. 2 illustrates an exemplary electrical model of a battery used in a battery energy storage system, according to certain embodiments.

FIG. 2 illustrates an exemplary electrical model 200 of a battery used in a battery energy storage system. In an aspect, the battery may correspond to the DC battery 116 of FIG. 1A. In an aspect, an internal voltage of the battery, denoted as, $E_i$ is not constant but dynamically varies depending on a state of charge (SoC) 202 of the battery. The term "State of Charge (SoC) 202" of the battery indicates a current level of charge in the battery relative to its total capacity, expressed as a percentage. The internal voltage of the battery is modeled as a controlled voltage source 204, a value of which is continuously adjusted based on the current SoC 202 of the battery to reflect a real-time electrochemical behavior of the battery. As depicted in FIG. 2, the controlled voltage source 204 is connected in series with an impedance (Z) 206 of the battery, which models an internal resistance of the battery and causes a voltage drop proportional to a current flowing through the impendence (Z) 206. A resulting output voltage $E_o$ 208 of the battery is determined by using the below-defined equation (1).

$$E_o = E_i(SoC) - I_{bxi}Z \qquad (1)$$

where $I_{bxi}$ is an instantaneous battery current and $E_i$ (SoC) represents the internal voltage of the battery, which dynamically varies as a function of the SoC 202 of the battery. Ibxi refers to the battery current in which x is the battery number, given by the symbol n in FIG. 1B, i.e. 116a, ..., 116n. The electrical model 200 indicates how the voltage drop across the internal impedance (Z) 206 reduces an effective terminal voltage during discharging conditions.

In an aspect, the SoC 202 of the battery may be estimated using equation (2):

$$SoC = SoC_{int} + 1/C\_nom \int I_{bxi} dt \qquad (2)$$

where $SoC_{int}$ is an initial state of charge and C_nom is a nominal capacity of the battery as specified by a manufacturer. In an aspect, the complexity of the electrical model 200 of the battery increases as the number of losses (e.g., energy losses) considered in the electrical model 200 increases.

Figure 3:
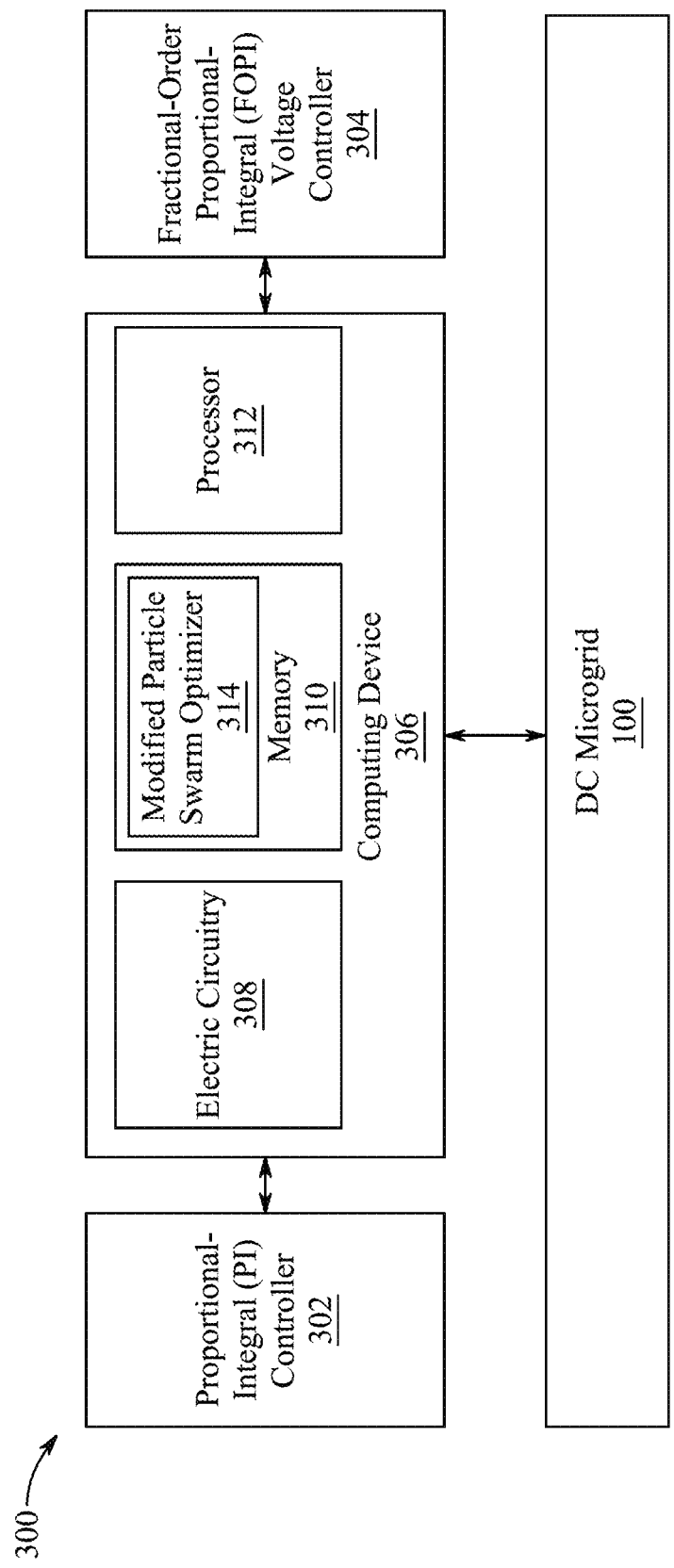
FIG. 3 illustrates an exemplary block diagram of a control system for the DC microgrid, according to certain embodiments.

FIG. 3 illustrates an exemplary block diagram of a control system 300 for the DC microgrid 100. The control system 300 is configured to monitor and regulate the DC bus voltage and manage power flow between the distributed generator circuit 106, the constant load power circuit 108, and multiple DC battery circuits 104. The control system 300 is also configured to ensure balanced charging and discharging of the DC battery 116 of the corresponding DC battery circuits 104 by controlling the switches 126 (i.e., buck-boost switches) and converters (i.e., the boost converter 134 and the buck converter 140) through the PWM signals based on real-time parameters such as the DC bus voltage and SoC (corresponds to SoC 202 of FIG. 2) of each DC battery 116.

The control system 300 includes the DC microgrid 100 (explained in detail in FIGS. 1A and 1B), a proportional integral (PI) controller 302, a fractional order proportional integral (FOPI) voltage controller 304, and a computing device 306.

The PI controller 302 is operably connected to the computing device 306 and is configured to regulate various operational parameters (e.g., voltage, current, power output, and converter duty cycles) of the DC microgrid 100 to maintain stability and optimize power flow. For instance, the PI controller 302 may regulate the output voltage or current of power converters interfacing with the distributed generator circuit 106, the constant load power circuit 108, and the DC battery circuits 104. In an aspect, within the distributed generator circuit 106, the PI controller 302 may process an error between a reference current and a measured current (i.e., an actual current generated by the distributed generator unit 132) to ensure accurate power delivery to the DC bus 102 based on a desired setpoint, particularly when employing MPPT techniques in the renewable sources. In another aspect, the PI controller 302 may be used in the constant load power circuit 108 to regulate the voltage across the resistive load 110 by processing an error between a reference voltage and a measured voltage across the parallel connected capacitor $C_{c1}$ 142, thereby ensuring constant power draw from the DC bus 102. In yet another aspect, the PI controller 302 may be used in the DC battery circuits 104 to regulate a duty cycle of the bidirectional buck-boost converters 118 to manage the charging and discharging operations while maintaining the voltage stability across the DC bus 102. As used herein, the term "duty cycle" refers to a ratio of a time a switch is "on" (or active) to a total time of one complete cycle (on+off), expressed as a percentage. In the present disclosure, the duty cycle controls the amount of power delivered, by adjusting width of the PWM signals.

The FOPI voltage controller 304 is connected to the computing device 306 and is configured to regulate and stabilize the voltage of the DC battery circuits 104 within the DC microgrid 100. In an aspect, the FOPI voltage controller 304 may be configured to provide enhanced precision and flexibility in voltage regulation compared to traditional controllers by utilizing fractional order integration, which allows for more dynamic control of the voltage. The FOPI voltage controller 304 includes a set of adjustable voltage control parameters. In an aspect, the set of adjustable voltage control parameters includes a proportional gain parameter $K_{pi}$, which determines a response of the FOPI voltage controller 304 based on a voltage error between nominal and actual voltages; an integral gain parameter $K_{ii}$, which integrates the voltage error over time to eliminate steady-state errors; and a fractional order of integration parameter λ, which has a fractional value between zero and two, providing the FOPI voltage controller 304 with the ability to handle more complex dynamics and optimize voltage regulation.

The computing device 306 is connected to each control input terminal 130 of the corresponding switches 126, the DC bus 102, the distributed generator circuit 106, and the constant load power circuit 108 of the DC microgrid 100. In an aspect, the computing device 306 is connected to the control input terminals 130 of the corresponding switches 126, the DC bus 102, the distributed generator circuit 106, and the constant load power circuit 108 through wired electrical connections. For example, the computing device 306 may be electrically connected to the control input terminals 130 of the corresponding switches 126 through low-voltage control signal lines. The low voltage control signal lines carry the PWM signals generated by the computing device 306 to modulate the on/off state of the corresponding switches 126. The computing device 306 may be electrically connected to the DC bus 102 through voltage and current sensing modules. The voltage and current sensing modules may be configured to interface with the DC bus 102 using analog or digital sensors and to relay real-time voltage and current measurements to the computing device 306 for monitoring and control purposes. The computing device 306 may be connected to the distributed generator circuit 106 through a communication interface (e.g., recommended standard (RS-485), controller area network bus (CAN) bus). The computing device 306 may be connected to the constant load power circuit 108 through a load monitoring module (co-located or integrated within the constant load power circuit 108). The load monitoring module includes current and voltage sensors that are coupled to the constant load power circuit 108 and are configured to measure real-time power consumption (i.e., sensor readings). These sensor readings may be transmitted to the computing device 306 through analog or digital signal lines.

In another aspect, the computing device 306 is connected to the control input terminals 130 of the corresponding switches 126, the DC bus 102, the distributed generator circuit 106, and the constant load power circuit 108 through wireless or networked communication. For example, the computing device 306 may be connected to the corresponding switches 126 through a wireless relay controller that receives digital control signals to actuate the corresponding switches 126. The computing device 306 may be connected to the DC bus 102 through a wireless data acquisition unit. The wireless data acquisition unit includes one or more sensors electrically coupled to the DC bus 102 and a wireless transceiver configured to transmit real-time DC voltage and current measurements to the computing device 306 over a wireless protocol such as ZigBee, Wireless Fidelity (Wi-Fi), Bluetooth low energy (BLE), and the like. Also, the computing device 306 may wirelessly communicate with the distributed generator circuit 106 using a wireless communication protocol. For example, the distributed generator circuit 106 may include an integrated wireless transceiver (e.g., ZigBee, Wi-Fi, or Bluetooth) connected to its local control unit. The transceiver may be configured to receive control instructions from the computing device 306 and transmit real-time operating data to the computing device 306. The computing device 306 may communicate with the constant load power circuit 108 using a wireless communication interface. For example, a wireless-enabled load monitoring unit is integrated with the constant load power circuit 108, including sensors and a wireless module (e.g., ZigBee, Wi-Fi, or Bluetooth) to communicate with the computing device 306.

The computing device 306 includes an electric circuitry 308, a memory 310, and at least one processor 312 (hereinafter referred to as the processor 312). The electric circuitry 308 in the computing device 306 is configured to interface with various hardware components within the DC microgrid 100 (e.g., DC batteries 116, distributed generator unit 132, buck converter 140, boost converter 134). In an aspect, the electric circuitry 308 may include analog-to-digital converters (ADCs), digital-to-analog converters (DACs), voltage and current sensing circuits, signal conditioning circuits, switching elements, and the like. In an aspect, the electric circuitry 308 ensures that the processor 312 accurately reads real-time signals associated with the voltage, current, power demand, and SoC from the DC battery circuits 104 and load terminals (e.g., resistive load terminals, constant power load terminals). In another aspect, the electric circuitry 308 may also enable the processor 312 to transmit the control signals to switching elements in order to regulate the energy flow and maintain the stability of the DC bus 102. Therefore, the processor 312, through the electric circuitry 308, actively manages the switching behavior inside the converters to maintain the power balance and bus voltage stability. In yet another aspect, the electric circuitry 308 may also ensure that the processor 312 has necessary power and clock signals to perform tasks associated with the control system 300.

Figure 8:
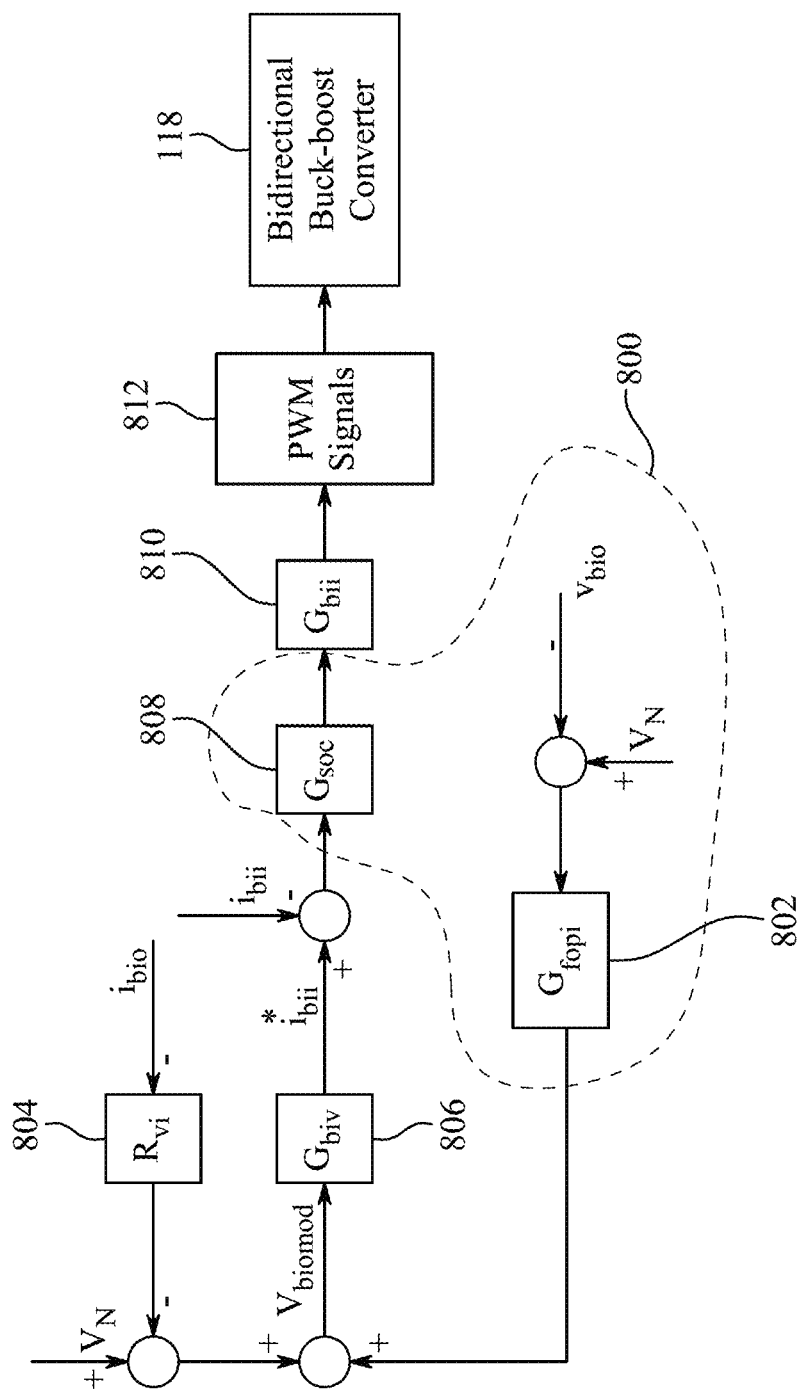
FIG. 8 illustrates a double-loop control framework combining voltage regulation and state of charge (SoC) balancing within a control model of DC battery circuits, according to certain embodiments.

The memory 310 is configured to store control methodologies, such as, but not limited to, the FOPI voltage controller 304, a modified particle swarm optimizer (MPSO) 314, a PWM generation approach (e.g., for the bidirectional buck-boost converters 118, the buck converter 140, the boost converter 134), a double loop control framework 800 (as shown in FIG. 8), and the like. The memory 310 is also configured to store battery management data, such as, but not limited to, real-time SoC of each DC battery 116, voltage and current measurements of each DC battery 116, charge-discharge history logs, and the like. In an aspect, the memory 310 may be configured to store a power reference value $P_{dgref}$ a voltage reference value $V_{dg}$, a distributed generator current $I_{dg}$, and the like. The memory 310 is also configured to store computer-readable program instructions for controlling the DC bus voltage and balancing the SoC of the DC battery circuits 104. The memory 310 may include any computer-readable medium known in the art, including, for example, static random-access memory (SRAM), read-only memory (ROM), erasable programmable ROM, flash memories, hard disks, optical disks, magnetic tapes, and the like. Aspects of the present disclosure are intended to include or otherwise cover any type of the memory 310, including known, related art, and/or later developed technologies.

The processor 312 is configured to fetch and execute the computer-readable program instructions stored in the memory 310. The processor 312 is configured to execute a sequence of machine-readable instructions, which may be embodied in a program or software. The instructions can be directed to the processor 312, which may subsequently execute the instructions to implement methods of the present disclosure. The processor 312 may be implemented as one or more microprocessors, microcomputers, microcontrollers, digital signal processors, central processing units, state machines, logic circuitries, and/or any devices that manipulate signals based on operational instructions.

In one aspect, the computing device 306 is configured to perform all functions associated with the control system 300 through the processor 312, which executes the program instructions.

The computing device 306 is configured to determine the DC bus voltage of the DC bus 102 in real-time. In an aspect, the computing device 306 may be configured to determine the DC bus voltage of the DC bus 102 based on electrical measurements associated with the corresponding DC battery circuits 104. For example, each DC battery 116 may output the voltage through its corresponding bidirectional buck-boost converter 118, and the computing device 306 may acquire the voltage either directly via voltage sensors electrically coupled to each DC battery 116 or indirectly via feedback signals from the bidirectional buck-boost converter 118.

Depending on the electrical configuration, a process for determining the DC bus voltage may vary. In one aspect, when the DC battery circuits 104 are electrically connected in series, the computing device 306 may determine the DC bus voltage as a summation of individual voltages from each of the DC batteries 116. In another aspect, when the DC battery circuits 104 are electrically connected in parallel, the computing device 306 may determine the DC bus voltage as a common voltage across the parallel-connected batteries or as an average voltage of respective outputs. The computing device 306 is further configured to compare the measured DC bus voltage against a predetermined acceptable range centered around a nominal voltage $V_N$, thereby enabling the detection of over-voltage or under-voltage conditions and ensuring the control system 300 operates within stable limits. The term "nominal voltage $V_N$" as used herein, refers to a predefined reference voltage level for the DC bus 102 within the DC microgrid 100. The nominal voltage serves as a baseline or target value for regulating the operation of interconnected components, such as the DC battery circuit 104, the distributed generator circuit 106, and the constant load power circuit 108. The term "stable limits," as used herein, refers to a predefined operational voltage range typically ±5% or ±10% of the nominal voltage (e.g., 48 V, 400V, etc.) within which the control system 300 functions safely, reliably, and efficiently. The stable limits ensure proper operation of all components in the DC microgrid 100, including the DC battery circuit 104, the distributed generator circuit 106, and the constant load power circuit 108. If the DC bus voltage deviates from the stable limits, the computing device 306 may be configured to generate corrective actions, such as adjusting the PWM signals associated with the bidirectional buck-boost converters 118 of the corresponding DC battery circuits 104 to restore the voltage stability and prevent damage to connected circuits or interruption of service.

In an aspect, the computing device 306 is configured to adjust the PWM signals by using the FOPI voltage controller 304, which generates a compensation voltage $v_{com}$ to correct any detected deviations from the nominal voltage $V_N$. In an aspect, the computing device 306 may utilize the FOPI voltage controller 304 to continuously monitor a voltage error between the nominal voltage $V_N$ and an actual output voltage $v_{bio}$ of each DC battery circuit 104. In an aspect, the voltage error may be calculated using equation (3):

$$e(t) = V_N - v_{bio} \quad (3)$$

where e(t) represents the voltage error, serving as input to the FOPI voltage controller 304. In other words, the computing device 306 is configured to apply the voltage error e(t) to the FOPI voltage controller 304.

To process the voltage error, the FOPI voltage controller 304 is configured to calculate a FOPI transfer function $G_{FOPI}$ for each DC battery circuit 104. In an aspect, the FOPI transfer function is calculated by using equation (4):

$$G_{FOPI} = K_{pi} + \frac{K_{ii}}{s^{\lambda_i}} \quad (4)$$

where $K_{pi}$ represents the proportional gain, $K_{ii}$ represents an integral gain, $\lambda_i \in (0,2)$ is the fractional order of integration, and s represents a complex frequency variable in a Laplace domain.

The FOPI voltage controller 304 is configured to apply the calculated FOPI transfer function $G_{FOPI}$ to the voltage error e(t) to compute the compensation voltage $v_{com}$. The compensation voltage $v_{com}$ is calculated by using a defined equation (5):

$$v_{com} = G_{FOPI}(V_N - v_{bio}) \quad (5)$$

The compensation voltage $v_{com}$ dynamically adjusts the control signal to be sent to the control input terminals 130 of the corresponding switches 126, correcting any deviation from the nominal voltage $V_N$ and enhancing system stability.

In one aspect, the computed compensation voltage $v_{com}$ is used in conjunction with a droop-based voltage reference to generate a modified voltage reference $v_{biomod}$ for each DC battery circuit 104. The droop-based voltage reference is defined as:

$$v^*_{bio} = V_N - I_{bio} R_{vi} \quad (6)$$

where $v^*_{bio}$ represents the droop-based voltage reference $i_{bio}$ represents an output current of $i^{th}$ battery and $R_{vi}$ represents a droop resistance of $i^{th}$ battery controller. Equation (6) indicates a conventional droop method that introduces voltage variation based on the current, which can lead to poor SoC balancing and DC bus voltage instability. However, in the FOPI voltage controller 304, the computing device 306 is configured to generate the modified voltage reference $v_{biomod}$ for each DC battery 116, by adding the compensation voltage $v_{com}$ to the droop-based voltage reference $v^*_{bio}$, using equation (7):

$$v_{biomod} = v^*_{bio} + v_{com} \quad (7)$$

The modified voltage reference $v_{biomod}$ enhances the accuracy of voltage regulation by correcting dynamic voltage deviations and compensating for inherent limitations of the conventional droop method, such as inaccurate SoC balancing and bus voltage fluctuations.

In an aspect, the modified voltage reference $v_{biomod}$ is used to modify the duty cycle of the PWM signals that control the switches 126 of the corresponding bidirectional buck-boost converters 118 in each DC battery circuit 104. For example, the modified voltage reference $v_{biomod}$ may be used as the target output voltage for the corresponding bidirectional buck-boost converters 118. The computing device 306 may be configured to compare the actual output voltage $v_{bio}$ of each DC battery circuit 104 with the modified voltage reference $v_{biomod}$ and generate the control signal that modifies the duty cycle accordingly. This modification changes the on-time and off-time of the switches 126 of the corresponding bidirectional buck-boost converter 118, which in turn regulates the energy transfer from each DC battery 116 to the DC bus 102.

By modifying the PWM signals in real-time, the computing device 306 dynamically changes the output voltage levels of the individual DC battery circuits 104, thereby influencing the overall DC bus voltage. This voltage control approach enables the control system 200 to maintain the DC bus voltage within the stable limits, even in the presence of fluctuating load demands or varying battery output conditions.

In addition to regulating the DC bus voltage, the computing device 306 is configured to measure the SoC of each DC battery circuit 104 within the DC microgrid 100. In an aspect, the computing device 306 may be configured to measure the SoC of each DC battery circuit 104 by utilizing a combination of real-time sensor data and estimation approaches. For example, the computing device 306 may receive real-time input signals from one or more sensors disposed within or proximate to each DC battery 116. The sensors are configured to measure operational parameters, such as, but not limited to, voltage, current, temperature, and the like of the respective DC batteries 116. The computing device 306 may then utilize these parameters to calculate the SoC for each DC battery circuit 104.

In another aspect, the computing device 306 may calculate the SoC using a Coulomb counting approach, where the current flowing into or out of the DC battery 116 is integrated over time to determine the amount of charge delivered or absorbed by the DC battery 116. The resulting charge value may be used in conjunction with known battery capacity to determine the current SoC. Additionally, the computing device 306 may implement a voltage-based estimation approach, where the measured voltage of each DC battery 116 is compared with stored voltage-to-SOC characteristic curves. Such curves represent a relationship between an open-circuit voltage of the DC battery 116 and its SoC under various loading and temperature conditions. In some aspects, the computing device 306 may combine the Coulomb counting and voltage-based estimation approaches to increase accuracy and reduce drift errors over time, such as by applying voltage-based corrections at periodic intervals to Coulomb-counted SoC values.

Once the SoC of each individual DC battery 116 is determined, the computing device 306 is further configured to calculate an average SoC of the DC battery 116 of the corresponding DC battery circuits 104, by using equation (8):

$$SoC_{avg} = \frac{1}{N}\sum_{i=1}^{N} SoC_i, \quad (8)$$

where N is the total number of DC batteries 116, $SoC_i$ is the SoC of a first DC battery of the DC batteries 116 and $SoC_{avg}$ is the average SoC of the DC battery 116 of the corresponding DC battery circuits 104.

The computing device 306 is further configured to calculate a deviation of the SOC of each DC battery from the average SoC of the DC battery circuits 104 by comparing the SoC of each individual DC battery 116 with the average SoC across all DC batteries 116 in the corresponding DC battery circuits 104. The deviation of the SOC of each DC battery from the average SoC is represented by the following equation (9):

$$\Delta SoC_i = SoC_i - SoC_{avg} \quad (9)$$

where $\Delta SoC_i$ represents the deviation of the SoC of the $i^{th}$ battery.

In an aspect, the SoC deviation quantifies whether a corresponding DC battery is overcharged or undercharged relative to other DC batteries. In order to balance the SoC deviations, the computing device 306 is configured to formulate an SoC transfer function $G_{SoC}$ based on the average SoC of the DC batteries 116 of the DC battery circuits 104. The SoC transfer function $G_{SoC}$ is calculated using equation (10):

$$G_{SoC} = \frac{1}{(R_{vi})n(SoC_i - SoC_{avg})}, \quad (10)$$

where $R_{vi}$ is a droop resistance of the first DC battery of the plurality of DC batteries 116, and n is a charging state of the corresponding DC battery 116.

In an aspect, based on the SoC transfer function $G_{SoC}$, the computing device 306 is configured to adjust the duty cycle of the PWM signals that control the switches 126 of the bidirectional buck-boost converters 118. By modifying the PWM signals in real-time, the computing device 306 balances the SoC of each DC battery circuit 104. Therefore, the computing device 306 regulates the charging and discharging power of each DC battery circuit 104 such that overcharged DC batteries are commanded to supply less power or absorb more power, while undercharged DC batteries are commanded to supply more power or absorb less power. As a result, the SoC levels across the DC battery circuits 104 are dynamically equalized over time.

In an exemplary implementation, the computing device 306 maps the output of the SoC transfer function $G_{SoC}$ to a corresponding adjustment in the duty cycle of the PWM signals that control the bidirectional buck-boost converters 118. When the SoC deviation is positive (indicating overcharge), the computing device 306 reduces the duty cycle to lower a charging current or increases a discharging current of the corresponding DC battery 116. Conversely, when the SoC deviation is negative (indicating undercharge), the computing device 306 increases the duty cycle to allow greater charging or reduce discharging, thereby facilitating controlled SoC balancing across the DC battery circuits 104.

In an aspect, the computing device 306 is configured to implement a double-loop control framework 800 (further illustrated and explained in FIG. 8) for coordinated regulation of the DC bus voltage and balancing the SoC across the DC battery circuits 104 within the DC microgrid 100. The computing device 306 is configured to combine the compensation voltage $v_{com}$ generated by the FOPI voltage controller 304, and the SoC transfer function $G_{SoC}$, derived from the SoC deviations among the DC batteries 116, into a double control loop of the DC battery circuits 104 to obtain a control model. The control model represents a combined influence of DC bus voltage regulation (outer loop) and SoC balancing (inner loop) on power-sharing and voltage reference signals used to generate PWM duty cycles.

The computing device 306 is further configured to modify the control model to develop a small signal model 900 (illustrated in FIG. 9) based on bidirectional buck-boost converter small signal equations associated with the DC battery circuits 104. In the present disclosure, the term "small-signal model" refers to a linearized representation of nonlinear dynamics of the bidirectional buck-boost converter 118 under small perturbations around a predefined operating point. For instance, variations in the duty cycle or load current are treated as small deviations from steady-state values, allowing the behavior of the bidirectional buck-boost converter 118 to be expressed using linear transfer functions.

In one aspect, the small-signal model is developed by first deriving differential equations representing non-linear dynamics of the bidirectional buck-boost converter 118 of each DC battery circuit 104. As used herein, the term "non-linear dynamics" refers to a system where the output is not directly proportional to the input (i.e., small changes in the input do not always result in proportional changes in the output). The differential equations characterize the behavior of the bidirectional buck-boost converter 118 under normal operating conditions, capturing nonlinear relationships among key electrical variables, such as the duty cycle, an input voltage of the corresponding DC battery 116, an input current of the corresponding DC battery 116, and an output voltage of the corresponding DC battery 116 of the bidirectional buck-boost converter 118 under the normal operating conditions. In other words, the bidirectional buck-boost converter 118 is modelled using four variables, as discussed above. These variables are related in time-domain form through the following non-linear differential equations (11)-(12):

$$v_{bi} = v_{bio}(1-d) + L_{bi}\frac{di_{bii}}{dt}, \quad (11)$$

$$(1-d)i_{bii} = C_{bi}\frac{dv_{bio}}{dt} + i_{bio}, \quad (12)$$

where $v_{bi}$ represents an input voltage of the $i^{th}$ battery, $v_{bio}$ represents an output voltage of $i^{th}$ battery, d represents the duty cycle, $L_{bi}$ represents an inductance of the $i^{th}$ DC battery, $i_{bii}$ represents an input current of the $i^{th}$ DC battery, $C_{bi}$ represents a capacitance of the $i^{th}$ DC battery and $i_{bio}$ represents an output current of the $i^{th}$ DC battery.

To enable small-signal analysis suitable for control design and system stability evaluation, each state variable is decomposed into its steady-state component and a small perturbation, such that:

$$d = D + \Delta d \quad (13)$$

$$v_{bio} = V_{bio} + \Delta v_{bio} \quad (14)$$

$$i_{bio} = I_{bio} + \Delta i_{bio} \quad (15)$$

$$i_{bii} = I_{bii} + \Delta i_{bii} \quad (16)$$

where D is a steady state of duty cycle, Δd represents a small perturbation in the duty cycle, $V_{bio}$ represents a steady-state output voltage of the $i^{th}$ DC battery, $\Delta v_{bio}$ represents a small deviation in the output voltage from the steady state, $I_{bio}$ represents a steady-state output current of the $i^{th}$ DC battery, $\Delta i_{bio}$ represents a small deviation in output current from the steady-state, $I_{bii}$ is the steady-state input current of the $i^{th}$ DC battery and $\Delta i_{bii}$ represents a small deviation in input current from the steady state.

Substituting the decomposed small-signal representations of the variables into the original nonlinear equations and neglecting higher-order perturbation terms yields a set of linearized equations. The linearized equations define the small-signal model of the bidirectional buck-boost converter 118, capturing how small deviations in the duty cycle affect voltage and current dynamics of the DC microgrid 100. For example, a slight increase in the duty cycle Δd results in a change in the output voltage $\Delta v_{bio}$, which may be analyzed using transfer functions derived from a linearized model. The transfer functions are defined as follows:

$$G_{vbid} = \frac{\Delta v_{bio}}{\Delta d} = \frac{-L_{bi}I_{bi}s - r_{bi}I_{bi} + (1-D)V_{bio}}{L_{bi}C_{bi}s^2 + r_{bi}C_{bi}s + (1-D)^2} \quad (17)$$

$$G_{vibi} = \frac{\Delta v_{bio}}{\Delta i_{bio}} = \frac{-L_{bi}s - r_{bi}}{L_{bi}C_{bi}s^2 + r_{bi}C_{bi}s + (1-D)^2} \quad (18)$$

$$G_{ibid} = \frac{\Delta i_{bio}}{\Delta d} = \frac{CV_{bio}s + (1-D)I_{bi}}{L_{bi}C_{bi}s^2 + r_{bi}C_{bi}s + (1-D)^2} \quad (19)$$

$$G_{ibii} = \frac{\Delta i_{bi}}{\Delta i_{bio}} = \frac{(1-D)}{L_{bi}C_{bi}s^2 + r_{bi}C_{bi}s + (1-D)^2} \quad (20)$$

where $G_{vbid}$ represents a voltage-to-duty cycle transfer function, indicating how a small change in the duty cycle (Δd) affects the output voltage ($\Delta v_{bio}$) of the $i^{th}$ DC battery; $G_{vibi}$ represents a voltage-to-current transfer function, indicating how changes in the output current ($\Delta i_{bio}$) affect the output voltage ($\Delta v_{bio}$) of the $i^{th}$ DC battery; $G_{ibid}$ represents a current-to-duty cycle transfer function, indicating how variations in the duty cycle (Δd) affect the output current ($\Delta i_{bio}$) of the $i^{th}$ DC battery; and $G_{ibii}$ represents an input current-to-output current transfer function, which shows how variations in the output current ($\Delta i_{bio}$) influences the input current ($\Delta i_{bi}$) of the $i^{th}$ DC battery.

The computing device 306 is further configured to generate, by the FOPI voltage controller 304, a FOPI control transfer function for each DC battery circuit 104 based on the developed small-signal model. In an aspect, the FOPI voltage controller 304 may be configured to simplify and manipulate the small-signal model to derive an analytical transfer function that represents a relationship between the perturbation in the output voltage ($\Delta v_{bio}$) and the perturbation in the output current ($\Delta i_{bio}$) of the $i^{th}$ DC battery circuit. The derived FOPI control transfer function is expressed as:

$$\frac{\Delta v_{bio}}{\Delta i_{bio}} = \frac{num1 - num2}{den}, \quad (21)$$

where $$num1 = G_{vibi}(1 + G_{SoC}G_{bii}G_{ibid}), \quad (22)$$

$$num2 = (R_{vi}G_{biv}G_{SoC}G_{iis} + G_{ibii})G_{SoC}G_{bii}G_{vbid}, \quad (23)$$

$$den = (1 + G_{SoC}G_{bii}G_{ibid}) + (1 + G_{FOPI})G_{biv}G_{SoC}G_{iis} \cdot G_{bii}G_{vbid}, \quad (23)$$

where num 1 and num 2 represent a first numerator term and a second numerator term, respectively, and den represents a denominator term.

The computing device 306 is configured to tune a plurality of parameters of the FOPI control transfer function associated with the FOPI voltage controller 304. In an aspect, the tuning is performed by using the MPSO 314 stored in the memory 310. In one aspect, the tuned parameters may be used to dynamically regulate the DC bus voltage of the DC microgrid 100 under varying load conditions. In an aspect, the parameters refer to the set of adjustable voltage control parameters (as described above) of the FOPI voltage controller 304.

In an exemplary aspect, the computing device 306 may be configured to tune the parameters of the FOPI control transfer function by performing an optimization procedure, targeting the transfer functions derived from the small-signal model of the bidirectional buck-boost converter 118 associated with each DC battery circuit 104. Specifically, the tuning process aims to minimize an integral of squared error (ISE) in a step response of the FOPI control transfer function.

In other words, the tuning process involves minimizing the ISE between actual and desired step responses of variables, such as output voltage ($\Delta v_{bio}$) and output current ($\Delta i_{bio}$). As used herein, the term "step response" refers to an output behavior of the FOPI voltage controller 304 when the FOPI voltage controller 304 is subjected to a sudden step change in input, such as a change in load or reference setpoint. The ISE is a measure used to quantify the difference between the actual response and the desired response over time. The optimization is performed by using an objective function:

$$obj = \int_0^T \Delta err^2 dt, \quad (25)$$

where T denotes the total time for the step response evaluation and Δerr is a time-varying error between the actual response (e.g., output voltage or current) and the desired response (e.g., target voltage or current) of the control system 300 under a step input perturbation.

In an aspect, the optimization is carried out over a set of decision variables corresponding to the FOPI voltage controller parameters. These parameters are subject to defined constraints such as:

$$K_{pi}^{min} \leq K_{pi} \leq K_{pi}^{max}, \tag{26}$$

$$K_{ii}^{min} \leq K_{ii} \leq K_{ii}^{max} \tag{27}$$

$$\alpha^{min} <= \lambda <= \lambda^{max} \tag{28}$$

$$n^{min} <= n <= n^{max} \tag{29},$$

where $K_{pi}^{min}$ and $K_{pi}^{max}$ represent a minimum and maximum allowable value for the proportional gain, $K_{ii}^{min}$ and $K_{ii}^{max}$ represent a minimum and maximum allowable value for the integral gain, $\lambda^{min}$ and $\lambda^{max}$ represent a minimum and maximum allowable value for the fractional order of integration, n is the population size or number of particles in an optimization swarm, $n^{min}$ and $n^{max}$ represent a minimum and maximum allowable value for the population size.

In operation, the computing device 306 executes the MPSO 314 as follows: the computing device 306 first initializes known system parameters and control parameters that define operational and electrical characteristics of the DC microgrid 100. The parameters may include, but are not limited to, component values such as the inductances $L_{bi}$, the capacitances $C_{bi}$, the resistances rei, system-level constants, such as the duty cycle d, the nominal DC bus voltage $V_N$, the droop resistance $R_{vi}$, and associated control path transfer functions, including, but not limited to, $G_{bii}$, $G_{biv}$, and the like. In an aspect, values of the corresponding parameters may be derived from physical measurements, simulation data, or empirical system modeling and these values are used to construct the transfer functions defined in equations (17) through (20).

Subsequently, the computing device 306 is configured to initialize optimizer-specific parameters, such as, but not limited to, the maximum number of iterations, learning factors (cognitive and social coefficients), constriction factors (to ensure stable convergence), population size (i.e., number of particles) and the like. The computing device 306 is further configured to generate an initial population of a random set of adjustable voltage control parameters within predefined limits. Each set of adjustable voltage control parameters corresponds to a candidate solution and is represented by a particle in a MPSO framework. The set of adjustable voltage control parameters to be optimized includes the proportional gain $K_{pi}$, the integral gain $K_{ii}$ and the fractional-order integration parameter, which define the behavior of the FOPI voltage controller 304. Each adjustable voltage control parameter is initialized by generating a random value within an allowable range defined by lower and upper bounds as defined in equations (26)-(29).

The computing device 306 is further configured to simulate the step response of the DC microgrid 100 for each randomly generated set of voltage control parameters (i.e., particle) and calculate the objective function. The parameter set of each particle is applied to a simulation model of the DC microgrid 100, incorporating small-signal transfer functions developed using the initialized parameters. In an aspect, a response of the control system 300 to a predefined input disturbance (e.g., load power fluctuation or DG variation) may be evaluated, and the objective function, as defined in equation (25), may be computed to quantify a control performance.

The computing device 306 is further configured to evaluate and store best control performance values, locally and globally, based on an objective function. For each particle, its current position (i.e., control parameters) and corresponding objective value are compared to a best solution. If a current objective value is superior, a local best position (Pbest) of the particle is updated.

Simultaneously, a global best position (Gbest) across all particles is identified, i.e., the set of voltage control parameters with a lowest (optimal) objective value among the entire population. The global best position (Gbest) serves as a collective learning reference for all particles, driving the swarm toward convergence on an optimal or near-optimal solution.

The computing device 306 is further configured to update a velocity vector for each particle in the population based on its current velocity, a difference between its local best position (Pbest) and a current position, and the difference between the global best position (Gbest) and the current position. The velocity update is computed using an MPSO velocity equation (30):

$$v_i^{t+1} = \chi[v_i^t + c_1 r_1(Pbest_i - x_i^{(t)}) + c_2 r_2(Gbest - x_i^{(t)})], \tag{30}$$

where $v_i^{t+1}$ represents the velocity update of particle i, $v_i^t$ represents the current velocity of particle i, $x_i^{(t)}$ represents the current position (control parameters), $r_1$, $r_2$ represents random values ranging from 0 to 1, $c_1$, $c_2$ are cognitive and social learning factors, respectively, and $\chi$ represents the constriction factor to ensure convergence.

The computing device 306 is further configured to generate a new population based on the updated velocities. This step includes updating the position of each particle using the updated velocity. The updated position corresponds to a new set of candidate control parameters. In some aspects, boundary conditions may be applied to ensure that each control parameter remains within predefined limits. If any updated parameter exceeds its upper or lower bound, it is clipped accordingly. The new population replaces a previous generation and is used in the next iteration to evaluate new objective function scores. The computing device 306 is further configured to determine whether a maximum number of iterations (or a convergence threshold) has been reached. In an aspect, if the maximum number of iterations has not been reached, then the computing device 306 is configured to evaluate the step response and update the objective function scores for the new population. This iterative process continues, progressively refining the voltage control parameters. In another aspect, the computing device 306 is configured to output the optimized voltage control parameters, including the optimal values of $k_{pi}$, $k_{ii}$ and $\lambda$. These values represent a final global best solution from the MPSO 314 and are used to configure the FOPI voltage controller 304 implemented in the control system 300 of the DC microgrid 100.

The computing device 306 is configured to utilize the optimized control parameters to regulate the DC bus voltage in real-time by minimizing the error in the dynamic response, thereby enhancing stability, responsiveness, and accuracy of the control system 300. For example, a sudden increase in the load connected to the DC microgrid 100 may causes the output voltage to drop below the desired level. The computing device 306, by using the optimized control parameters, adjusts the output of the FOPI voltage controller 304 to correct the voltage drop. The optimized control parameters minimize the error between the desired and actual output voltage, restoring the voltage to its target value while maintaining system stability.

Figure 4:
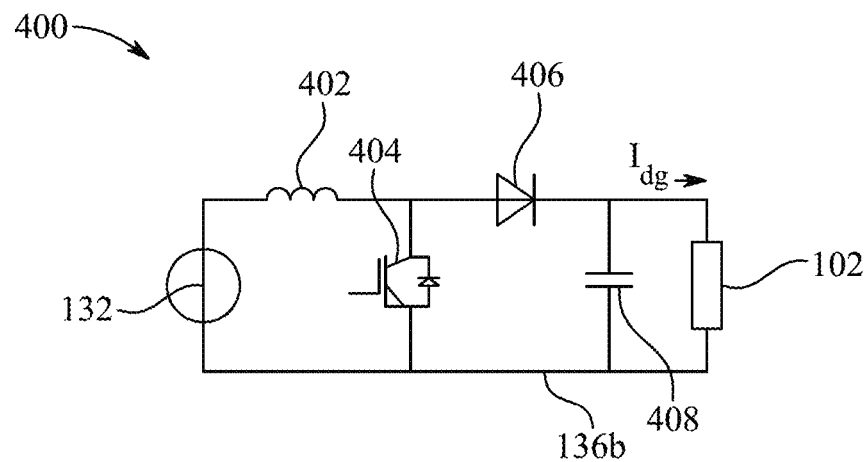
FIG. 4 illustrates an exemplary boost converter circuit, according to certain embodiments.

FIG. 4 illustrates an exemplary boost converter circuit 400. In one aspect, the boost converter circuit 400 corresponds to the boost converter 134 of FIG. 1A. The boost converter circuit 400 includes a boost converter inductor 402, a boost converter switch 404, a forward diode 406, and a boost converter capacitor $C_{dg}$ 408.

The boost converter inductor 402 is connected to the distributed generator unit 132. In an aspect, the boost converter inductor 402 is connected to the at least one generator of renewable energy. In an aspect, the boost converter inductor 402 may be directly connected to the distributed generator unit 132. In another aspect, the boost converter inductor 402 may be connected to the distributed generator unit 132 through an intermediate power conditioning unit (e.g., a rectifier or an inverter). In yet another aspect, the boost converter inductor 402 may be connected to the distributed generator unit 132 through a common DC link.

The boost converter inductor 402 is configured to receive current $I_{dg}$ from the distributed generator unit 132 and store energy in the form of a magnetic field when the boost converter switch 404 is in a closed state. The boost converter switch 404 is operably connected to the computing device 306 (as shown in FIG. 3) and configured to be controlled by the PWM signals received from the computing device 306. The PWM signals are configured to control the delivery of the distributed generator current $I_{dg}$ to the DC bus 102. During the closed state of the boost converter switch 404, the current $I_{dg}$ flows from the distributed generator unit 132 through the boost converter inductor 402 to the DC bus 102, thereby causing the boost converter inductor 402 to accumulate the energy in the form of the magnetic field. Upon transition of the boost converter switch 404 to an open state in response to the PWM signals, the boost converter inductor 402 is configured to discharge the stored energy, thereby generating the voltage that is additive to the input voltage of the distributed generator 132.

For example, the boost converter inductor 402 is a passive electronic component that resists changes in the current. When the current flows through the boost converter inductor 402, the boost converter inductor 402 creates a magnetic field around it, which stores the energy. When the boost converter switch 404 is in the closed state (i.e., conducting), the boost converter inductor 402 allows the current to flow, and the distributed generator unit 132 sends the current through the boost converter inductor 402. As the current flows through the boost converter inductor 402, the magnetic field of the boost converter inductor 402 strengthens. The energy stored in the magnetic field of the boost converter inductor 402 is proportional to the amount of current flowing through the boost converter inductor 402. The more current that flows through the boost converter inductor 402, the greater the energy stored in its magnetic field. This is based on the principle of inductance, which states that the energy stored in the boost converter inductor 402 is given by an equation (31):

$$E = \frac{1}{2} * L * I^2, \tag{31}$$

where E is the energy stored in the boost converter inductor 402, L is the inductance of the boost converter inductor 402, and I is the current flowing through the boost converter inductor 402. When the boost converter switch 404 opens, the magnetic field begins to collapse, and the energy stored in the magnetic field is converted back into the electrical energy. The electrical energy is then transferred to the DC bus 102, depending on a design and operational mode of the converter.

The boost converter switch 404 is connected between the boost converter inductor 402 and the negative connector 136b of the boost converter circuit 400. The boost converter switch 404 may be a semiconductor switch such as, but not limited to, MOSFET switch, IGBT switch, bipolar junction transistor (BJT), and the like.

The forward diode 406 is electrically connected to the boost converter switch 404. The forward diode 406 is positioned in such a way that when the boost converter switch 404 is open, the diode becomes forward-biased and allows the energy stored in the boost converter inductor 402 to flow to the output of the boost converter circuit 400, where the stepped-up DC voltage is provided to the DC bus 102. In an aspect, the forward diode 406 provides a unidirectional conduction path for the inductor current when the boost converter switch 404 is open, thereby preventing reverse current flow and enabling the transfer of the stored energy from the boost converter inductor 402 to downstream components (e.g., DC bus 102) of the boost converter circuit 400. In an aspect, the forward diode 406 may be configured to maintain continuous current flow during switching transitions of the boost converter circuit 400. The forward diode 406 may be, but not limited to, a fast-recovery diode, a Schottky diode, an ultrafast diode, and the like.

The boost converter capacitor $C_{dg}$ 408 is electrically connected between the forward diode 406 and the negative connector 136b of the boost converter circuit 400. The boost converter capacitor $C_{dg}$ 408 is configured to store the energy transferred through the forward diode 406 during an off cycle of the boost converter switch 404.

In operation, when the boost converter switch 404 transitions to the open state in response to the PWM signal, the energy stored in the magnetic field of the boost converter inductor 402 is released. The released energy flows through the forward-biased diode 406 and is stored in the boost converter capacitor $C_{dg}$ 408. The boost converter capacitor $C_{dg}$ 408 acts as a temporary energy reservoir, smoothing out voltage fluctuations and maintaining a stable DC output voltage across the DC bus 102. The stored charge in the boost converter capacitor $C_{dg}$ 408 provides a continuous power supply to the DG bus 102 during the next switching cycle when the boost converter switch 404 is closed again, and the boost converter inductor 402 is charging.

Figure 5:
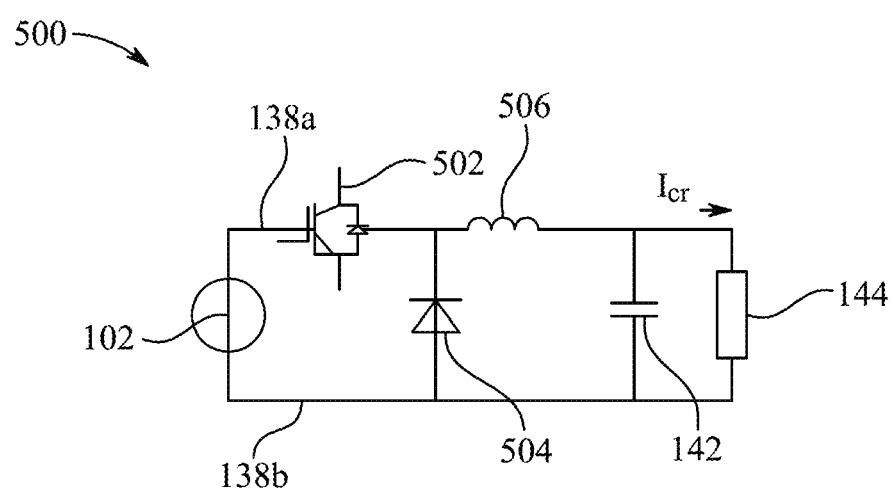
FIG. 5 illustrates an exemplary buck converter circuit, according to certain embodiments.

FIG. 5 illustrates an exemplary buck converter circuit 500. The buck converter circuit 500 corresponds to the buck converter 140 of FIG. 1A. In an aspect, the buck converter circuit 500 may be configured to receive a variable DC bus voltage and produce a regulated DC bus output voltage suitable for powering downstream components (e.g., load circuits). The variation in the DC bus voltage may result from changes in the SoC of the DC batteries 116 connected to the DC bus 102. For example, the DC bus voltage may range from 36V to 42V, depending on whether the DC battery 116 is discharged or fully charged. The buck converter circuit 500 is configured to regulate the varying DC bus voltage and produce a lower, stable output voltage at the output terminal 138b.

The buck converter circuit 500 includes the input terminal 138a and the output terminal 138b, a buck converter switch 502, a reverse diode 504, a buck converter inductor 506 and the capacitor $C_{c1}$ 142. The input terminal 138a is electrically coupled to the DC bus 102, which supplies the input power to the buck converter circuit 500.

The buck converter switch 502 is connected to the input terminal 138a of the buck converter circuit 500 and is operatively connected to the computing device 306. The computing device 306 is configured to generate and provide the PWM signals to control an operation of the buck converter switch 502. The PWM signals are configured to control the current $Ic_r$ in the constant resistance 144, thereby controlling the DC bus voltage. In one aspect, the computing device 306 may continuously monitor and adjust the duty cycle of the PWM signals. The duty cycle represents a proportion of time that the PWM signal is "on" (i.e., when the buck converter switch 502 is closed) versus "off" (i.e., when the buck converter switch 502 is open). By varying the duty cycle, the computing device 306 may control the amount of current that flows through the constant resistance 144.

For example, when the PWM signal is in its high (active) state, the buck converter switch 502 closes, allowing the current to flow from the input terminal 138a through the buck converter inductor 506 and the constant resistance 144. The amount of current flowing through the constant resistance 144 is directly influenced by the duty cycle of the PWM signal. A higher duty cycle (i.e., the buck converter switch 502 remains closed for a longer portion of each cycle) results in more energy being stored in the buck converter inductor 506.

When the PWM signal transitions to its low (inactive) state, the buck converter switch 502 opens, and although the input current is momentarily cut off, the buck converter inductor 506 continues to supply the current to the output due to its stored magnetic energy. This action ensures a continuous current flow through the constant resistance 144 and helps maintain a stable output voltage across the DC bus 102 despite the switching interruptions.

By continuously adjusting the duty cycle of the PWM signal, the computing device 306 controls an average voltage and current delivered to the constant resistance 144, thereby regulating the output voltage of the buck converter circuit 500.

The reverse diode 504 is connected between the input terminal 138a and the output terminal 138b of the buck converter circuit 500. The reverse diode 504 is oriented in such a way that the diode is reverse-biased when the buck converter switch 502 is in the closed state, meaning it does not conduct current during this phase of operation. When the buck converter switch 502 opens, the reverse diode 504 becomes forward-biased, providing a conduction path for the current flowing through the buck converter inductor 506. This ensures that the inductor current continues to flow smoothly from the input terminal 138a to the output terminal 138b, maintaining continuous current despite the switching action.

The buck converter inductor 506 is operatively connected to the buck converter switch 502 and positioned to store the energy when the buck converter switch 502 is closed and release the stored energy when the buck converter switch 502 is open. The buck converter inductor 506 is further connected to a positive terminal of capacitor $C_{c1}$ 142 and to the constant resistance 144. The connection of the buck converter inductor 506 to the capacitor $C_{c1}$ 142 allows the buck converter inductor 506 to transfer the energy to the capacitor $C_{c1}$ 142, helping to smooth the fluctuations in the output voltage, reduce voltage ripple, and maintain the stable DC bus voltage. The constant resistance 144 acts as a load, regulating the amount of current flowing through the buck converter circuit 500, and dissipating the energy from the buck converter inductor 506.

For example, when the buck converter switch 502 is closed, the current flows through the buck converter inductor 506, allowing the buck converter inductor 506 to store the magnetic energy while simultaneously charging the capacitor $C_{c1}$ 142. When the buck converter switch 502 opens, the buck converter inductor 506 continues to supply the current to the load through the reverse diode 504, thereby maintaining a consistent and regulated output voltage.

Figure 6:
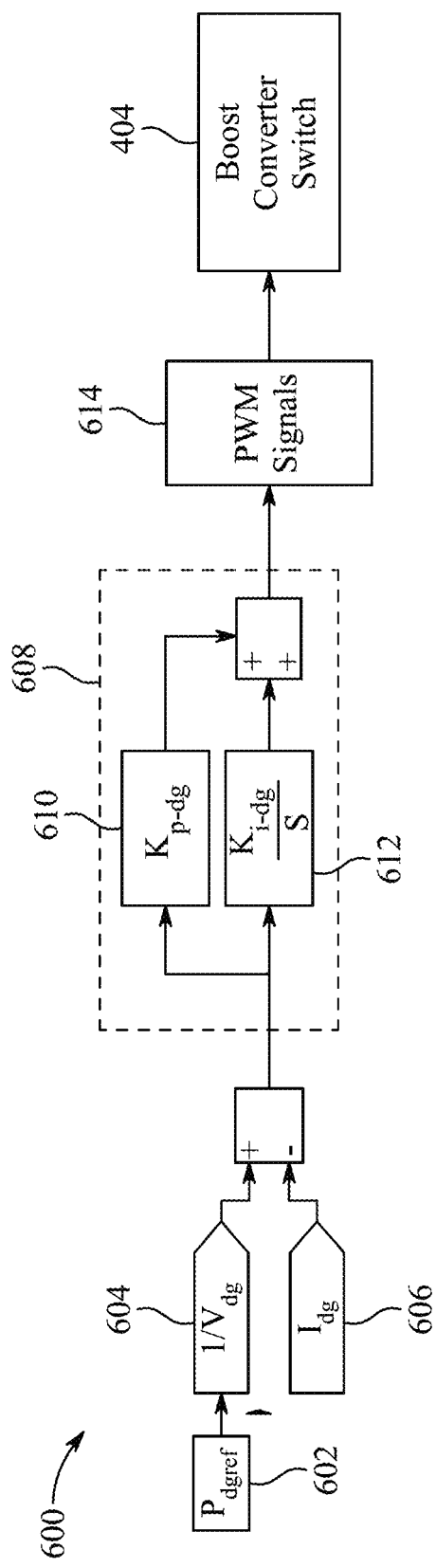
FIG. 6 illustrates an exemplary distributed generator current controller, according to certain embodiments.

FIG. 6 illustrates an exemplary distributed generator current controller 600. In an aspect, the distributed generator current controller 600 may correspond to the PI controller 302 of FIG. 3. The distributed generator current controller 600 is designed to regulate power distribution from the distributed generator circuit 106 to the DC bus 102 in coordination with the computing device 306. In an aspect, the distributed generator current controller 600 becomes active when the distributed generator circuit 106 supplies the power to the DC bus 102, for example, during periods of dynamic load demand or fluctuations in the DC bus voltage.

The computing device 306 is configured to receive a power reference value $P_{dgref}$ 602, a voltage reference value $V_{dg}$ and a distributed generator current $I_{dg}$ 606 from the distributed generator circuit 106. In an aspect, the computing device 306 may be configured to receive the power reference value $P_{dgref}$ 602, the voltage reference value $V_{dg}$ and the distributed generator $I_{dg}$ 606 through analog signals that may be digitized via the ADC converters on the computing device 306. In another aspect, the computing device 306 may be configured to receive the power reference value $P_{dgref}$ 602, the voltage reference value $V_{dg}$ and the distributed generator current $I_{dg}$ 606 through digital communication protocols, such as but not limited to, a controller area network (CAN), a serial peripheral interface (SPI), inter-integrated circuit (FC), universal asynchronous receiver-transmitter (UART), and the like depending on a control system architecture. In yet another aspect, the computing device 306 may be configured to receive the power reference value $P_{dgref}$ 602, the voltage reference value $V_{dg}$ and the distributed generator current $I_{dg}$ 606 through dedicated control lines from the distributed generator circuit 106 or from an external supervisory controller, such as a central energy management system. In an aspect, the distributed generator current $I_{dg}$ 606 may be calculated by using equation (32):

$$I_{dg} = \frac{P_{dgref}}{V_{dg}} \tag{32}$$

The computing device 306 is configured to calculate a distributed generator current reference value $1/V_{dg}$ 604 by taking a reciprocal of the voltage reference value $V_{dg}$. The distributed generator current reference value $1/V_{dg}$ 604 indicates an ideal current that needs to be drawn from the distributed generator circuit 106 to meet a desired power level.

The computing device 306 is configured to compare the distributed generator current reference value $1/V_{dg}$ 604 with the distributed generator current $I_{dg}$ 606 to calculate a distributed generator error. In an aspect, the computing device 306 may be configured to calculate the distributed generator error by calculating a difference between the distributed generator current reference value $1/V_{dg}$ 604 with the distributed generator current $I_{dg}$ 606 as defined in the below equation (33):

$$\text{Error} = \frac{1}{V_{dg}} - I_{dg} \quad (33)$$

Further, the computing device 306 is configured to feed the calculated distributed generator error to the distributed generator current controller 600, which processes the distributed generator error using the following transfer function 608 to generate the PWM signals 614. The PWM signals 614 correspond to the PWM signals generated for the boost converter switch 404 of FIG. 4.

The proportional gain of the distributed generator current controller 600, $K_{p\text{-}dg}$ 610, is given by equation (34):

$$K_{p\text{-}dg} + \frac{K_{i\text{-}dg}}{S}, \quad (34)$$

where $$\frac{K_{i\text{-}dg}}{S}$$

612 represents an integral gain of the distributed generator current controller 600, where S represents a Laplace variable. The proportional gain $K_{p\text{-}dg}$ 610 acts on a present value of the distributed generator error, thereby providing an immediate response to the distributed generator error. The integral term $K_{i\text{-}dg}$ acts on an accumulated value of the error over time, thereby eliminating steady-state error.

In an aspect, the distributed generator current controller 600 generates the control signal, which is analog and in a normalized range (e.g., 0 to 1) based on the processed distributed generator error. The control signal represents the duty cycle. For instance, if the control signal equals 0.4, the PWM signal 614 stays ON for 40% of the duty cycle. The control signal may be compared with a high-frequency carrier signal (e.g., triangular waveform) to generate the PWM signal 614. The frequency of the carrier signal may be, for example, 30 kHz. If the control signal is greater than the high-frequency carrier signal, then the output (PWM signal 614) may be HIGH, and if the control signal is less than or equal to the high-frequency carrier signal, the output may be LOW.

The PWM signals 614 are configured to drive the boost converter switch 404 in the distributed generator circuit 106. In operation, the PWM signals 614 determine an on/off time duration of the boost converter switch 404 within each cycle of the carrier waveform based on the magnitude of the control signal. Accordingly, the boost converter switch 404 controls the delivery of the distributed generator current $I_{dg}$ 606 to the DC bus 102, ensuring that the distributed generator circuit 106 supplies the right amount of power to maintain DC bus stability.

Figure 7:
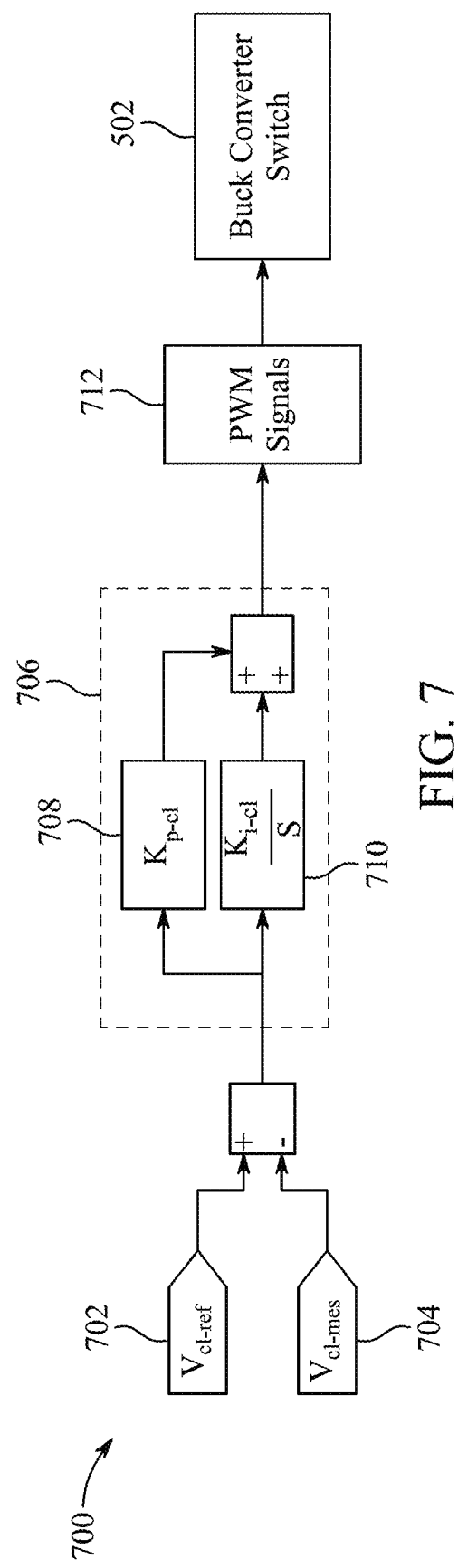
FIG. 7 illustrates an exemplary constant load power controller, according to certain embodiments.

FIG. 7 illustrates an exemplary constant load power controller 700. In the DC microgrid 100, constant power loads exhibit negative impedance characteristics, which may result in instability and undesirable oscillations in the DC bus voltage, particularly under dynamic supply conditions or sudden load transients. As used herein, the term "negative impedance" refers to a condition in which a decrease in the voltage causes the constant load power circuit 108 to draw more current in an attempt to maintain constant power (since P=V×I). This increased current draw further reduces the voltage, creating a positive feedback loop that can destabilize the DC microgrid 100. To address this issue, the constant load power controller 700 is provided, which dynamically regulates the power drawn by the constant power loads through closed-loop feedback. In an aspect, the constant load power controller 700 may correspond to the PI controller 302 of FIG. 3. In an aspect, the processor 312 of the computing device 306 is configured to execute the constant load power controller 700, which regulates the power drawn by the constant load power circuit 108 from the DC bus 102 through the buck converter 140, thereby maintaining constant power consumption despite fluctuations in the DC bus voltage. In an aspect, the constant load power controller 700 becomes active when the constant power load is connected and operating in a constant power mode, such as during periods when the constant power load attempts to draw fixed power under dynamic supply conditions.

The computing device 306 is configured to receive a capacitor voltage reference value $V_{c1\text{-}ref}$ 702 and a measured capacitor voltage $V_{c1\text{-}mes}$ 704 from the constant load power circuit 108. In an aspect, the computing device 306 may be configured to receive the capacitor voltage reference value $V_{c1\text{-}ref}$ 702, and the measured capacitor voltage $V_{c1\text{-}mes}$ 704 through sensors or voltage dividers coupled across the capacitor ($C_{c1}$) 142 of the constant load power circuit 108. The computing device 306 is configured to compute a constant power load error by comparing the capacitor voltage reference value $V_{c1\text{-}ref}$ 702, and the measured capacitor voltage $V_{c1\text{-}mes}$ 704, for example, by using the following equation (35):

$$\text{Error} = V_{c1\text{-}ref} - V_{c1\text{-}mes} \quad (35)$$

The computing device 306 is further configured to feed the calculated constant power load error to the constant load power controller 700, which processes the constant power load error using the following transfer function 706 to generate the PWM signals 712. The PWM signals 712 correspond to the PWM signals generated for the buck converter switch 502 of FIG. 5.

$$K_{p\text{-}cl} + \frac{K_{i\text{-}cl}}{S} \quad (36)$$

where $K_{p\text{-}cl}$ 708 represents a proportional gain of the constant load power controller 700, $$\frac{K_{i\text{-}cl}}{S}$$

710 represents an integral gain of the constant load power controller 700, where S represents a Laplace variable. The proportional gain $K_{p\text{-}cl}$ 708 provides an immediate response to the voltage error. The integral term $K_{i\text{-}cl}$ eliminates steady-state error.

The computing device 306 is configured to transmit the PWM signals 712 to the buck converter switch 502. In an aspect, the computing device 306 may be configured to transmit the PWM signals 712 to the buck converter switch 502 through dedicated control lines. For example, the PWM signals 712 may be generated internally by a PWM peripheral module of the computing device 306 and transmitted through a general-purpose input/output (GPIO) or PWM-specific output pin. The control lines may be electrically connected to a gate driver circuit that interfaces with a gate terminal (i.e., control input terminal) of the buck converter switch 502. The buck converter switch 502 may be configured to control the current in the constant resistance 144 to control the DC bus voltage based on the received PWM signals 712.

For example, the constant power load may emulate a 240 W load with a target voltage of 48 V across a resistor. This implies a target current draw of 5 A (since P=V*I=48*5). The computing device 306 receives the measured capacitor voltage $V_{c1\text{-}mes}$ 704 of 44V, which is lower than the reference voltage $V_{c1\text{-}ref}$ 702 of 48 V. This voltage drop may indicate that the DC bus 102 is sagging under load. The computing device 306 computes this error and feeds the error into the constant load power controller 700, which adjusts the duty cycle to compensate for the voltage drop. The constant load power controller 700 may output a control signal equivalent to a 75% duty cycle. The PWM signal 712 generated with this duty cycle is transmitted to the gate terminal of the buck converter switch 502 (via an opto-isolated driver or gate driver integrated circuit (IC)) to control the current in the constant resistance 144 to control the DC bus voltage.

FIG. 8 illustrates the double-loop control framework 800, combining voltage regulation and SoC balancing within the control model of the DC battery circuits 104. Referring to FIG. 8, a nominal DC bus voltage $V_N$ serves as a reference for maintaining the voltage stability. The nominal DC bus voltage $V_N$ is compared with a battery output voltage $v_{bio}$ to determine a voltage error signal. The voltage error signal is processed through the FOPI voltage controller 304 to calculate FOPI transfer function $G_{FOPI}$ 802. The FOPI voltage controller 304 is further configured to generate a compensation voltage signal $v_{com}$ based on the FOPI transfer function $G_{FOPI}$ 802, forming part of an outer control loop responsible for regulating the DC bus voltage.

The output of the FOPI voltage controller 304, which represents the compensation voltage signal $v_{com}$ is combined with an expression $V_N - i_{bio} R_{vi}$, where $i_{bio}$ represents an output current and $R_{vi}$ 804 represents a droop resistance, to generate a modified voltage reference signal $v_{biomod}$. The modified voltage reference signal $v_{biomod}$ is passed through a transfer function $G_{biv}$ 806, which is configured to generate a reference current $i^*_{bii}$. Simultaneously, an actual battery current $i_{bii}$ is measured and subtracted from the reference current $i^*_{bii}$ to yield a current error signal. The current error signal is fed into a SoC charge transfer function $G_{SoC}$ 808, which dynamically compensates for imbalances in SoC across different DC battery circuits 104. The output (i.e., control signals) is further processed through a transfer function $G_{bii}$ 810 to account for the dynamic response of the bidirectional buck-boost converter 118. The control signals are adjusted using $G_{bii}$ 810 to match the dynamic behavior of the bidirectional buck-boost converter 118. The resulting control signals are PWM signals 812, which are provided to a PWM module that generates gate pulses based on the control signals, and the gate pulses are used to operate the bidirectional buck-boost converter 118 connected to the corresponding DC batteries 116. The PWM signals 812 correspond to the PWM signals generated in FIG. 3 for controlling the DC bus voltage and balancing the SoC of the corresponding DC batteries 116.

The configuration shown in FIG. 8 enables double-loop control, where the outer control loop performs DC bus voltage compensation using the FOPI voltage controller 304, and an inner control loop achieves SoC balancing, ensuring precise current tracking via the bidirectional buck-boost converter 118.

Figure 9:
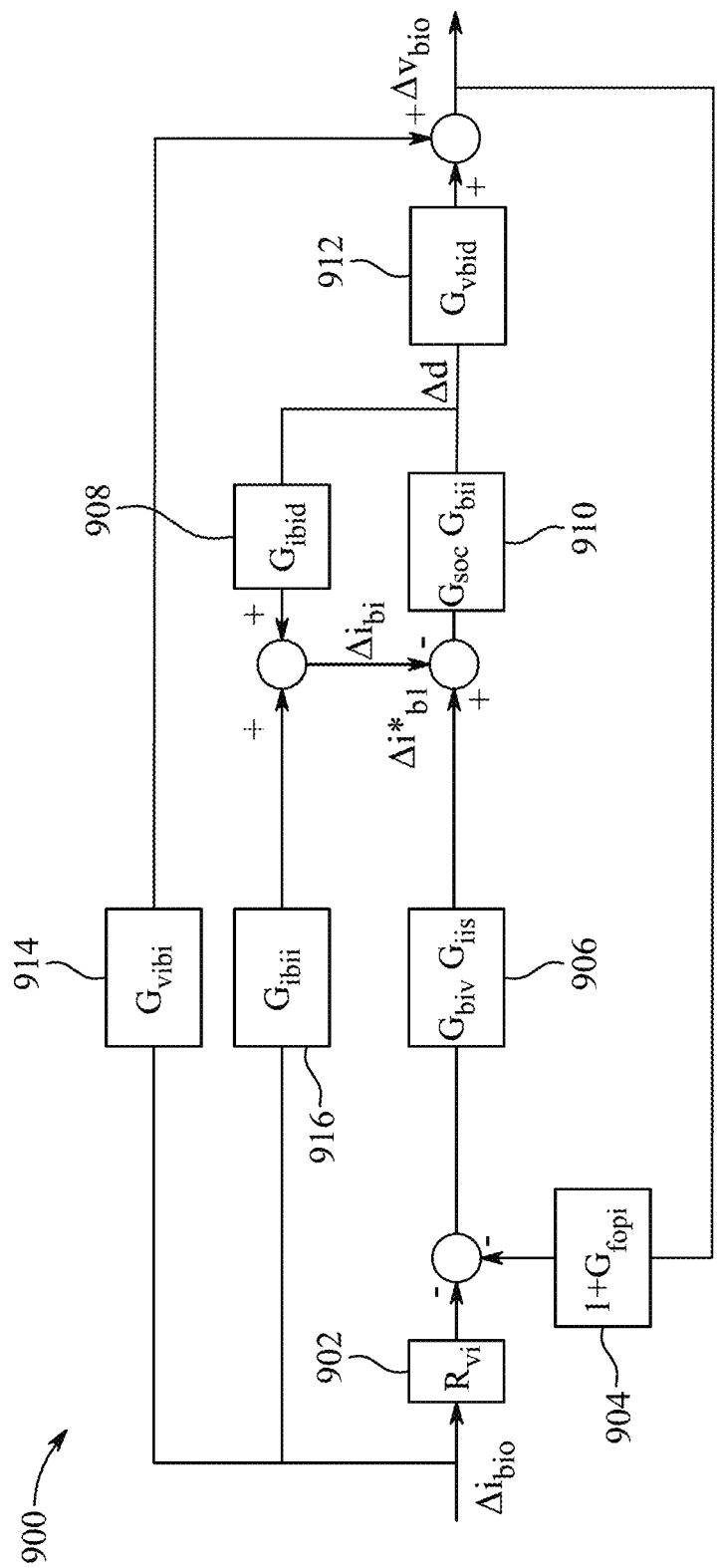
FIG. 9 illustrates a small signal model of the control system, according to certain embodiments.

FIG. 9 illustrates a small signal model 900 of the control system 300. The small-signal model 900 illustrates how small changes in a battery current affect a battery output voltage in the DC microgrid 100 using the bidirectional buck-boost converter 118. The small-signal model 900 serves to analyze and design the control system 300 for the DC bus voltage regulation and SoC balancing within the DC microgrid 100.

The small-signal model 900 receives an input perturbation $\Delta i_{bio}$, representing small variations in the output current of the DC battery 116. The current variation signal (i.e., input perturbation $\Delta i_{bio}$) is processed through a droop-resistance block $R_{vi}$ 902, followed by the FOPI voltage controller 304, denoted as $(1+G_{FOPI})$ 904, to generate a control signal that mitigates current deviations and enhances system stability.

The control signal is combined with an SoC-based reference current $\Delta i_{b1}$, which is computed from an output voltage variation $\Delta v_{bio}$ through a sequence of blocks. For example, the output voltage variation $\Delta v_{bio}$ is first processed by $G_{biv}$ $G_{iis}$ 906 and then scaled by both $G_{SoC}$ $G_{bii}$ 910. The SoC-based reference current $\Delta i^*_{b1}$ is then compared with an actual current $\Delta i_{b1}$ and the resulting error is passed through $G_{ibid}$ 908, which produces the duty cycle variation $\Delta d$.

The duty cycle perturbation $\Delta d$ directly affects the output voltage of the bidirectional buck-boost converter 118 through a transfer function $G_{vbid}$ 912, which characterizes the voltage response with respect to duty ratio changes. Additionally, the small signal model 900 includes feedback paths comprising elements such as $G_{vibi}$ 914, $G_{ibii}$ 916 and associated control blocks. These control blocks process system variables like voltage and current, adjusting parameters accordingly to ensure smooth operation and maintain the stability of the control system 300 even when external factors or internal disturbances cause deviations.

The final output of the small signal model 900 is a small-signal voltage variation $\Delta v_{bio}$ which is computed from the combined influence of both control and feedback paths. The effective transfer function from $\Delta i_{bio}$ to $\Delta v_{bio}$ is expressed as a ratio of two composite terms: the numerator representing a positive control path and feedback damping, and the denominator representing the overall dynamic behavior of the control system 300. Each functional block in FIG. 9 corresponds to small-signal transfer functions derived from average modeling equations of the bidirectional buck-boost converter 118.

Experimental Analysis:

A Matrix Laboratory (MATLAB) Simulink environment was utilized to simulate the DC microgrid 100 and controllers that are described in the present disclosure. The simulation environment was configured to replicate the functional characteristics of the DC microgrid 100, incorporating various physical parameters and control methodologies to evaluate the dynamic performance under realistic operating conditions. The physical parameters included electrical and structural properties of the DC microgrid components, such as, but not limited to, DC microgrid capacity, nominal DC bus voltage, battery specifications (i.e., voltage level of DC battery 116a and voltage level of DC battery 116b), inductances ($L_{b1}$ 124a), ($L_{b2}$ 124b), capacitances ($C_{b1}$ 128a), ($C_{b2}$ 128b), resistances ($r_{b1}$ 122a), ($r_{b2}$ 122b), load and clamping circuit (i.e., load resistance range, clamping capacitor ($C_{c1}$) 142, clamping voltage ($V_{c1}$)), switching frequency ($f_{sw}$), and the like. The detailed values of the system components and controller parameters utilized in the simulation are provided in Table 1.

The control methodologies may include, but are not limited to, the double-loop control framework 800, the FOPI voltage controller 304, the SoC balancing mechanism, MPSO 314, and the like. The modelled DC microgrid 100 has a total capacity of 10 kW with the nominal DC bus voltage of 380 volts. Load power was varied between 0.5 kW and 10 kW by adjusting the load resistance to emulate different consumer demand profiles. Two distinct test scenarios were considered to assess the robustness and responsiveness of the control system 300, such as variable resistive load power and intermittent distributed generator power output. The first test scenario simulated dynamic load behavior that mimicked real-world variations in energy consumption, while the second test scenario accounted for the fluctuating nature of renewable energy sources. These test scenarios were selected to demonstrate a capability of the the double-loop control framework 800 to maintain voltage stability and effective power-sharing under varying operating conditions. While observing a 10.25% faster SoC balancing, the double-loop control framework 800 was able to decrease bus voltage fluctuations by approximately 63.2%, indicating its effectiveness in enhancing system stability and response.

TABLE 1

DC microgrid and controller data

Parameters

| Name | Value | Name | Value |
|---|---|---|---|
| DC microgrid capacity | 10 kW | Load power (resistive) | 0.5-10 kW |
| Nominal DC bus voltage | 380 Volts | Voltage level of DC battery 116a | 96 Volts |
| Voltage level of DC battery 116b | 98 Volts | $R_{v1}$, $R_{v2}$ | 2 |
| $\lambda_1$ | 1.25 | $\lambda_2$ | 0.85 |
| $k_{p1}$ | 1.863 | $k_{p2}$ | 2.05 |
| $k_{i1}$ | 1.024 | $k_{i2}$ | 0.95 |
| $f_{sw}$ | 5 kHz | $C_{c1}$ 142 | 2 mF |
| $R_{c1}$ | 14.4 ohm | $V_{c1}$ | 120 volts |
| $C_{b1}$ 128a | 200 μF | $C_{b2}$ 128b | 210 μF |
| $L_{b1}$ 124a | 1.5 mH | $L_{b2}$ 124b | 3 mH |
| $r_{b1}$ 122a | 0.01 ohm | $r_{b2}$ 122b | 0.02 ohm |
| $k_{p\text{-}c1}$ 708 | 1.32 | $ki_{\text{-}c1}$ | 368.12 |
| $k_{p\text{-}dg}$ 610 | 0.283 | $k_{i\text{-}dg}$ | 8.151 |

Figure 10:
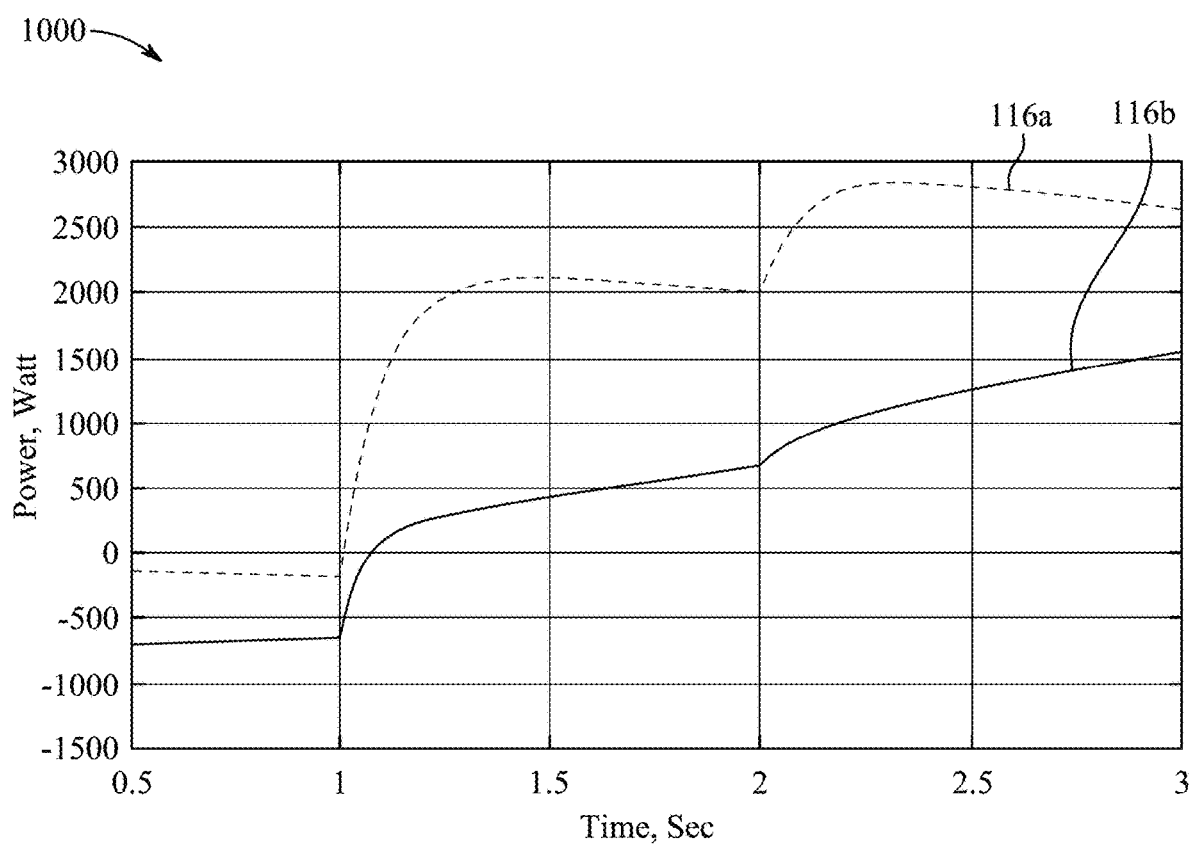
FIG. 10 illustrates a graphical representation of power exchange dynamics between two DC batteries and a distributed generator circuit during a load power fluctuation scenario, according to certain embodiments.

FIG. 10 illustrates a graphical representation 1000 of power exchange dynamics between two DC batteries 116a-116b and the distributed generator circuit 106 during a load power fluctuation scenario. The distributed generator circuit 106 consistently supplies 5 kW of power; however, due to step changes in load demand occurring at 1 second and 2 seconds, the DC batteries 116a-116b alternate between charging and discharging modes. Initially, both the DC batteries 116a-116b exhibited negative power flow, indicating that the DC batteries 116a-116b were operating in a charging mode. At 1-second, a sharp positive spike in the power flow of the DC battery 116a indicated rapid power delivery, reaching over 2000 W, while the DC battery 116b also followed a rising trend in power uptake. After the 2-second mark, the load increased further, causing both DC batteries 116a-116b to transition into a discharging mode. The DC battery 116a, which possessed a higher initial SoC, provided a more significant portion of the required power, with output peaking around 3000 W before declining. In contrast, the DC battery 116b contributed a steady but comparatively smaller amount of power. This coordinated power exchange behavior, as facilitated by the controller (i.e., the double-loop control framework 800), ensures efficient and autonomous energy management among the energy storage components.

Figure 11:
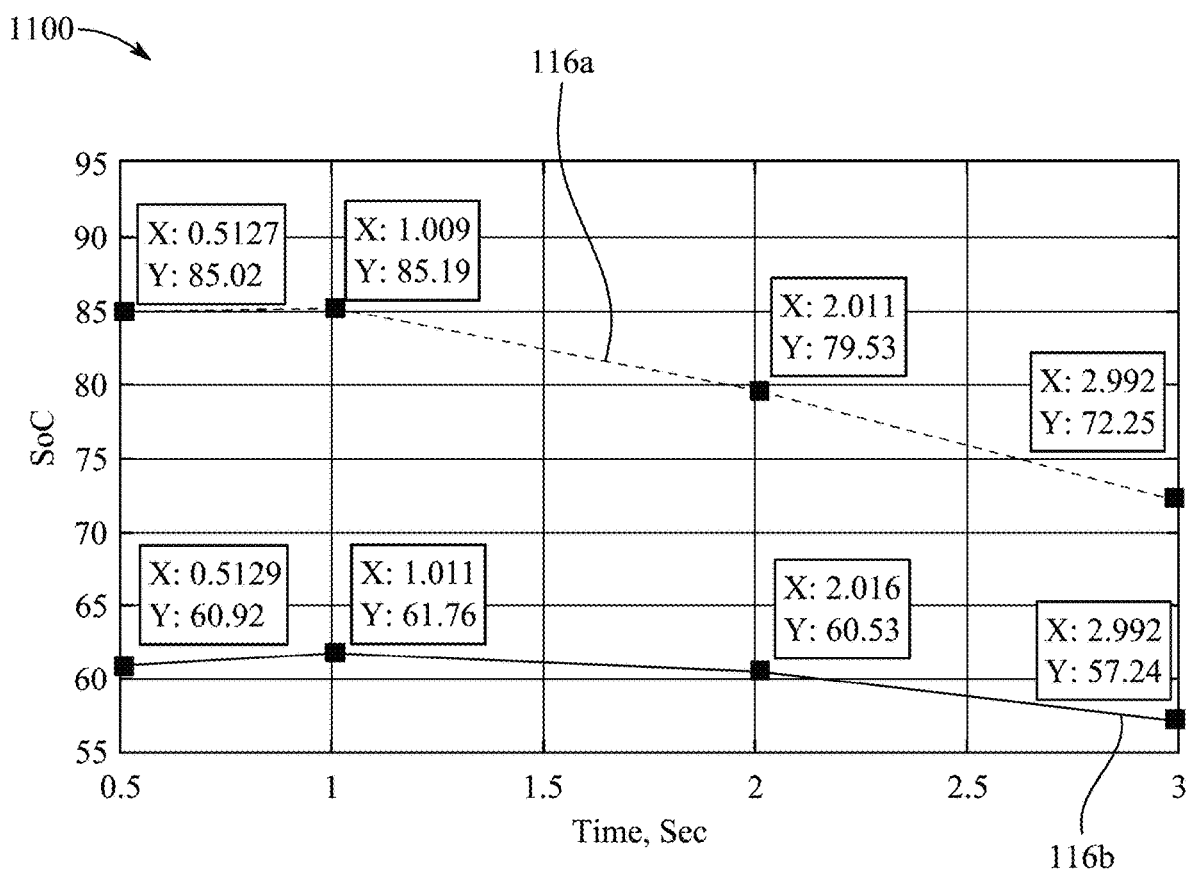
FIG. 11 illustrates a graphical representation of dynamic SoC behavior of two DC batteries under varying load conditions as controlled by a controller (i.e., the double-loop control framework, according to certain embodiments.

FIG. 11 illustrates a graphical representation 1100 of the dynamic SoC behavior of the two DC batteries 116a-116b under varying load conditions as controlled by the controller (i.e., the double-loop control framework 800). At the initial time of 0.5 seconds, both batteries 116a-116b were in charging mode, with SoC values of 85.02% and 60.92%, respectively. During the charging mode, the DC battery 116b, which had the lower SoC, charged at a relatively faster rate than the DC battery 116a with a higher SoC to facilitate autonomous SoC balancing. Between 0.5 and 1 second, the SoC of the DC battery 116a increased slightly to 85.19% (0.17% rise), while the SoC of the DC battery 116b increased to 61.76%, indicating a 1.37% rise. Following the step load variations at 1 and 2 seconds, both DC batteries 116a-116b entered a discharging mode. The DC battery 116a, which initially had a higher SoC, underwent a more substantial decrease of 6.64%, while the DC battery 116b experienced a smaller drop of 1.99%. This differentiated discharging pattern illustrates an approach of the controller to prioritize discharge from the DC battery 116a with higher SoC, effectively supporting automatic SoC balancing across the energy storage devices.

Figure 12:
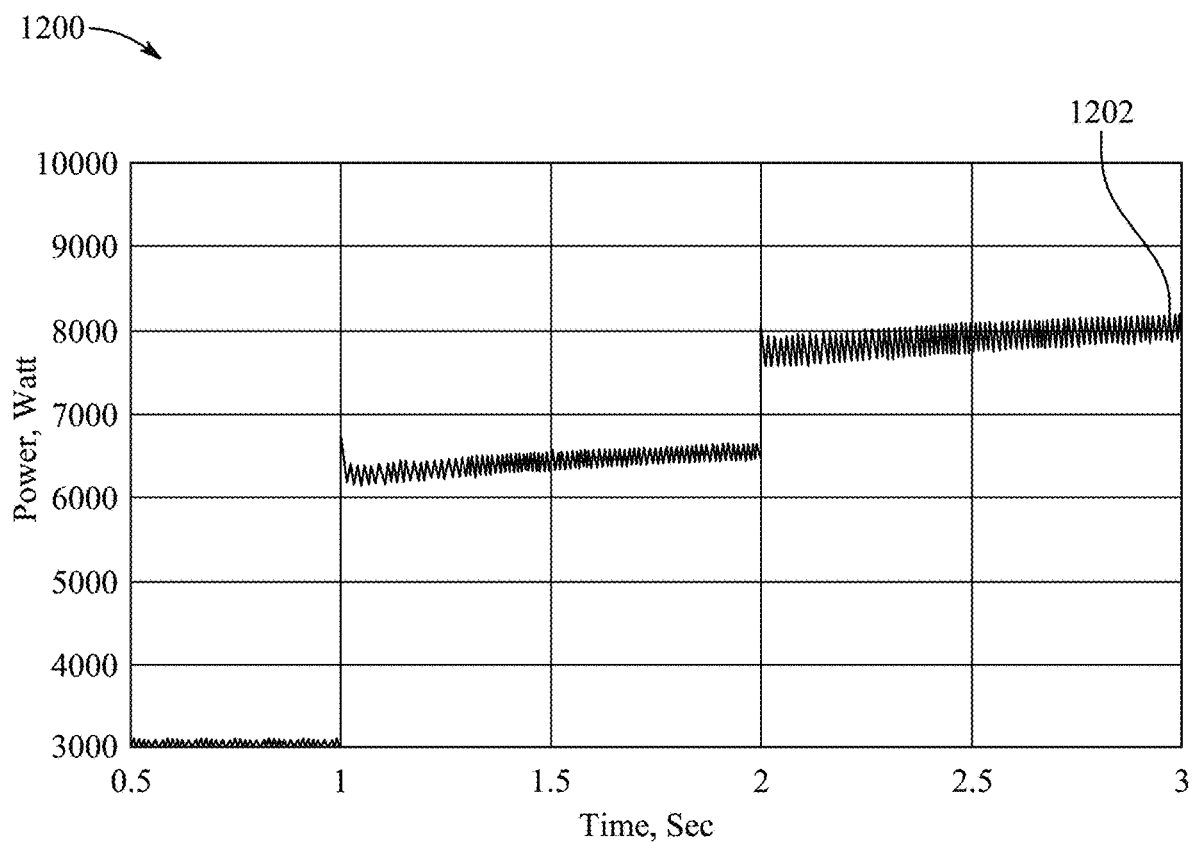
FIG. 12 illustrates a graphical representation of stepwise variation in load power over time within the DC microgrid, according to certain embodiments.

FIG. 12 illustrates a graphical representation 1200 of stepwise variation in load power 1202 over time within the DC microgrid 100. Initially, the load power 1202 remained relatively stable. At the 1-second mark, a sudden increase in the load power 1202 occurred, rising sharply to approximately 5 kW. A subsequent step change was observed at 2 seconds, where the load power 1202 increased further to approximately 8 kW. These abrupt step variations simulated real-world dynamic loading scenarios in the DC microgrid 100, intended to evaluate response and control robustness under fluctuating demands.

Figure 13:
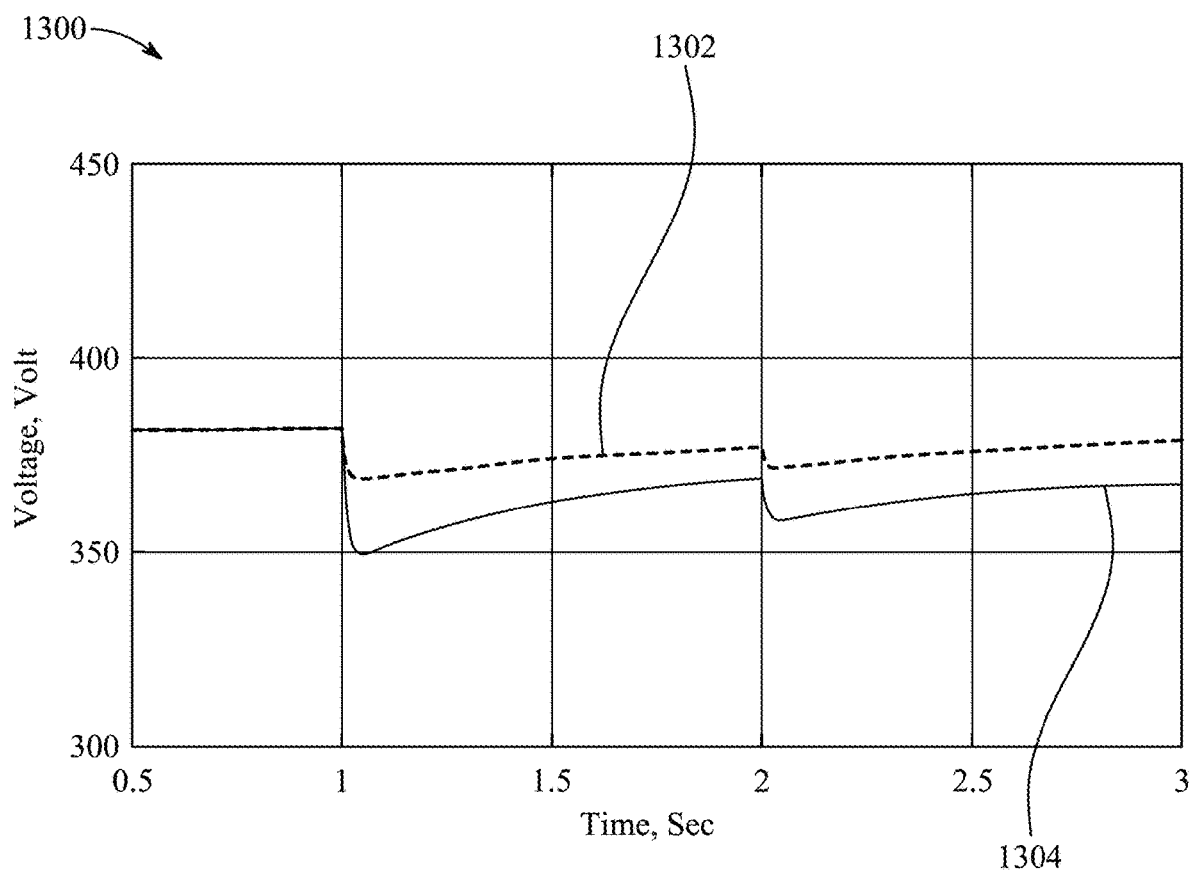
FIG. 13 illustrates a graphical representation comparing the performance of a conventional controller and a described controller in regulating DC bus voltage during load disturbances, according to certain embodiments.

FIG. 13 illustrates a graphical representation comparing the performance of a conventional controller 1302 and the controller 1304 of the present disclosure in regulating the DC bus voltage during load disturbances shown in FIG. 12. As evident from FIG. 13, the conventional controller 1302 displayed significant voltage deviations in response to both step increases in the load power at 1 and 2 seconds. Specifically, at 1 second, the conventional controller 1302 experienced a voltage deviation of approximately 30.5 volts, while the controller 1304, incorporating the FOPI voltage controller 304 and SoC-balancing mechanism, limited the deviation to 11.2 volts, representing a 63.27% reduction in voltage fluctuation.

Similarly, at the 2-second mark, the controller 1304 limited the deviation to a significantly smaller range compared to the conventional controller 1302, achieving a 61.29% reduction in the voltage deviation. These results demonstrate the superior voltage regulation capability and enhanced power quality achieved by the controller 1304 of the present disclosure under dynamic load variation conditions. The combination of the FOPI voltage controller 304 and the inner-loop SoC-balancing mechanism contributes to a more stable and resilient DC bus voltage response, effectively mitigating the adverse impact of sudden load disturbances.

Figure 14:
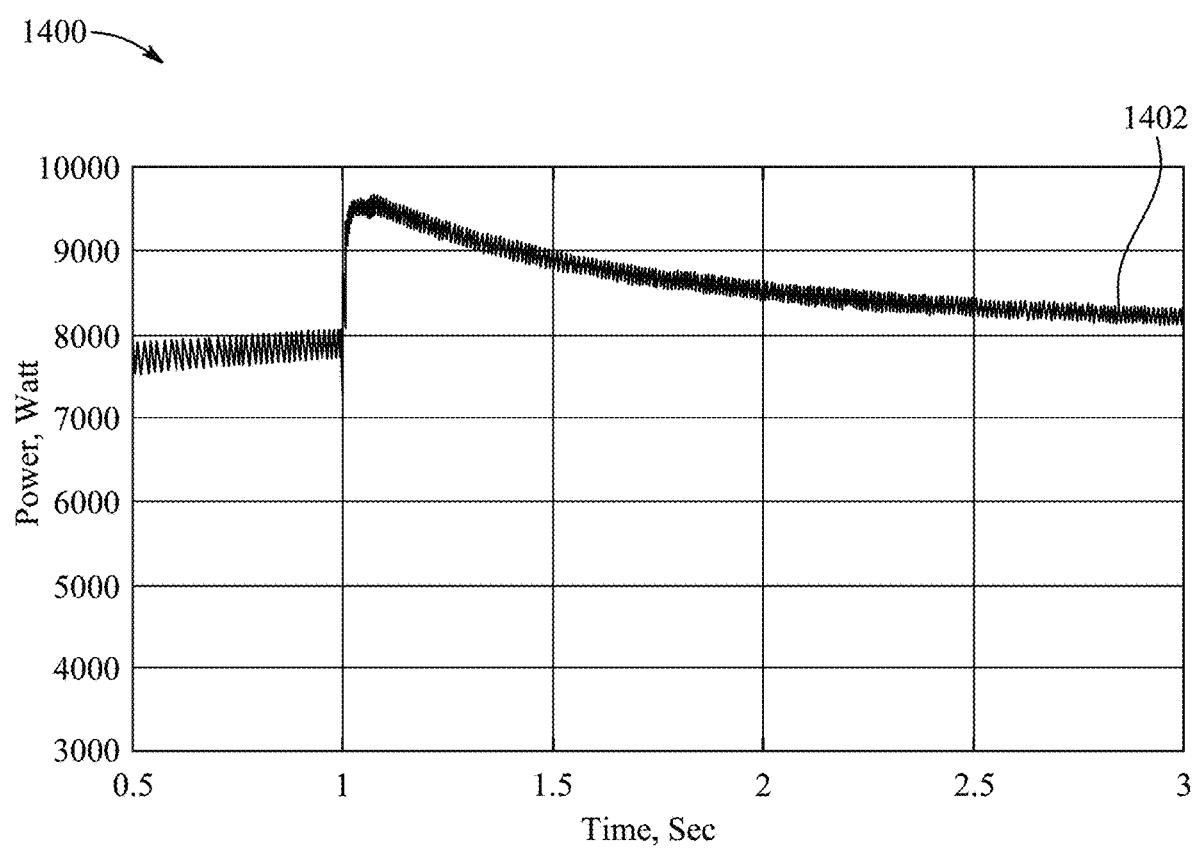
FIG. 14 illustrates a graphical representation of a variation in load power over a simulation period under the influence of a step change in a distributed generator power output, according to certain embodiments.

FIG. 14 illustrates a graphical representation 1400 of a variation in load power 1402 over a simulation period under the influence of a step change in a distributed generator power output. Initially, the resistive load power 1402 remained steady at approximately 8 kW. At the 1-second mark, the distributed generator outputs were suddenly increased by adjusting a distributed generator-side resistance, which resulted in a spike in a total load power 1402, reaching a peak of approximately 9.5 kW. Following this abrupt increase, the control system 300 underwent a transient period during which the load power 1402 gradually declined and stabilized around 8.3 kW. This transient behavior reflects the dynamic regulation and response capability of the DC microgrid 100, demonstrating the system's ability to maintain stable power delivery and accommodate rapid changes in generation input.

Figure 15:
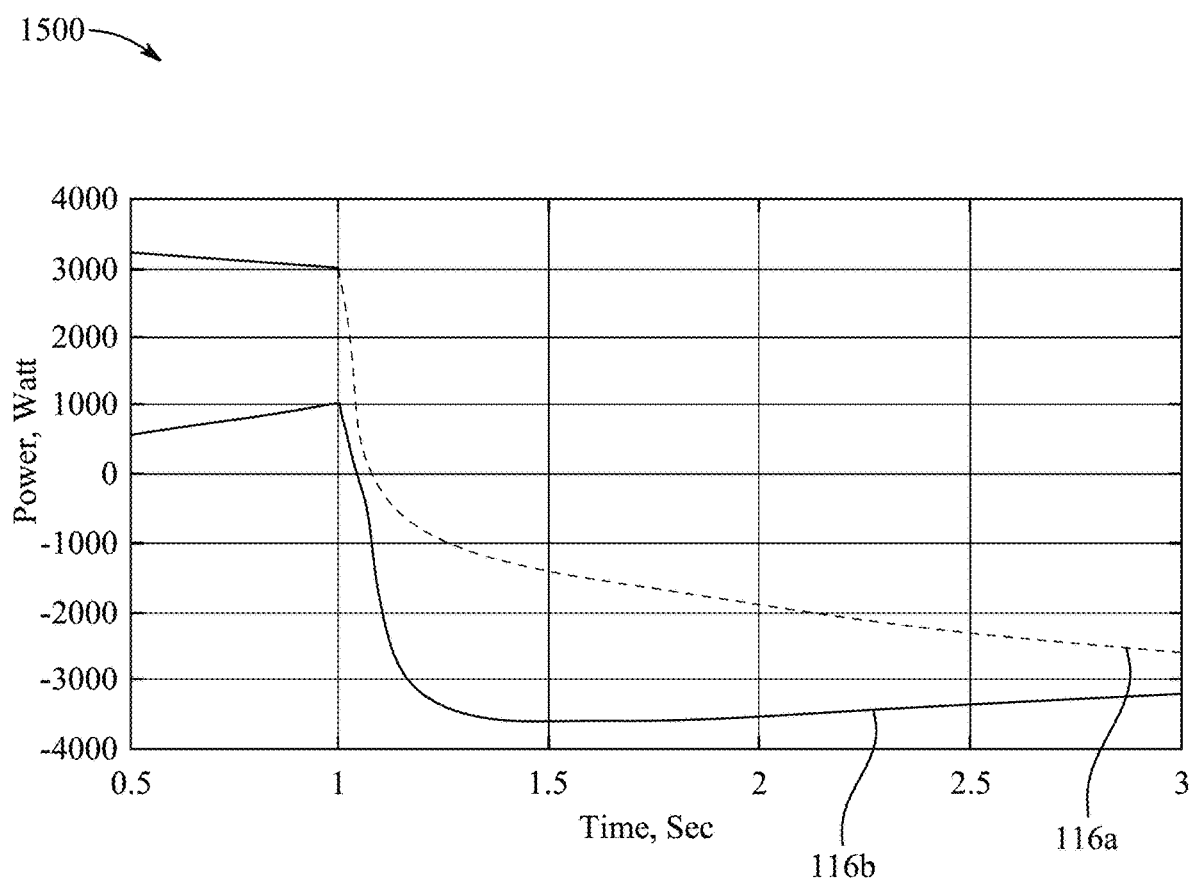
FIG. 15 illustrates a graphical representation of a dynamic power response of the DC batteries to the step change in the distributed generator power output, according to certain embodiments.

FIG. 15 illustrates a graphical representation of the dynamic power response of DC batteries 116a-116b to a step change in the distributed generator power output, indicating a coordinated power-sharing behavior between the DC batteries 116a-116b. Prior to 1 second, both DC batteries 116a-116b delivered positive power output, indicating that the DC batteries 116a-116b were discharging to support the load demand. However, immediately after the step increase in distributed generator power at 1 second, the power flow from both DC batteries 116a-116b transitioned sharply into a negative region, signifying a switch to a charging mode. This change was prompted by a sudden surplus of energy from the distributed generator unit 132. The magnitude of the charging power was initially high due to the excess distributed generator output and then gradually decreased as it reaches a new steady-state condition. This transition effectively demonstrates the autonomous ability of the DC batteries 116a-116b to alternate between charging and discharging states in response to real-time distributed generator power fluctuations, thereby ensuring balanced and efficient energy flow within the DC microgrid 100.

Figure 16:
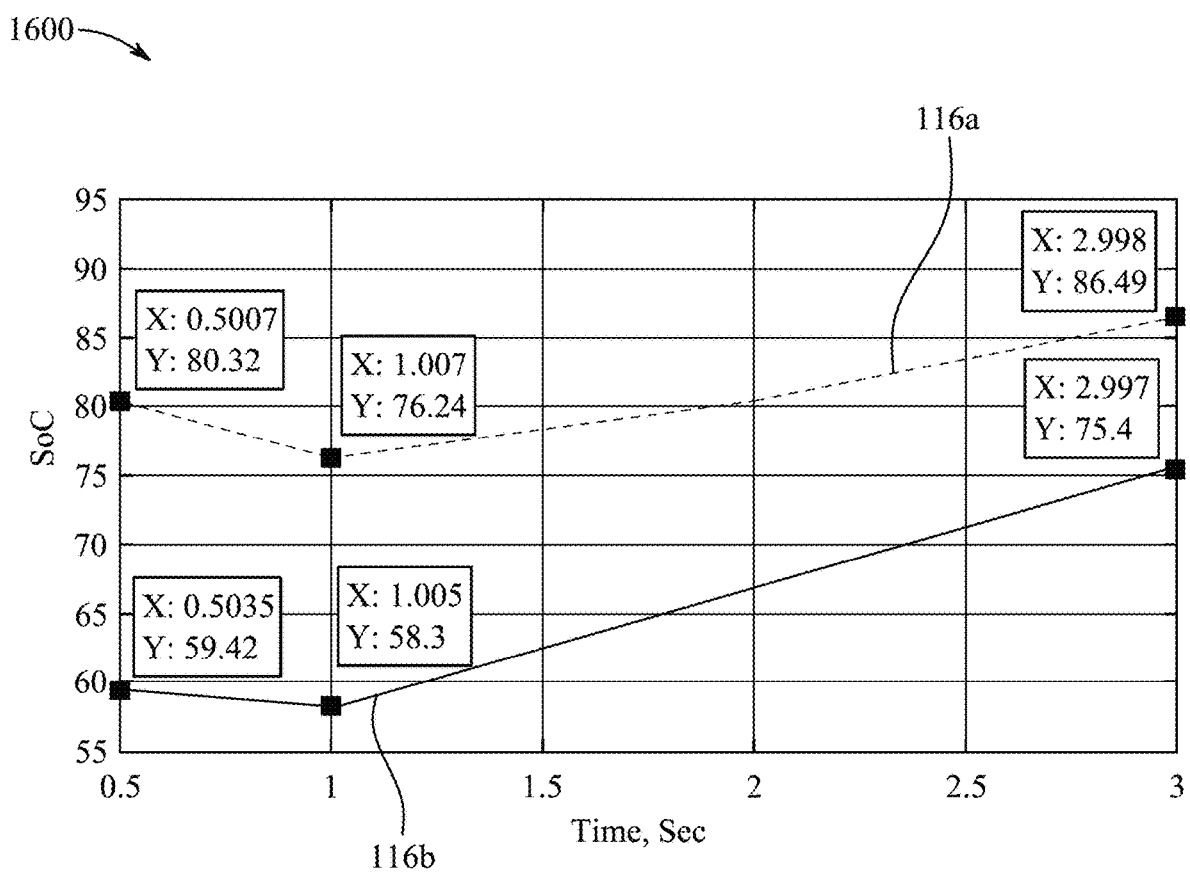
FIG. 16 illustrates a graphical representation of SoC profiles of the DC batteries in response to power variations from a distributed generator unit, according to certain embodiments.

FIG. 16 illustrates a graphical representation of the SoC profiles of the DC batteries in response to power variations from the distributed generator unit 132. FIG. 16 illustrates the effectiveness of the controller of the present disclosure in maintaining automatic SoC balancing. Initially, at about 0.5 seconds, the DC battery 116a has a higher SoC of 80.32%, while the DC battery 116b has a lower SoC of 59.42%. During a discharging phase between 0.5 and 1 second, the SoC of the DC battery 116a dropped significantly to 76.24% by 1.007 seconds, which indicates a decrease of 4.08%. In contrast, the SoC of the DC battery 116b decreased slightly to 58.3% by 1.005 seconds, indicating a reduction of just 1.12%. This difference indicates that the DC battery 116a with the higher initial SoC discharges more rapidly than the DC battery 116b with a lower initial SoC, enabling an automatic balancing mechanism driven by the described controller.

Following the discharging period, both DC batteries 116a-116b transitioned into the charging phase. The SoC of the DC battery 116a increased from 76.24% to 86.49% by the end of the simulation, marking a 10.25% gain. The SoC of the DC battery 116b rose from 58.3% to 75.40%, indicating a more substantial increase of 17.1%. This behavior confirms that the DC battery with the lower initial SoC charges at a faster rate, again reinforcing the autonomous SoC balancing feature of the described controller.

Figure 17:
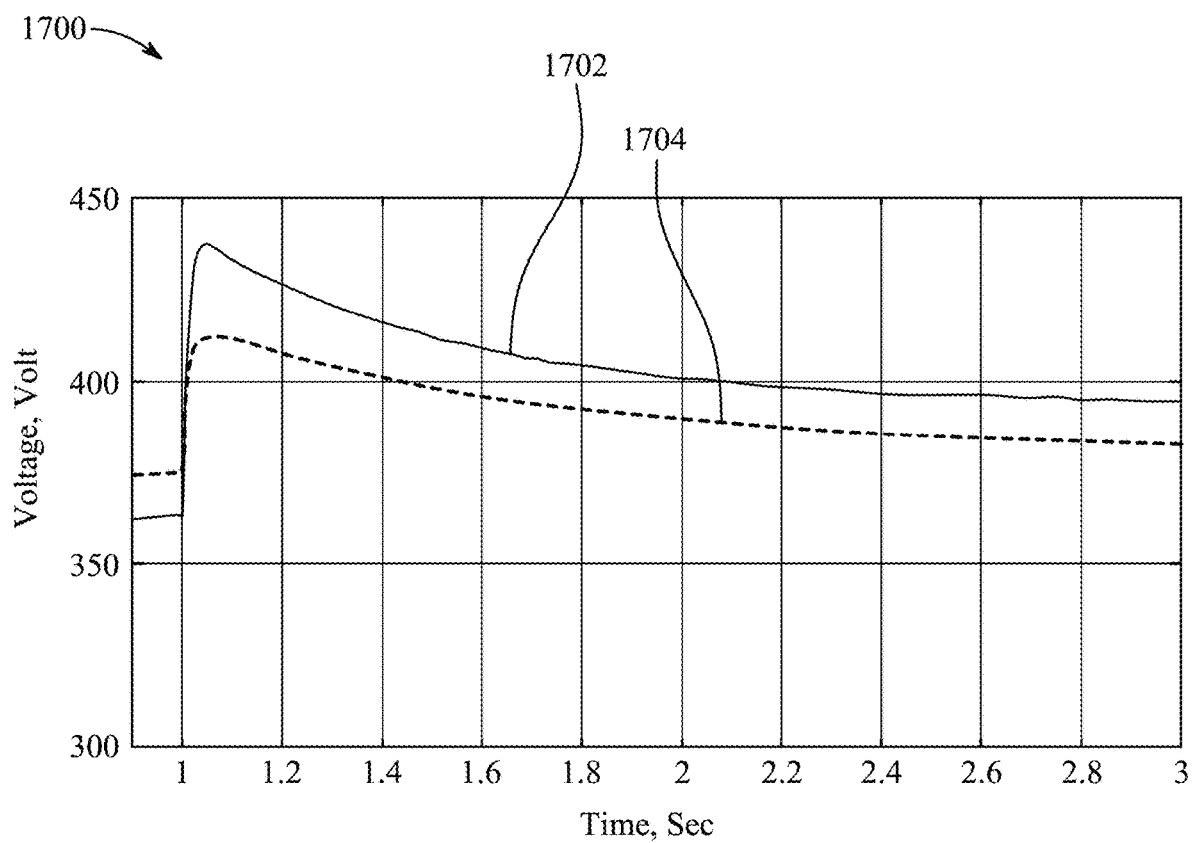
FIG. 17 illustrates a graphical representation of comparing DC bus voltage regulation performance between a conventional controller and a described controller under varying system conditions, according to certain embodiments.

FIG. 17 illustrates a graphical representation 1700 of comparing DC bus voltage regulation performance between a conventional controller 1702 and the controller 1704 of the present disclosure under varying system conditions. FIG. 17 indicates that the conventional controller 1702 exhibited significant voltage deviations from a nominal DC bus voltage, particularly following dynamic events such as load changes or DG power variations. A prominent voltage dip was observed immediately after the 1-second mark. In contrast, the controller 1704 effectively mitigated these voltage deviations, maintaining the DC bus voltage much closer to the nominal DC bus voltage. Specifically, at 1 second, the controller 1704 reduced the voltage deviation by 44.64% compared to the conventional controller 1702, demonstrating a marked improvement in voltage stability.

As the simulation progressed, the controller 1704 sustained voltage regulation with minimal oscillations and converged smoothly toward the nominal DC bus voltage, during which time the conventional controller 1702 continued to exhibit instability and underperformance. This performance improvement is attributed to the controller 1704, which integrates a DC bus voltage compensation mechanism with SoC-assisted power sharing. This integrated approach not only enhances DC bus voltage regulation but also improves overall microgrid stability, responsiveness, and coordinated energy storage management.

Figure 18:
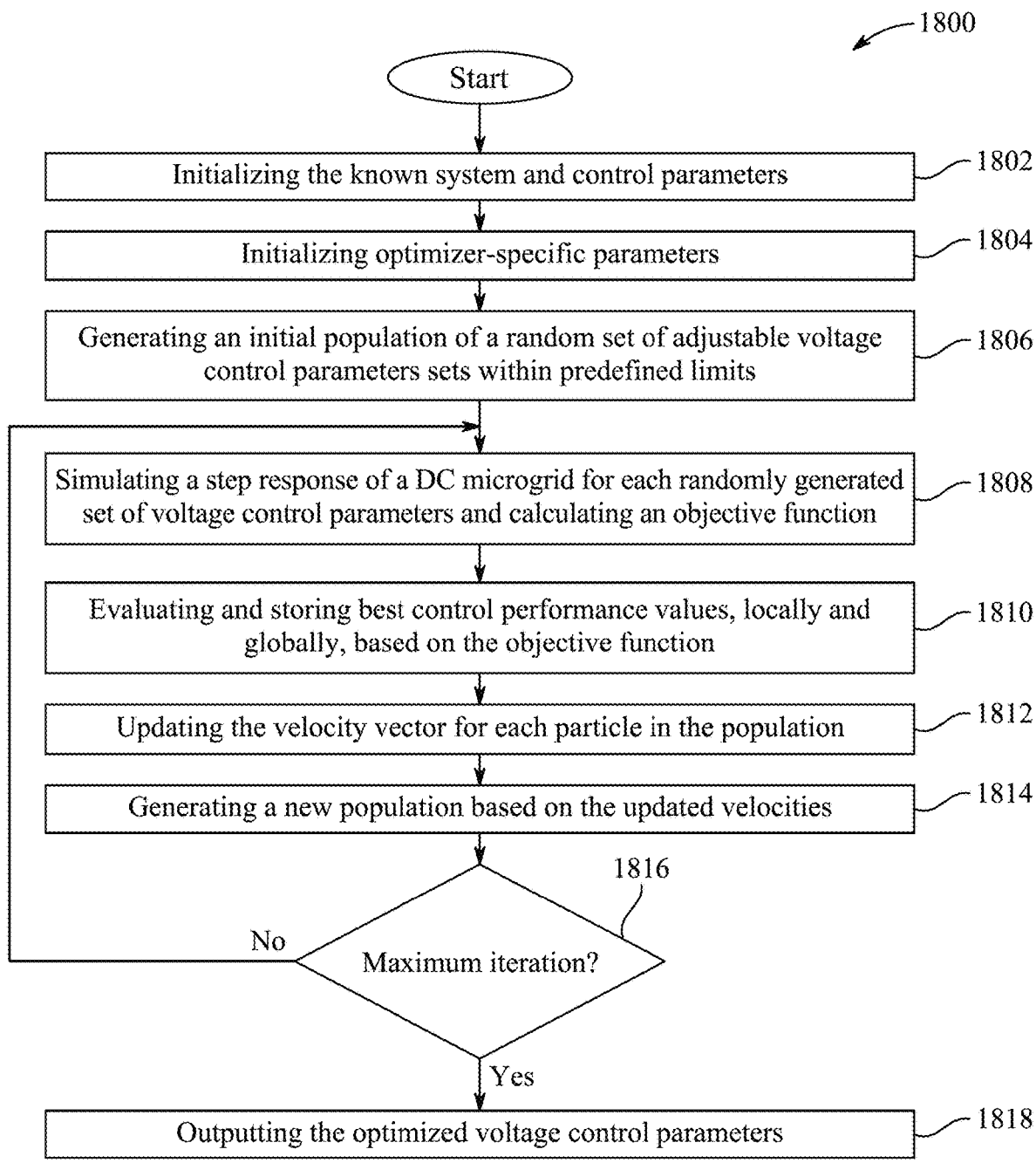
FIG. 18 illustrates a flowchart of a method for optimizing adjustable voltage control parameters using a modified particle swarm optimizer (MPSO), according to certain embodiments.

FIG. 18 illustrates a flowchart of a method 1800 for optimizing the adjustable voltage control parameters using the MPSO 314. The method 1800 includes a series of steps. These steps are only illustrative, and other alternatives may be considered where one or more steps are added, one or more steps are removed, or one or more steps are provided in a different sequence without departing from the scope of the present disclosure.

At step 1802, the method 1800 includes initializing the known system and control parameters that define the operational and electrical characteristics of the DC microgrid 100. Step 1802 includes defining a set of predetermined constants and functional expressions necessary for modeling the dynamic behavior of the DC microgrid 100. These parameters may include, but are not limited to, component values such as inductances $L_{bi}$, capacitances $C_{bi}$, internal resistances $r_{bi}$, system-level constants, such as duty cycle D, nominal DC bus voltage $V_N$, droop resistances $R_{vi}$ and associated control path transfer functions, including, but not limited to, $G_{bii}$, $G_{biv}$, and the like.

At step 1804, the method 1800 includes initializing optimizer-specific parameters, such as but not limited to, the maximum number of iterations, learning factors (cognitive and social coefficients), constriction factors (to ensure stable convergence), population size (i.e., number of particles) and the like.

At step 1806, method 1800 includes generating an initial population of a random set of adjustable voltage control parameters within predefined limits. Each set of adjustable voltage control parameters corresponds to the candidate solution and is represented by the particle in the MPSO framework. The set of adjustable voltage control parameters to be optimized includes the proportional gain $K_{pi}$, the integral gain $K_{ii}$ and the fractional-order integration parameter λ which define the behavior of the FOPI voltage controller 304. Each adjustable voltage control parameter is initialized by generating the random value within the allowable range defined by lower and upper bounds as defined in equations (26)-(29).

At step 1808, the method 1800 includes simulating a step response of the DC microgrid 100 for each randomly generated set of voltage control parameters (i.e., particle) and calculating the objective function. The parameter set of each particle is applied to the simulation model of the DC microgrid 100, incorporating small-signal transfer functions developed using initialized parameters in step 1802. The response of the control system 300 to a predefined input disturbance (e.g., load power fluctuation or DG variation) is evaluated, and the objective function, as defined by equation (25), is computed to quantify the control performance.

At step 1810, the method 1800 includes evaluating and storing best control performance values, locally and globally, based on the objective function.

At step 1812, the method 1800 includes updating the velocity vector for each particle in the population based on its current velocity, the difference between its local best position (Pbest) and the current position, and the difference between the global best position (Gbest) and the current position. The velocity update is computed using equation (30):

At step 1814, the method 1800 includes generating a new population based on the updated velocities.

At step 1816, the method 1800 includes determining whether a maximum number of iterations (or a convergence threshold) has been reached. If the maximum number of iterations has not been reached, the method 1800 returns to step 1810 to evaluate the step response and update the objective function for the new population. This iterative process continues, progressively refining the voltage control parameters. Otherwise, the method 1800 proceeds to step 1818.

At step 1818, the method 1800 includes outputting the optimized voltage control parameters, including the optimal values of $K_{pi}$, $K_{ii}$, and $\lambda$). These values represent the final global best solution from the MPSO 314 and are used to configure the FOPI voltage controller 304 implemented in the control system 300 of the DC microgrid 100.

Figure 19:
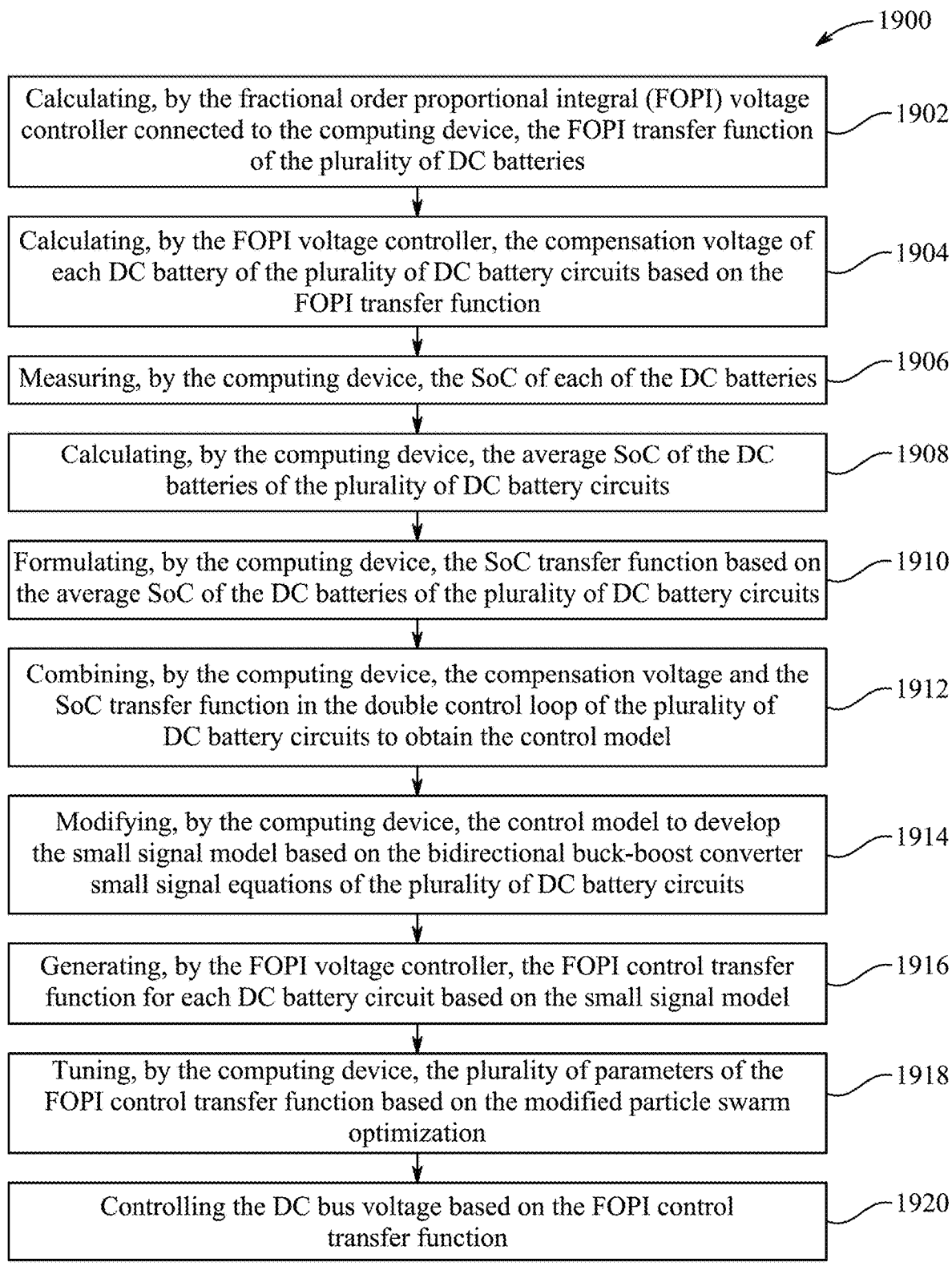
FIG. 19 illustrates a flowchart of a method of controlling the DC bus voltage and SoC balance in the DC microgrid having the DC battery circuits, according to certain embodiments.

FIG. 19 illustrates a flowchart of a method 1900 of controlling the DC bus voltage and the SoC balance in the DC microgrid 100 having the DC battery circuits 104. Each DC battery circuit 104 includes the DC battery 116 connected to the bidirectional buck-boost converter 118. The DC microgrid 100 includes the distributed generator circuit 106 and the constant load power circuit 108. Each of the distributed generator circuit 106 and the constant load power circuit 108 includes a bidirectional converter such as the boost converter 134 and the buck converter 140, respectively. The method 1900 includes a series of steps. These steps are only illustrative, and other alternatives may be considered where one or more steps are added, one or more steps are removed, or one or more steps are provided in a different sequence without departing from the scope of the present disclosure.

At step 1902, the method 1900 includes calculating, by the FOPI voltage controller 304 connected to the computing device 306, the FOPI transfer function $G_{FOPI}$ 802 for each DC battery circuit 104. This step includes calculating the FOPI transfer function $G_{FOPI}$ 802 for arch DC battery circuit 104 by using equation (4).

At step 1904, the method 1900 includes calculating, by the FOPI voltage controller 304, the compensation voltage $v_{com}$ of each DC battery 116 within the DC battery circuits 104, based on the FOPI transfer function $G_{FOPI}$ 802. In an aspect, the compensation voltage $v_{com}$ is computed using equation (5). In one aspect, the computed compensation voltage $v_{com}$ is subsequently used in conjunction with the droop-based voltage reference $v^*_{bio}$ to generate the modified voltage reference $v_{biomod}$ for each DC battery circuit 104. The modified voltage reference $v_{biomod}$ is computed using equation (7), which integrates the compensation voltage $v_{com}$ as an additive or corrective term to the droop-based voltage reference $v^*_{bio}$, thereby enhancing voltage regulation across the DC bus 102.

At step 1906, the method 1900 includes measuring, by the computing device 306, the SoC of each of the DC batteries 116 in the DC microgrid 100. In an aspect, the SoC of each of the DC batteries 116 may be measured by using the combination of real-time sensor data and estimation approaches.

At step 1908, the method 1900 includes calculating, by the computing device 306, the average SoC of the DC batteries 116 of the DC battery circuits 104 using equation (8).

At step 1910, the method 1900 includes formulating, by the computing device 306, the SoC transfer function $G_{SoC}$ 808 using equation (10) based on the average SoC of the DC batteries 116 of the corresponding DC battery circuits 104. This step includes calculating a deviation metric for each DC battery 116 by determining the difference between the SoC of each individual DC battery and the computed average SoC across all DC batteries 116 of the DC battery circuits 104.

At step 1912, the method 1900 includes combining, by the computing device 306, the compensation voltage $v_{com}$ and the SoC transfer function $G_{SoC}$ 808 in the double control loop of the DC battery circuits 104 to obtain the control model.

At step 1914, the method 1900 includes modifying, by the computing device 306, the control model to develop the small signal model 900 based on the bidirectional buck-boost converter small signal equations of the DC battery circuits 104. This step includes adapting the existing non-linear system equations to their linearized counterparts by applying small-signal analysis approach. The small-signal model is developed to capture the behavior of the DC battery circuits 104 under minor disturbances, allowing precise control system design and stability evaluation.

At step 1916, the method 1900 includes generating, by the FOPI voltage controller 304, the FOPI control transfer function for each DC battery circuit 104 based on the small signal model 900. The FOPI control transfer function is generated by using equation (21) which represents a relationship between the perturbation in the output voltage $\Delta v_{bio}$ and the perturbation in the output current $\Delta i_{bio}$ of the $i^{th}$ DC battery circuit.

At step 1918, the method 1900 includes tuning, by the computing device 306, the parameters of the FOPI control transfer function based on the MPSO 314. In an aspect, the tuning is performed with the objective function. The objective function is formulated using equation (25) to minimize the error in the step response of the FOPI control transfer function.

At step 1920, the method 1900 includes controlling the DC bus voltage based on the FOPI control transfer function. In an aspect, the voltage control parameters of the FOPI voltage controller 304, which are optimized through the MPSO 314, are used to regulate the output voltage of the DC battery circuits 104 in real-time.

The first embodiment is illustrated with respect to FIG. 1A-FIG. 9. The first embodiment describes a control system 300 for a direct current (DC) microgrid 100. The control system 300 includes a DC bus 102 configured with a positive bus line 112a and a negative bus line 112b. The control system 300 further includes a plurality of DC battery circuits 104a-104b each configured with a positive coupler 114a or 114c and a negative coupler 114b or 114d. Each positive coupler 114a or 114c is connected to the positive bus line 112a, and each negative coupler 114b or 114d is connected to the negative bus line 112b. The control system 300 further includes a plurality of switches 126a-126d located in each DC battery circuit 104a-104b. Each switch 126a-126d includes a control input terminal 130a or 130b or 130c or 130d. The control system 300 further includes a distributed generator circuit 106 connected to the DC bus 102. The control system 300 further includes a constant load power circuit 108 connected to the DC bus 102. The control system 300 further includes a computing device 306 connected to each control input terminal 130a-130d, the DC bus 102, the distributed generator circuit 106 and the constant load power circuit 108. The computing device 306 includes an electric circuitry 308, a memory 310 configured to store program instructions, and at least one processor 312 configured to execute the program instructions to determine a DC bus voltage of the DC bus 102. The at least one processor 312 is further configured to determine a state of charge (SoC) of each of the plurality of DC battery circuits 104a-104b. The at least one processor 312 is further configured to generate phase width modulation (PWM) signals which control the DC bus voltage, and balance the SoC of the DC battery circuits 104a-104b.

In an aspect, each DC battery circuit 104a-104b includes a DC battery 116a or 116b having a positive battery terminal 120a or 120c and a negative battery terminal 120b or 120d, and a bidirectional buck-boost converter 118a or 118b connected to the DC battery 116a or 116b. The bidirectional buck-boost converter 118a or 118b includes a resistor 122a or 122b connected to the positive battery terminal 120a or 120c; an inductor 124a or 124b connected in series with the resistor 122a or 122b; a first buck-boost converter switch 126a or 126c connected between the inductor 124a or 124b and the positive bus line 112a; a second buck-boost converter switch 126b or 126d connected between the inductor 124a or 124b and the negative battery terminal 120b or 120d connected to the negative bus line 112b; and a capacitor 128a or 128b connected between the first buck-boost converter switch 126a or 126c and the negative bus line 112b.

In an aspect, the control system 300 includes a plurality of resistive loads 110a-110m connected to the DC bus 102. Each resistive load 110a-110m is configured to receive power from the DC bus 102.

In an aspect, the distributed generator circuit 106 includes a distributed generator unit 132. The distributed generator circuit 106 further includes a boost converter 134 connected in parallel with the distributed generator unit 132. The boost converter 134 is configured with a positive connector 136a and a negative connector 136b. The positive connector 136a is connected to the positive bus line 112a and the negative connector 136b is connected to the negative bus line 112b.

In an aspect, the distributed generator unit 132 is connected to at least one generator of renewable energy and is configured to receive power from the at least one generator of renewable energy.

In an aspect, the boost converter 134 includes a boost converter inductor 402 connected to the at least one generator of renewable energy. The boost converter 134 further includes a boost converter switch 404 connected between the boost converter inductor 402 and the negative connector 136b. The boost converter 134 further includes a forward diode 406 connected to the boost converter switch 404. The boost converter 134 further includes a boost converter capacitor $C_{dg}$ 408 connected between the forward diode 406 and the negative connector 136b.

In an aspect, the control system 300 includes a proportional integral (PI) controller 302 connected to the computing device 306. The computing device 306 is configured to receive a power reference value $P_{dgref}$ 602 from the distributed generator circuit 106. The computing device 306 is further configured to receive a voltage reference value $V_{dg}$ from the distributed generator circuit 106. The computing device 306 is further configured to calculate a distributed generator current reference value $1/V_{dg}$ 604. The computing device 306 is further configured to receive a distributed generator current $I_{dg}$ 606 from the distributed generator circuit 106. The computing device 306 is further configured to calculate a distributed generator error between the current reference value $1/V_{dg}$ 604 and the distributed generator current $I_{dg}$ 606. The computing device 306 is further configured to apply the distributed generator error to the PI controller 302. The PI controller 302 is configured to generate the PWM signals 614 to actuate the boost converter switch 404.

In an aspect, the boost converter switch 404 is operatively connected to the computing device 306. The boost converter switch 404 is configured to receive the PWM signals 614. The PWM signals 614 are configured to control delivery of the distributed generator current $I_{dg}$ 606 to the DC bus 102.

In an aspect, the constant load power circuit 108 is configured with an input terminal 138a and an output terminal 138b. The input terminal 138a is connected to the positive bus line 112a and the output terminal 138b is connected to the negative bus line 112b.

In an aspect, the constant load power circuit 108 includes a buck converter 140; a capacitor $C_{c1}$ 142 connected in parallel with the buck converter 140; and a constant resistance 144 connected in parallel with the capacitor $C_{c1}$ 142.

In an aspect, the buck converter 140 includes the input terminal 138a and the output terminal 138b; a buck converter switch 502 connected to the input terminal 138a; a reverse diode 504 connected between the input terminal 138a and the output terminal 138b; and a buck converter inductor 506 connected to the buck converter switch 502, wherein the buck converter inductor 506 is connected to a positive capacitor terminal of the capacitor $C_{c1}$ 142 and to the constant resistance 144.

In an aspect, the buck converter switch 502 is operatively connected to the computing device 306. The buck converter switch 502 is configured to receive the PWM signals 712 from the computing device 306. The PWM signals 712 are configured to control a current in the constant resistance 144 to control the DC bus voltage.

In an aspect, the control system 300 includes a fractional order proportional integral (FOPI) voltage controller 304 connected to the computing device 306. The computing device 306 is configured to calculate an average SoC (So-$C_{avg}$) from the SoC of the plurality of DC battery circuits 104a-104b; calculate an SoC voltage error between a nominal voltage $V_N$ of each DC battery 116a-116b and an output voltage $v_{bio}$ of each DC battery 116a-116b; and apply the SoC voltage error to the FOPI voltage controller 304. The FOPI voltage controller 304 is configured to calculate a FOPI transfer function $G_{FOPI}$ 802 for each DC battery circuit 104a-104b. The FOPI voltage controller 304 is further configured to generate a compensation voltage given by $$v_{com} = G_{FOPI}(V_N - v_{bio});$$

wherein the computing device 306 is configured to generate a modified voltage reference $v_{biomod}$ for each DC battery 116a-116b based on $v_{biomod} = v^*_{bio} + v_{com}$, where $v^*_{bio}$ is droop-based voltage reference; generate an SoC transfer function based on $$G_{SoC} = \frac{1}{(R_{vi})n(SoC_i - SoC_{avg})},$$

where n is one of a positive integer and a negative integer, $SoC_i$ is the SoC of an $i^{th}$ battery; and modify the PWM signals 812 to balance the SoC of each DC battery circuit 104a-104b based on the SoC transfer function $G_{SoC}$ 808.

In an aspect, the FOPI voltage controller 304 includes a set of adjustable voltage control parameters. The set includes a proportional gain parameter $K_{pi}$ configured to determine a response of the FOPI voltage controller 304 based on the error, an integral gain parameter $K_{ii}$ configured to integrate the error over time, and a fractional order of integration parameter $\lambda$ having a fractional value between zero and two.

In an aspect, the control system 300 includes a modified particle swarm optimizer (MPSO) 314 located within the memory 310 of the computing device 306, wherein the computing device 306 is configured to apply the set of adjustable voltage control parameters to the MPSO 314 to generate a tuned set of adjustable control parameters.

The second embodiment is illustrated with respect to FIG. 19. The second embodiment describes a method 1900 of controlling a DC bus voltage and a state of charge (SoC) balance in a DC microgrid 100 having a plurality of DC battery circuits 104a-104b is described. Each DC battery circuit 104a-104b includes a DC battery 116a or 116b, connected to a bidirectional buck-boost converter 118a or 118b. The method 1900 includes calculating, by a fractional order proportional integral (FOPI) voltage controller 304 connected to a computing device 306, a fractional order proportional integral (FOPI) transfer function of the plurality of DC batteries 116a-116b. The method 1900 further includes calculating, by the FOPI voltage controller 304, a compensation voltage $v_{com}$ of each DC battery 116a-116b of the plurality of DC battery circuits 104a-104b based on the FOPI transfer function. The method 1900 further includes measuring, by the computing device 306, an SoC of each of the DC batteries 116a-116b. The method 1900 further includes calculating, by the computing device 306, an average SoC of the DC batteries 116a-116b of the plurality of DC battery circuits 104a-104b. The method 1900 further includes formulating, by the computing device 306, an SoC transfer function based on the average SoC of the DC batteries 116a-116b of the plurality of DC battery circuits 104a-104b. The method 1900 further includes combining, by the computing device 306, the compensation voltage $v_{com}$ and the SoC transfer function in a double control loop of the plurality of DC battery circuits 104a-104b to obtain a control model. The method 1900 further includes modifying, by the computing device 306, the control model to develop a small signal model 900 based on bidirectional buck-boost converter small signal equations of the plurality of DC battery circuits 104a-104b. The method 1900 further includes generating, by the FOPI voltage controller 304, a FOPI control transfer function for each DC battery circuit 104a-104b based on the small signal model 900. The method 1900 further includes tuning, by the computing device 306, a plurality of parameters of the FOPI control transfer function based on a modified particle swarm optimizer 314. The method 1900 further includes controlling the DC bus voltage based on the FOPI control transfer function.

In an aspect, the compensation voltage $v_{com}$ is given by:

$$v_{com} = G_{FOPI}(V_N - v_{bio}),$$

where $G_{FOPI}$ 802 is the FOPI transfer function, $V_N$ is a nominal voltage of the DC microgrid 100, $v_{bio}$ is an output voltage of a first DC battery of the plurality of DC batteries 116a-116b.

In an aspect, the SoC transfer function is given by:

$$\frac{1}{(R_{vi})n(SoC_i - SoC_{avg})},$$

Where $R_{vi}$ is a droop resistance of the first DC battery of the plurality of DC batteries 116a-116b, $n$ is a charging state, $SoC_i$ is an SoC of the first DC battery of the plurality of DC batteries 116a-116b, and $SoC_{avg}$ is an average SoC of the plurality of DC batteries 116a-116b.

In an aspect, the tuning is performed with an objective function, wherein the objective function is formulated to minimize an error in a step response of the FOPI control transfer function.

In an aspect, the DC microgrid 100 further includes a distributed generator circuit 106 and a constant load power circuit 108. Each of the distributed generator circuit 106 and the constant load power circuit 108 comprises a bidirectional converter 134, 140, respectively.

Figure 20:
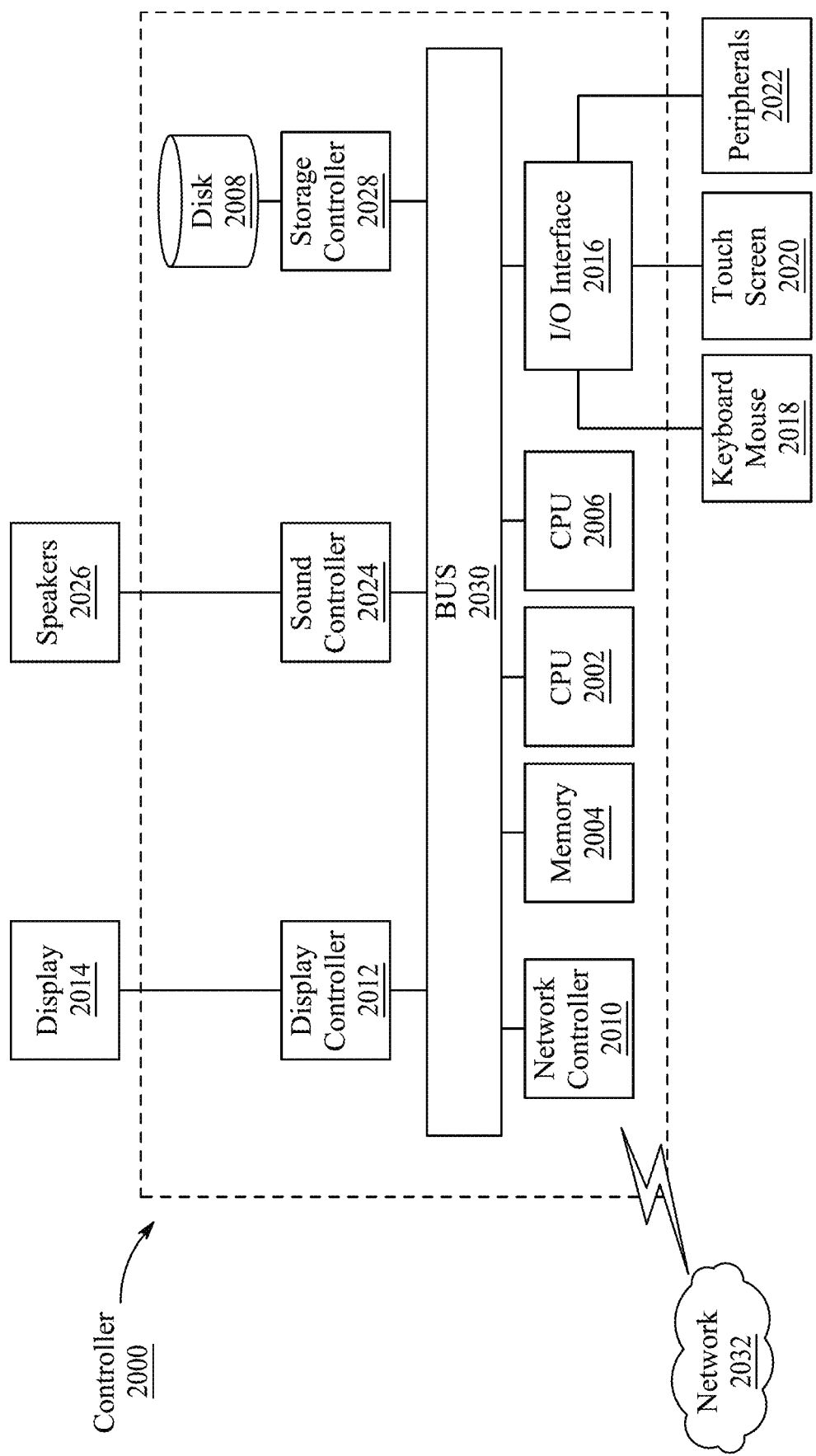
FIG. 20 is an illustration of a non-limiting example of details of computing hardware used in a computing system, according to certain embodiments.

Next, further details of the hardware description of the computing environment according to exemplary embodiments are described with reference to FIG. 20. In FIG. 20, a controller 2000 is described as representative of the computing device 306 of the control system 300 of FIG. 3 in which the controller 2000 includes a CPU 2002 which performs the processes described above/below. The process data and instructions may be stored in memory 2004. These processes and instructions may also be stored on a storage medium disk 2008 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1202, 1206 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 2002 or CPU 2006 may be a Xenon or Core processor from Intel of America or an Opteron processor from AMD of America, or may be other processor types that would be recognized by one of ordinary skill in the art. Alternatively, the CPU 2002, 2006 may be implemented on an FPGA, ASIC, PLD or using discrete logic circuits, as one of ordinary skill in the art would recognize. Further, C P U 2002, 2006 may be implemented as multiple processors cooperatively working in parallel to perform the instructions of the inventive processes described above.

The computing device in FIG. 20 also includes a network controller 2010, such as an Intel Ethernet PRO network interface card from Intel Corporation of America, for interfacing with network 2032. As can be appreciated, the network 2032 can be a public network, such as the Internet, or a private network, such as an LAN or WAN network, or any combination thereof and can also include PSTN or ISDN sub-networks. The network 2032 can also be wired, such as an Ethernet network, or can be wireless, such as a cellular network including EDGE, 3G, 4G and 5G wireless cellular systems. The wireless network can also be WiFi, Bluetooth, or any other wireless form of communication that is known.

The computing device further includes a display controller 2012, such as a NVIDIA GeForce GTX or Quadro graphics adaptor from NVIDIA Corporation of America for interfacing with display 2014, such as a Hewlett Packard HPL2445w LCD monitor. A general purpose I/O interface 2016 interfaces with a keyboard and/or mouse 2018 as well as a touch screen panel 2020 on or separate from display 2014. General purpose I/O interface also connects to a variety of peripherals 2022 including printers and scanners, such as an OfficeJet or DeskJet from Hewlett Packard.

A sound controller 2024 is also provided in the computing device such as Sound Blaster X-Fi Titanium from Creative, to interface with speakers/microphone 2026 thereby providing sounds and/or music.

The general-purpose storage controller 2028 connects the storage medium disk 2008 with communication bus 2030, which may be an ISA, EISA, VESA, PCI, or similar, for interconnecting all of the components of the computing device. A description of the general features and functionality of the display 2014, keyboard and/or mouse 2018, as well as the display controller 2012, storage controller 2028, network controller 2010, sound controller 2024, and general purpose I/O interface 2016 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 21.

Figure 21:
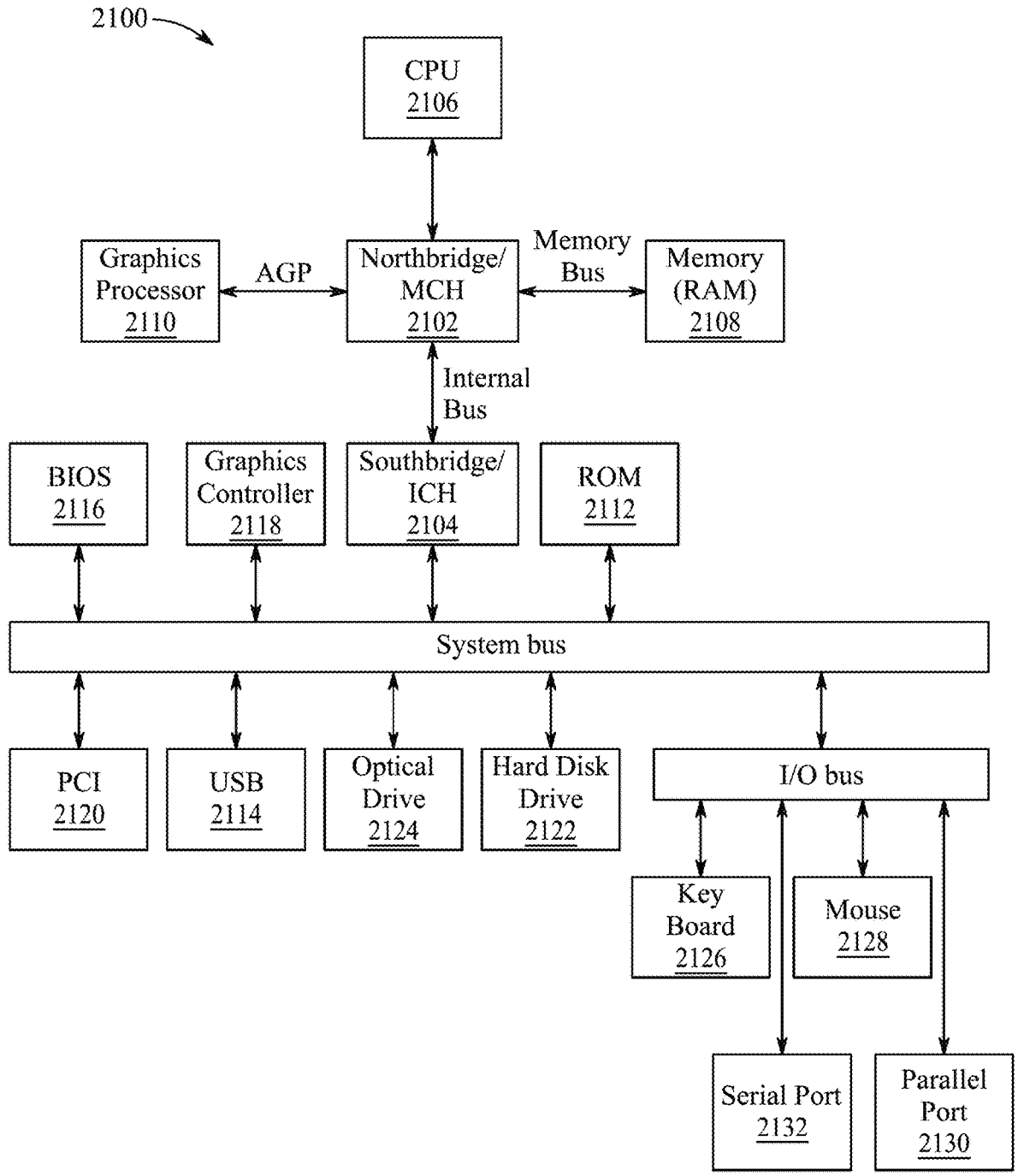
FIG. 21 is an exemplary schematic diagram of a data processing system used within the computing system, according to certain embodiments.

FIG. 21 shows a schematic diagram of a data processing system 2100, according to certain embodiments, for performing the functions of the exemplary embodiments. The data processing system 2100 is an example of a computer in which code or instructions implementing the processes of the illustrative embodiments may be located.

In FIG. 21, the data processing system 2100 employs a hub architecture including a north bridge and memory controller hub (NB/MCH) 2102 and a south bridge and input/output (I/O) controller hub (SB/ICH) 2104. The central processing unit (CPU) 2106 is connected to NB/MCH 2102. The NB/MCH 2102 also connects to the memory 2108 via a memory bus and connects to the graphics processor 2110 via an accelerated graphics port (AGP). The NB/MCH 2102 also connects to the SB/ICH 2104 via an internal bus (e.g., a unified media interface or a direct media interface). The CPU Processing unit 2106 may contain one or more processors and even may be implemented using one or more heterogeneous processor systems.

Figure 22:
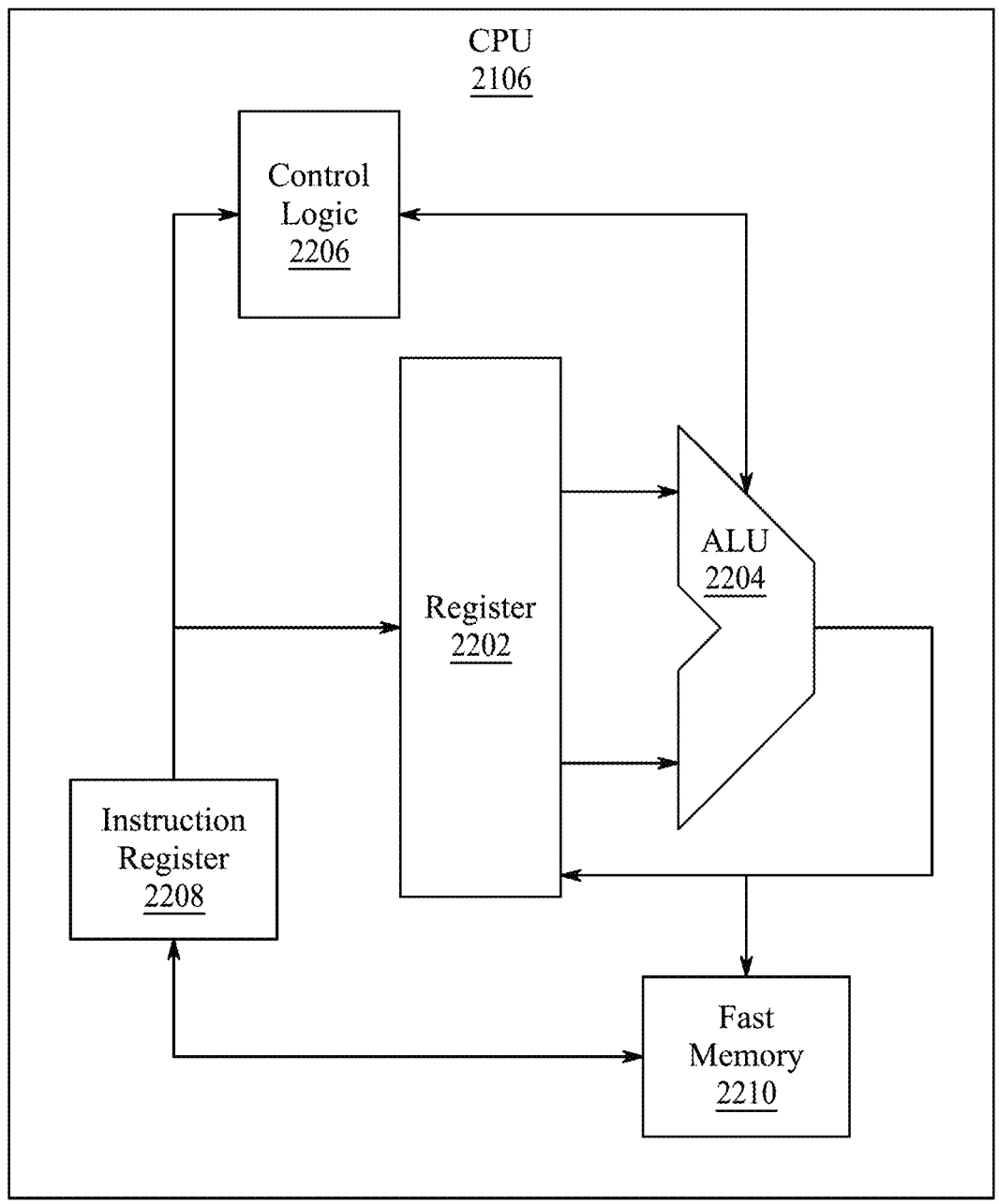
FIG. 22 is an exemplary schematic diagram of a processor used with the computing system, according to certain embodiments.

For example, FIG. 22 shows one implementation of CPU 2106. In one implementation, the instruction register 2208 retrieves instructions from the fast memory 2210. At least part of these instructions is fetched from the instruction register 2208 by the control logic 2206 and interpreted according to the instruction set architecture of the CPU 2106. Part of the instructions can also be directed to the register 2202. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 2204 that loads values from the register 2202 and performs logical and mathematical operations on the loaded values according to the instructions. The results from these operations can be feedback into the register and/or stored in the fast memory 2210. According to certain implementations, the instruction set architecture of the CPU 2106 can use a reduced instruction set architecture, a complex instruction set architecture, a vector processor architecture, a very large instruction word architecture. Furthermore, the CPU 2106 can be based on the Von Neuman model or the Harvard model. The CPU 2106 can be a digital signal processor, an FPGA, an ASIC, a PLA, a PLD, or a CPLD. Further, the CPU 2106 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 21, the data processing system 2100 can include that the SB/ICH 2104 is coupled through a system bus to an I/O Bus, a read only memory (ROM) 2112, universal serial bus (USB) port 2114, a flash binary input/output system (BIOS) 2116, and a graphics controller 2118. PCI/PCIe devices can also be coupled to SB/ICH 2104 through a PCI bus 2120.

The PCI devices may include, for example, Ethernet adapters, add-in cards, and PC cards for notebook computers. The Hard disk drive 2122 and optical drive 2124 can use, for example, an integrated drive electronics (IDE) or serial advanced technology attachment (SATA) interface. In one implementation the I/O bus can include a super I/O (SIO) device.

Further, the hard disk drive (HDD) 2122 and optical drive 2124 can also be coupled to the SB/ICH 2104 through a system bus. In one implementation, a keyboard 2126, a mouse 2128, a parallel port 2130, and a serial port 2132 can be connected to the system bus through the I/O bus. Other peripherals and devices that can be connected to the SB/ICH 2104 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 23:
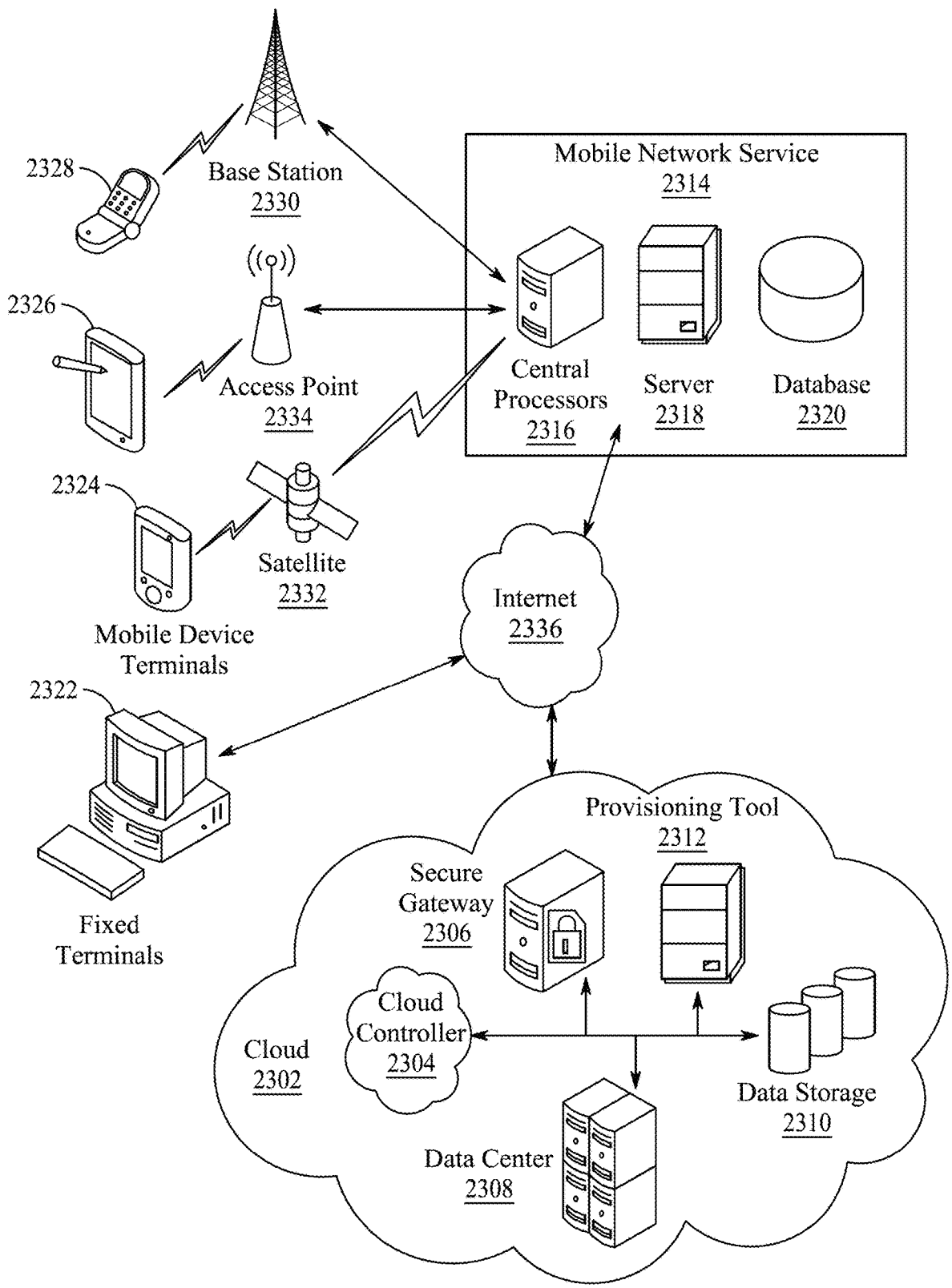
FIG. 23 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 2302 including a cloud controller 2304, a secure gateway 2306, a data center 2308, data storage 2310 and a provisioning tool 2312, and mobile network services 2314 including central processors 2316, a server 2318 and a database 2320, which may share processing, as shown by FIG. 23, in addition to various human interface and communication devices (e.g., display monitors 2322, smart phones 2328, tablets 2326, personal digital assistants (PDAs) 2324). The network may be a private network, such as a LAN, satellite 2332 or WAN 2334, or be a public network 2330, may such as the Internet 2336. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A control system for a direct current (DC) microgrid, comprising:
   a DC bus configured with a positive bus line and a negative bus line;
   a plurality of DC battery circuits each configured with a positive coupler and a negative coupler, wherein each positive coupler is connected to the positive bus line and each negative coupler is connected to the negative bus line;
   a plurality of switches located in each DC battery circuit, wherein each switch includes a control input terminal;
   a distributed generator circuit connected to the DC bus;
   a constant load power circuit connected to the DC bus; and
   a computing device connected to each control input terminal, the DC bus, the distributed generator circuit and the constant load power circuit, wherein the computing device includes an electric circuitry, a memory configured to store program instructions, and at least one processor configured to execute the program instructions to:
      determine a DC bus voltage of the DC bus,
      determine a state of charge (SoC) of each of the plurality of DC battery circuits, and
      generate phase width modulation (PWM) signals which:
         control the DC bus voltage, and
         balance the SoC of the DC battery circuits; and
   a proportional integral (PI) controller connected to the computing device, wherein the computing device is configured to:
      receive a power reference value $P_{dgref}$ from the distributed generator circuit;
      receive a voltage reference value $V_{dg}$ from the distributed generator circuit;
      calculate a distributed generator current reference value $1V_{dg}$;
      receive a distributed generator current $I_{dg}$ from the distributed generator circuit;
      calculate a distributed generator error between the current reference value $1V_{dg}$ and the distributed generator current $I_{dg}$; and
   apply the distributed generator error to the PI controller, wherein the PI controller is configured to generate the PWM signals to actuate a boost converter switch.

2. The control system of claim 1, wherein each DC battery circuit comprises:
   a DC battery having a positive battery terminal and a negative battery terminal;
   a bidirectional buck-boost converter connected to the DC battery, wherein the bidirectional buck-boost converter includes:
      a resistor connected to the positive battery terminal;
      an inductor connected in series with the resistor;
      a first buck-boost converter switch connected between the inductor and the positive bus line;
      a second buck-boost converter switch connected between the inductor and the negative battery terminal, wherein the negative battery terminal is connected to the negative bus line; and
      a capacitor connected between the first buck-boost converter switch and the negative bus line.

3. The control system of claim 2, further comprising:
   a plurality of resistive loads connected to the DC bus, wherein each resistive load is configured to receive power from the DC bus.

4. The control system of claim 3, wherein the distributed generator circuit comprises:
   a distributed generator unit; and
   wherein the boost converter is connected in parallel with the distributed generator unit, wherein the boost converter is configured with a positive connector and a negative connector, wherein the positive connector is connected to the positive bus line and the negative connector is connected to the negative bus line.

5. The control system of claim 4, wherein the distributed generator unit is connected to at least one generator of renewable energy and is configured to receive power from the at least one generator of renewable energy.

6. The control system of claim 5, wherein the boost converter comprises:
   a boost converter inductor connected to the at least one generator of renewable energy;
   a boost converter switch connected between the boost converter inductor and the negative connector;
   a forward diode connected to the boost converter switch; and
   a boost converter capacitor $C_{dg}$ connected between the forward diode and the negative connector.

7. The control system of claim 1, wherein the boost converter switch is operatively connected to the computing device, wherein the boost converter switch is configured to receive the PWM signals, wherein the PWM signals are configured to control delivery of the distributed generator current $I_{dg}$ to the DC bus.

8. The control system of claim 7, wherein the constant load power circuit is configured with an input terminal and an output terminal, wherein the input terminal is connected to the positive bus line and the output terminal is connected to the negative bus line.

9. The control system of claim 8, wherein the constant load power circuit comprises:
   a buck converter;
   a capacitor $C_{c1}$ connected in parallel with the buck converter; and
   a constant resistance connected in parallel with the capacitor.

10. The control system of claim 9, wherein the buck converter comprises:
    the input terminal and the output terminal;
    a buck converter switch connected to the input terminal;
    a reverse diode connected between the input terminal and the output terminal; and
    a buck converter inductor connected to the buck converter switch, wherein the buck converter inductor is connected to a positive capacitor terminal of the capacitor $C_{c1}$ and to the constant resistance.

11. The control system of claim 10, wherein the buck converter switch is operatively connected to the computing device, wherein the buck converter switch is configured to receive the PWM signals from the computing device, wherein the PWM signals are configured to control a current in the constant resistance to control the DC bus voltage.

12. The control system of claim 11, further comprising:
a fractional order proportional integral (FOPI) voltage controller connected to the computing device, wherein the computing device is configured to:
calculate an average SoC ($SoC_{avg}$) from the SoC of the plurality of DC battery circuits;
calculate an SoC voltage error between a nominal voltage $V_N$ of each DC battery and an output voltage $v_{bio}$ of each DC battery;
apply the SoC voltage error to the FOPI voltage controller, wherein the FOPI controller is configured to:
calculate a FOPI transfer function $G_{FOPI}$ for each DC battery circuit;
generate a compensation voltage given by:

$$v_{com}=G_{FOPI}(V_N-v_{bio});$$

wherein the computing device is configured to:
generate a modified voltage reference $v_{biomod}$ for each DC battery based on $v_{biomod}=v^*_{bio}+v_{com}$, where $v^*_{bio}$ is droop-based voltage reference;
generate an SoC transfer function based on:

$$G_{SoC} = \frac{1}{(R_{vi})n(SoC_i - SoC_{avg})},$$

where n is one of a positive integer and a negative integer, $SoC_i$ is the SoC of an $i^{th}$ battery; and
modify the PWM signals to balance the SoC of each DC battery circuit based on the SoC transfer function $G_{SoC}$.

13. The control system of claim 12, wherein the FOPI voltage controller includes a set of adjustable voltage control parameters, wherein the set includes a proportional gain parameter $K_{pi}$ configured to determine a response of the FOPI voltage controller based on the error, an integral gain parameter $K_{ii}$ configured to integrate the error over time, and a fractional order of integration parameter $\lambda$ having a fractional value between zero and two.

14. The control system of claim 13, further comprising a modified particle swarm optimizer (MPSO) located within the memory of the computing device, wherein the computing device is configured to apply the set of adjustable voltage control parameters to the MPSO to generate a tuned set of adjustable control parameters.

15. A method of controlling a DC bus voltage and a state of charge (SoC) balance in a DC microgrid having a plurality of DC battery circuits, each DC battery circuit including a DC battery connected to a bidirectional buck-boost converter, comprising:
calculating, by a fractional order proportional integral (FOPI) voltage controller connected to a computing device, a fractional order proportional integral (FOPI) transfer function of the plurality of DC batteries;
calculating, by the FOPI voltage controller, a compensation voltage $v_{com}$ of each DC battery of the plurality of DC battery circuits based on the FOPI transfer function;
measuring, by the computing device, an SoC of each of the DC batteries;
calculating, by the computing device, an average SoC of the DC batteries of the plurality of DC battery circuits;
formulating, by the computing device, an SoC transfer function based on the average SoC of the DC batteries of the plurality of DC battery circuits;
combining, by the computing device, the compensation voltage $v_{com}$ and the SoC transfer function in a double control loop of the plurality of DC battery circuits to obtain a control model;
modifying, by the computing device, the control model to develop a small signal model based on bidirectional buck-boost converter small signal equations of the plurality of DC battery circuits;
generating, by the FOPI voltage controller, a FOPI control transfer function for each DC battery circuit based on the small signal model;
tuning, by the computing device, a plurality of parameters of the FOPI control transfer function based on a modified particle swarm optimizer; and
controlling the DC bus voltage based on the FOPI control transfer function.

16. The method of claim 15, wherein the compensation voltage $v_{com}$ is given by:

$$v_{com}=G_{FOPI}(V_N-v_{bio}),$$

where $G_{FOPI}$ is the FOPI transfer function, $V_N$ is a nominal voltage of the DC microgrid, $v_{bio}$ is an output voltage of a first DC battery of the plurality of DC batteries.

17. The method of claim 16, wherein the SoC transfer function is given by:

$$\frac{1}{(R_{vi})n(SoC_i - SoC_{avg})},$$

wherein $R_{vi}$ is a droop resistance of the first DC battery of the plurality of DC batteries, n is a charging state, $SoC_i$ is an SoC of the first DC battery of the plurality of DC batteries, and $SoC_{avg}$ is an average SoC of the plurality of DC batteries.

18. The method of claim 17, wherein the tuning is performed with an objective function, wherein the objective function is formulated to minimize an error in a step response of the FOPI control transfer function.

19. The method of claim 15, wherein the DC microgrid further includes a distributed generator circuit and a constant load power circuit, wherein each of the distributed generator circuit and the constant load power circuit comprises a bidirectional converter.

* * * * *